(12) United States Patent
Inoue et al.

(10) Patent No.: US 9,487,258 B2
(45) Date of Patent: Nov. 8, 2016

(54) STRADDLED VEHICLE

(71) Applicant: YAMAHA HATSUDOKI KABUSHIKI KAISHA, Iwata-shi, Shizuoka (JP)

(72) Inventors: Takehiro Inoue, Iwata (JP); Yutaka Kubo, Iwata (JP); Takeshi Ikeda, Iwata (JP)

(73) Assignee: YAMAHA HATSUDOKI KABUSHIKI KAISHA, Iwata-Shi, Shizuoka (JP)

( * ) Notice: Subject to any disclaimer, the term of this patent is extended or adjusted under 35 U.S.C. 154(b) by 0 days.

(21) Appl. No.: 14/896,301

(22) PCT Filed: Jun. 11, 2015

(86) PCT No.: PCT/JP2015/002947
§ 371 (c)(1),
(2) Date: Dec. 4, 2015

(87) PCT Pub. No.: WO2015/190112
PCT Pub. Date: Dec. 17, 2015

(65) Prior Publication Data
US 2016/0229473 A1   Aug. 11, 2016

(30) Foreign Application Priority Data

Jun. 11, 2014 (JP) .................. 2014-120235
Jun. 11, 2014 (JP) .................. 2014-120236
Dec. 18, 2014 (JP) .................. 2014-256379

(51) Int. Cl.
*B60Q 1/18* (2006.01)
*B62J 6/02* (2006.01)
*F21S 8/10* (2006.01)

(52) U.S. Cl.
CPC .............. *B62J 6/02* (2013.01); *F21S 48/1216* (2013.01)

(58) Field of Classification Search
CPC .............. B62J 6/02; B60Q 1/12; B60Q 1/18; B60Q 1/0041; F21S 48/1159; F21S 48/335
See application file for complete search history.

(56) References Cited

U.S. PATENT DOCUMENTS

| 8,342,723 B2 | 1/2013 | Mochizuki |
| 2005/0099818 A1* | 5/2005 | Gropp ................ B60Q 1/12 362/466 |
| 2007/0058381 A1 | 3/2007 | Domoto et al. |
| 2015/0267888 A1 | 9/2015 | Suwa et al. |

FOREIGN PATENT DOCUMENTS

| EP | 2657076 A1 | 10/2013 |
| EP | 2769879 A2 | 8/2014 |

(Continued)

OTHER PUBLICATIONS

Extended European Search Report dated Aug. 4, 2016 for the corresponding European Patent Application No. 15797236.5.

*Primary Examiner* — Andrew Coughlin
(74) *Attorney, Agent, or Firm* — Rabin & Berdo, P.C.

(57) ABSTRACT

A predefined length between first and second optical lens sections and of the first and second highly-directional light units is smaller than a length, which is half of a length between a left end of a lower portion of a left front-wheel support unit and a right end of a lower portion of a right front-wheel support unit in the left-right direction of a vehicle, and the predefined length is greater than half a smaller one of minimum widths of the optical lens sections of the first and the second highly-directional light units. A configuration is adopted in which light radiated through the optical lens section of the first highly-directional light unit partially overlaps light radiated through the optical lens section of the second highly-directional light unit and the remaining part does not overlap.

11 Claims, 42 Drawing Sheets

(56) References Cited

FOREIGN PATENT DOCUMENTS

| | | |
|---|---|---|
| JP | 04-331678 A | 11/1992 |
| JP | 2008-222178 A | 9/2008 |
| JP | 2014-159257 A | 9/2014 |
| WO | WO 2014-057681 A1 | 4/2014 |

* cited by examiner

STRADDLED VEHICLE

The present invention relates to a straddled vehicle capable of turning (hereinafter, referred to as "turnable") leftward with a body frame tilted leftward in a left-right direction of the vehicle and also turning rightward with the body frame tilted rightward in the left-right direction of the vehicle.

BACKGROUND ART

Patent Literature (hereinafter, referred to as "PTL") 1 discloses a straddled vehicle capable of turning leftward with a body frame tilted leftward in a left-right direction of the vehicle and turning rightward with the body frame tilted rightward in the left-right direction of the vehicle. Such a straddled vehicle includes a lamp unit having a light source and a main reflector that reflects light from the light source forward of the body, and forms light distribution required for the straddled vehicle, through reflection of the main reflector.

There is a demand for such a straddled vehicle to improve the visibility from outside using light radiated outward from the lamp unit. More specifically, it is desirable to let people recognize the presence of the straddled vehicle even when the people see the straddled vehicle from forward of the vehicle and from a range in which intensity of light distribution of the lamp unit is low.

The straddled vehicle of PTL 1 includes sub-reflectors smaller than the main reflector on the left and right sides of the main reflector that forms light distribution. Provision of a sub-light-emitting region in which light from the light source is reflected outward by the sub-reflectors increases the area of the light-emitting region of the lamp unit while maintaining light distribution required for the straddled vehicle and improves the visibility from outside the straddled vehicle which is turnable leftward with the body frame tilted leftward in the left-right direction of the vehicle and turnable rightward with the body frame tilted rightward in the left-right direction of the vehicle.

CITATION LIST

Patent Literature

PTL 1
Japanese Patent Application Laid-Open No. 2014-159257

SUMMARY OF INVENTION

Technical Problem

In the straddled vehicle of PTL 1, the lamp unit includes the main light-emitting region in which light reflected by the main reflector is emitted and the sub-light-emitting region in which light reflected by the sub-reflector is emitted. The main light-emitting region has a size large enough to maintain light distribution required for the straddled vehicle which is turnable leftward with the body frame tilted leftward in the left-right direction of the vehicle and turnable rightward with the body frame tilted rightward in the left-right direction of the vehicle as in the case where there is no sub-light-emitting region. Thus, in the technique of PTL 1, the addition of sub-light-emitting region increases the size of the lamp unit. Moreover, the straddled vehicle of PTL 1 is mounted with the lamp unit that has been made larger in size, so that the straddled vehicle increases in size.

An object of the present invention is to provide a straddled vehicle which is turnable leftward with a body frame tilted leftward in a left-right direction of the vehicle and turnable rightward with the body frame tilted rightward in the left-right direction of the vehicle, capable of limiting an increase in the size of the vehicle while maintaining light distributions required for the vehicle and improving visibility from outside of the vehicle.

Solution to Problem

A straddled vehicle according to a first aspect of the present invention is a straddled vehicle including a body frame and a front wheel portion that includes at least one front wheel, the straddled vehicle being turnable leftward while the body frame is tilted leftward in a left to right direction of the vehicle and being turnable rightward while the body frame is tilted rightward in the left to right direction of the vehicle, the straddled vehicle including: a steering shaft turnably supported by the body frame; a handlebar that is long in the left-right direction of the vehicle and that is configured to turn integrally with the steering shaft; a left front-wheel support unit located at the left of the steering shaft in the left-right direction of the vehicle, the left front-wheel support unit including: an upper portion supported by the body frame; and a lower portion that supports the front wheel portion and that is displaceable with respect to the upper portion in the up-down direction of the vehicle, the left front-wheel support unit being turnable with the steering shaft; a right front-wheel support unit located at the right of the steering shaft in the left-right direction of the vehicle, the right front-wheel support unit including: an upper portion supported by the body frame; and a lower portion that supports the front wheel portion and that is displaceable with respect to the upper portion in the in the up-down direction of the vehicle, the right front-wheel support unit being turnable with the steering shaft; a first highly-directional light unit including: a first light-emitting section that emits highly-directional light; and a first optical lens section that refracts the light of the first light-emitting section and forms a light distribution, the light distribution formed by the first optical lens section becoming a light distribution of at least part of a main beam or a dipped beam; a second highly-directional light unit including: a second light-emitting section that emits highly-directional light; and a second optical lens section that refracts the light of the second light-emitting section and forms a light distribution, the light distribution formed by the second optical lens section becoming a light distribution of at least part of a light beam identical to one of the main beam or the dipped beam that includes the beam of the first highly-directional light unit, the second highly-directional light unit being configured to turn on when the first highly-directional light unit is on and to turn off when the first highly-directional light unit is off; and a first base portion that supports the first highly-directional light unit and the second highly-directional light unit, the first base portion being supported so that the position of the first base portion relative to the body frame or the handlebar is changeable, in which the first highly-directional light unit and the second highly-directional light unit are formed in such a way that: a maximum width of each of the first optical lens section and the second optical lens section is smaller than half a length between a left end of the lower portion of the left front-wheel support unit and a right end of the lower portion of the right front-wheel support unit in the left-right direction of the vehicle when viewed from the front of the vehicle; and a length between the first optical lens section and the second optical lens section is smaller than half the length between the left end of the lower portion of the left front-wheel support unit and the right end of the right front-wheel support unit in the left-right direction of the vehicle when viewed from the front of the vehicle while the length between the first and the second optical lens sections is greater than half a length that is a smaller one of a minimum width of the first optical lens section and a minimum width of the second optical lens section, in which the first highly-directional light unit and the second highly-directional light unit are fixed to the first base portion so as to maintain, when a relative position of the first base portion with respect to the body frame or the handlebar is changed, a state in which a first wall light distribution partially overlaps a second wall light distribution while a remaining part of the first wall light distribution does not overlap, the first wall light distribution being a light distribution drawn, by the light radiated through the first optical lens section, on an upright wall body located 10 meters forward of the vehicle from a front end of one of the first optical lens section and the second optical lens section that is located at a foremost position in the front-rear direction of the vehicle, the second wall light distribution being a light distribution drawn on the wall body by the light radiated through the second optical lens section.

The technical idea of the straddled vehicle disclosed in PTL 1 is to add a sub-light-emitting region in order to obtain a light distribution required for the vehicle and to improve the visibility from outside of the vehicle with the main light-emitting region left unchanged. With this technical idea, the sub-light-emitting region is added to the main light-emitting region, which causes an increase in the size of the straddled vehicle, however. In this respect, the present inventor has changed the technical idea and studied the approach of limiting an increase in the size of the vehicle with an aim to make the configuration to radiate light to outside more compact first and improving the visibility from outside the straddled vehicle that is turnable leftward with the body frame tilted leftward in the left-right direction of the vehicle and turnable rightward with the body frame tilted rightward in the left-right direction of the vehicle. As a result, the inventor has found that employing a configuration in which a plurality of light emitting regions are provided while the regions are disposed apart from each other by an appropriate interval and are configured to turn on simultaneously makes it possible to improve the visibility from outside the straddled vehicle even when the straddled vehicle is seen from the front of the straddled vehicle and from a range in which the intensity of light distribution is low.

The present inventor has also paid particular attention to a highly-directional light including a light-emitting section that emits highly-directional light and an optical lens section that refracts the light of the light-emitting section and forms a light distribution while the light distribution formed by the optical lens section becomes at least part of a light distribution of the main beam or dipped beam. In the highly-directional light, when optical lens section refracts the light from the light-emitting section and emits the light to the outside, the highly-directional light causes the light to pass through the optical lens section while partially spreading the light because of the nature of an optical lens material, so that the optical lens section itself appears to glow due to the diffused light. The present inventor has thought using the optical lens section that appears to glow due to the diffused light to improve the visibility from outside of the straddled vehicle.

The first and the second highly-directional light units are formed in such a way that the maximum width of each of the first and the second lens sections is smaller than half the length in the left-right direction of the vehicle between the left end of the lower portion of the left front-wheel support unit and the right end of the lower portion of the right front-wheel support unit when viewed from the front of the vehicle. The length between the left end of the lower portion of the left front-wheel support unit and the right end of the lower portion of the right front-wheel support unit of the straddled vehicle in the left-right direction of the vehicle is very small compared to a four-wheel automobile. For this reason, it is possible to make more compact not only the first and the second optical lens sections but also the first and the second highly-directional light units.

The first and the second highly-directional light units are formed in such a way that the length between the first and the second optical lens sections is smaller than half the length between the left end of the lower portion of the left front-wheel support unit and the right end of the lower portion of the right front-wheel support unit but greater than half a smaller one of the minimum widths of the first and the second optical lens sections when viewed from the front of the vehicle. Thus, by taking advantage of the fact that both the first and the second highly-directional light units are made more compact, it is possible to limit an increase in the size of the vehicle even when the distance between the first and the second highly-directional light units increases. Moreover, since the two optical lens sections which appear to glow due to diffused light are arranged apart from each other, it is possible to improve the visibility from outside of the vehicle even when viewed from a range in which the intensity of light distribution of the first highly-directional light unit and the second highly-directional light unit is low.

Thus, while limiting an increase in the size of the vehicle, it is possible to improve the visibility from outside of the vehicle through the first optical lens section and the second optical lens section which appear to glow due to diffused light even when viewed from a range in which the intensity of light distribution of the first highly-directional light unit and the second highly-directional light unit is low.

However, when the first optical lens section of the first highly-directional light unit and the second optical lens section of the second highly-directional light unit are each formed to be more compact, there arises another problem in that it is difficult to form a light distribution required for the straddled vehicle which is turnable leftward with the body frame tilted leftward in the left-right direction of the vehicle and turnable rightward with the body frame tilted rightward in the left-right direction of the vehicle.

The first and the second highly-directional light units each include a light-emitting section that emits highly-directional light and an optical lens section that refracts the light from the light-emitting section and forms a light distribution. The light distribution formed by the second optical lens section of the second highly-directional light unit becomes a light distribution of at least part of at least part of a light beam identical to one of the main beam or the dipped beam that includes the beam of the first highly-directional light unit, and the second highly-directional light unit turns on when the first highly-directional light unit is on and turns off when the first highly-directional light unit is off. Furthermore, the first optical lens section and the second optical lens section are arranged at positions apart from each other. For this reason, there is a high degree of design freedom in the light distribution of light radiated through the first optical lens section of the first highly-directional light unit and the light distribution of light radiated through the second optical lens section of the second highly-directional light unit. Thus, the present inventor changes the light distributions of the first and the second optical lens sections of the first and the second highly-directional light units, taking advantage of the high degree of design freedom in the light distribution and thereby found out that it is possible to form, in combination of the light distributions, a light distribution required for a straddled vehicle which is turnable leftward with the body frame tilted leftward in the left-right direction of the vehicle and turnable rightward with the body frame tilted rightward in the left-right direction of the vehicle. The first and the second highly-directional light units are fixed to a first base portion so as to maintain a state in which a first wall light distribution drawn on a wall body by light radiated through the first optical lens section partially overlaps a second wall light distribution drawn on the wall body by light radiated through the second optical lens section and the remaining portion does not overlap when a relative position with respect to the body frame of the first base portion or the handlebar is changed. Note that the wall body is a wall body that stands upright at a position 10 meters apart and forward of the vehicle from the front end located at the foremost in the front-rear direction of the vehicle among the first and the second optical lens sections. Thus, even when the first optical lens section and the second optical lens section are more compact, it is possible to form a light distribution required for the vehicle.

Moreover, the first base portion for supporting the first and the second highly-directional light units is provided, and the relative position of the first base portion with respect to the body frame or the handlebar is changeable while the light distributions of the first and the second highly-directional light units are unchanged. It is therefore possible to maintain the wall light distribution formed by the first and the second highly-directional light units arranged at separate positions.

Therefore, according to the straddled vehicle of aspect 1, it is possible to provide a straddled vehicle capable of limiting an increase in the size of the vehicle while maintaining a light distribution required for the vehicle and improving the visibility from outside of the vehicle, the straddled vehicle being turnable leftward with the body frame tilted leftward in the left-right direction of the vehicle and turnable rightward with the body frame tilted rightward in the left-right direction of the vehicle.

Furthermore, the present invention can adopt the following aspects.

A straddled vehicle according to a second aspect is the straddled vehicle according to the first aspect in which a region between the first optical lens section and the second optical lens section is located at a center of the vehicle in the left-right direction when viewed from the front of the vehicle.

According to the straddled vehicle of the second aspect, since a region between the first and the second optical lens sections of the first and the second highly-directional light units is disposed at the center in the left-right direction of the vehicle, the visibility from outside the straddled vehicle is further improved. Thus, according to the straddled vehicle of the second aspect, it is possible to limit an increase in the size of the vehicle while maintaining a light distribution required for the vehicle and further improve the visibility from outside the straddled vehicle.

A straddled vehicle according to a third aspect is the straddled vehicle according to the first aspect, further including: a left grip disposed on the left of the handlebar; and a right grip disposed on the right of the handlebar, in which the light distribution of the first highly-directional light unit and the light distribution of the second highly-directional light unit become a light distribution of at least part of a dipped beam, in which the straddled vehicle further includes: a third highly-directional light unit including a third light-emitting section that emits highly-directional light and a third optical lens section that refracts the light of the third light-emitting section and that forms a light distribution, the light distribution formed by the third optical lens section becoming a light distribution of at least part of the dipped beam; a fourth highly-directional light unit including a fourth light-emitting section that emits highly-directional light and a fourth optical lens section that refracts the light of the fourth light-emitting section and that forms a light distribution, the light distribution formed by the fourth optical lens section becoming a light distribution of at least part of the dipped beam, the fourth highly-directional light unit being configured to turn on together with the third highly-directional light unit and to turn off together with the third highly-directional light unit; a fifth highly-directional light unit including a fifth light-emitting section that emits highly-directional light and a fifth optical lens section that refracts the light of the fifth light-emitting section and that forms a light distribution, the light distribution formed by the fifth optical lens section becoming a light distribution of at least part of the main beam; a sixth highly-directional light unit including a sixth light-emitting section that emits highly-directional light and a sixth optical lens section that refracts the light of the sixth light-emitting section and that forms a light distribution, the light distribution formed by the sixth optical lens section becoming a light distribution of at least part of the main beam; and a second base portion that supports the third highly-directional light unit and the fourth highly-directional light unit, the second base portion being supported so that the position of the second base portion relative to the body frame or the handlebar is changeable, in which the third highly-directional light unit and the fourth highly-directional light unit are formed in such a way that: a maximum width of each of the third optical lens section and the fourth optical lens section is smaller than half a length between a left end of the lower portion of the left front-wheel support unit and a right end of the lower portion of the right front-wheel support unit in the left-right direction of the vehicle when viewed from the front of the vehicle; and a length between the third optical lens section and the fourth optical lens section is smaller than half the length between the left end of the lower portion of the left front-wheel support unit and the right end of the right front-wheel support unit in the left-right direction of the vehicle when viewed from the front of the vehicle while the length between the third and the fourth optical lens sections is greater than half a length that is a smaller one of a minimum width of the third optical lens section and a minimum width of the fourth optical lens section, in which the third highly-directional light unit and the fourth highly-directional light unit are fixed to the second base portion so as to maintain, when a relative position of the second base portion with respect to the body frame or the handlebar is changed, a state in which a third wall light distribution partially overlaps a fourth wall light distribution while a remaining part of the third wall light distribution does not overlap, the third wall light distribution being a light distribution drawn, by the light radiated through the third optical lens section, on the upright wall body located 10 meters forward of the vehicle from a front end of one of the third optical lens section and the fourth optical lens section that is located at a foremost position in the front-rear direction of the vehicle, the fourth wall light distribution being a light distribution drawn on the wall body by the light radiated through the fourth optical lens section, and the first highly-directional light unit to the sixth highly-directional light unit are disposed so that: the right end of the first optical lens section, the right end of the second optical lens section and the right end of the fifth optical lens section are on the left of the center of the vehicle in the left-right direction; the left end of the first optical lens section, the left end of the second optical lens section and a left end of the fifth optical lens section are on the right of a left end of the left grip in the left-right direction of the vehicle; a left end of the third optical lens section, a left end of the fourth optical lens section and a left end of the sixth optical lens section are on the right of the center of the vehicle in the left-right direction; and a right end of the third optical lens section, a right end of the fourth optical lens section and a right end of the sixth optical lens section are on the left of the right end of the right grip in the left-right direction of the vehicle.

According to the straddled vehicle of the third aspect, compared to a case where the first highly-directional light unit and the second highly-directional light unit are formed of lamp units that form light distributions using reflectors, the configuration becomes more compact with visibility from the outside improved. Moreover, when compared to a case where a third highly-directional light unit and a fourth highly-directional light unit are formed of lamp units that form light distribution using reflectors, the configuration becomes more compact with visibility from the outside improved. Thus, compared to the configuration in which two lamp units that form light distribution using reflectors radiate dipped beams respectively, it is possible to make the configuration more compact with visibility from the outside improved.

Moreover, according to the straddled vehicle of the third aspect, since the light distribution of the main beam required for the vehicle is formed by the fifth highly-directional light unit and the sixth highly-directional light unit, a structure of switching a light distribution in one highly-directional light unit becomes unnecessary. Moreover, when viewed from the front of the vehicle, the respective left ends of the first, the second, and the fifth optical lens sections are on the right side of the left end of the left grip in the left-right direction of the vehicle, and the respective right ends of the third, the fourth and the sixth optical lens sections are on the left side of the right end of the right grip in the left-right direction of the vehicle. Thus, compared to the case where the first highly-directional light unit to the sixth highly-directional light unit are formed of lamp units that form a light distribution using reflectors, it is possible to make the configuration more compact while improving the visibility from the outside.

Thus, according to the straddled vehicle of the third aspect, it is possible to limit an increase in the size of the vehicle while maintaining the light distribution required for the vehicle and to improve the visibility from outside of the vehicle.

A straddled vehicle according to a fourth aspect is the straddled vehicle according to the first aspect, in which the maximum width of the first optical lens section when viewed from the front of the vehicle is greater than 20 mm, and the maximum width of the second optical lens section when viewed from the front of the vehicle is greater than 20 mm.

In the vehicle, it is known that, when the distance between the directional indicator having 250 candelas to 400 candelas and the headlight that radiates a main beam or dipped beam is greater than 20 mm, the directional indicator and the headlight that radiates the main beam or dipped beam become more distinguishable from each other. According to the straddled vehicle of the fourth aspect, since the maximum width of each of the first and the second optical lens sections of the first and the second highly-directional light units is greater than 20 mm, the visibility of the first and the second optical lens sections of the first and the second highly-directional light units from outside the straddled vehicle improves surely. Thus, according to the straddled vehicle of the fourth aspect, it is possible to limit an increase in the size of the vehicle while maintaining the light distribution required for the vehicle and surely improve the visibility from outside of the vehicle.

A straddled vehicle according to the straddled vehicle according to the third aspect, in which, when viewed from the front of the vehicle, the maximum width of the first optical lens section, the maximum width of the second optical lens section, the maximum width of the fifth optical lens section, the maximum width of the third optical lens section, the maximum width of the fourth optical lens section and the maximum width of the sixth optical lens section are each greater than 20 mm.

In the vehicle, it is known that, when the distance between the directional indicator having 250 candelas to 400 candelas and the headlight that radiates a main beam or dipped beam is greater than 20 mm, the directional indicator and the headlight that radiates the main beam or dipped beam become more distinguishable from each other. According to the straddled vehicle of the fifth aspect, since the maximum widths of the respective optical lens sections of the first highly-directional light unit to the sixth highly-directional light unit are each greater than 20 mm, the visibility from outside of the straddled vehicles improves surely. According to the straddled vehicle of the fifth aspect, it is possible to limit an increase in the size of the vehicle while maintaining the light distribution required for the vehicle and reliably improve the visibility from outside of the vehicle.

A straddled vehicle according to a sixth aspect is the straddled vehicle according to the first aspect, in which, at least one or at least part of an electric and/or electronic component other than the highly-directional light unit, among a throttle wire, a brake wire, a brake hose, a clutch wire, a wire harness, and a key cylinder is disposed so as to overlap a region between the first optical lens section and the second optical lens section when viewed from the front of the vehicle.

According to the straddled vehicle of the sixth aspect, the above-described other components can be arranged between the first and the second optical lens sections of the first and the second highly-directional light units when viewed from the front of the vehicle. Since a plurality of light-emitting regions are provided and the visibility from outside of the vehicle is improved while making the configuration more compact, a certain distance is provided between the first highly-directional light unit and the second highly-directional light unit, generating some allowance in this distance and the space in the rear of the vehicle in the front-rear direction. Arranging the above-described other components using some allowance of this space makes it possible to limit an increase in the size of the body of the straddled vehicle in the front-rear direction. Thus, according to the straddled vehicle of the sixth aspect, it is possible to limit an increase in the size of the straddled vehicle while maintaining the light distribution required for the vehicle and reliably improve the visibility from outside of the vehicle.

A straddled vehicle according to a seventh aspect is the straddled vehicle according to the third aspect, in which, at least one or at least part of an electric and/or electronic part other than the highly-directional light unit, among a throttle wire, a brake wire, a brake hose, a clutch wire, a wire harness, and a key cylinder is disposed so as to overlap a region between the third optical lens section and the fourth optical lens section when viewed from the front of the vehicle.

According to the straddled vehicle of the seventh aspect, it is possible to dispose the above-described other components between the third optical lens section of the third highly-directional light unit and the fourth optical lens section of the fourth highly-directional light unit when viewed from the front of the vehicle. Since a plurality of light-emitting regions are provided and the visibility from outside of the vehicle is improved while making the configuration more compact, a certain distance is provided between the third highly-directional light unit and the fourth highly-directional light unit and some allowance is generated in this distance and the space in the rear of the vehicle in the front-rear direction. Arranging the above-described other components using some allowance of this space makes it possible to limit an increase in the size of the body of the straddled vehicle in the front-rear direction. Thus, according to the straddled vehicle of the seventh aspect, it is possible to limit an increase in the size of the straddled vehicle while maintaining the light distribution required for the vehicle and reliably improve the visibility from outside of the vehicle.

Advantageous Effects of Invention

According to the present invention, it is possible to limit an increase in the size of the vehicle while maintaining the light distribution required for the vehicle and to improve the visibility from outside of the vehicle which is turnable leftward with the body frame tilted leftward in the left-right direction of the vehicle and turnable rightward with the body frame tilted rightward in the left-right direction of the vehicle.

DESCRIPTION OF EMBODIMENTS

Figure 1:
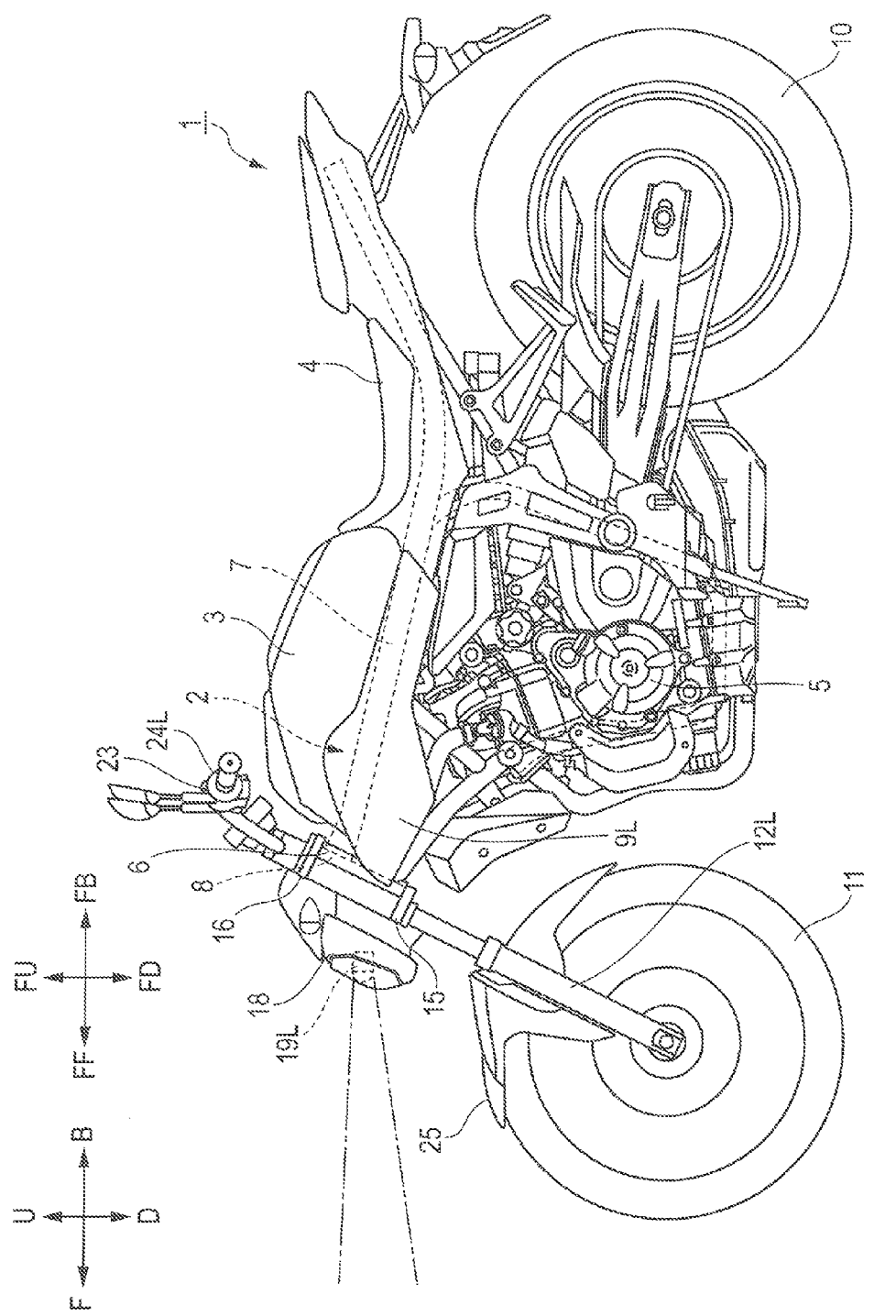
FIG. 1 is a side view illustrating a straddled vehicle according to Embodiment 1 of the present invention.

Hereinafter, embodiments of the present invention will be described in detail with reference to the accompanying drawings.

<Definitions of Directions>

Hereinafter, arrow F in drawings denotes a front direction of a vehicle and arrow B denotes a rear (or back) direction of the vehicle. Arrow U denotes an upward direction of the vehicle and arrow D denotes a downward direction of the vehicle. Arrow R denotes a right direction of the vehicle and arrow L denotes a left direction of the vehicle. Note that the vehicle turns by tilting body frame 2 in a left-right direction of the vehicle with respect to a vertical direction. In addition to the directions of the vehicle, directions relative to body frame 2 are defined. Arrow FF in the drawing denotes a front direction relative to body frame 2 and arrow FB denotes a rear direction relative to body frame 2. Arrow FU denotes an upward direction relative to body frame 2 and arrow FD denotes a downward direction relative to body frame 2. Arrow FR denotes a right direction relative to body frame 2 and arrow FL denotes a left direction relative to body frame 2.

In the present specification, the front-rear direction of the vehicle, the up-down direction of the vehicle and the left-right direction of the vehicle refer to the front-rear, left-right and up-down directions as viewed from a rider who operates the vehicle and are directions relative to straddled vehicle 1. In the specification and the claims, when a direction relative to straddled vehicle 1 is indicated, the direction indicates a direction when straddled vehicle 1 is in an upright state. In the specification, the upright state refers to a state in which the up-down direction of body frame 2 coincides with the vertical direction without steering handlebar 23.

In the specification, the front-rear direction of body frame 2, the up-down direction of body frame 2 and the left-right direction of body frame 2 are front-rear, left-right and up-down directions as viewed from the rider who operates straddled vehicle 1, and are directions relative to body frame 2. When straddled vehicle 1 is in the upright state, the direction of straddled vehicle 1 coincides with the direction of body frame 2.

Embodiment 1

Figure 2:
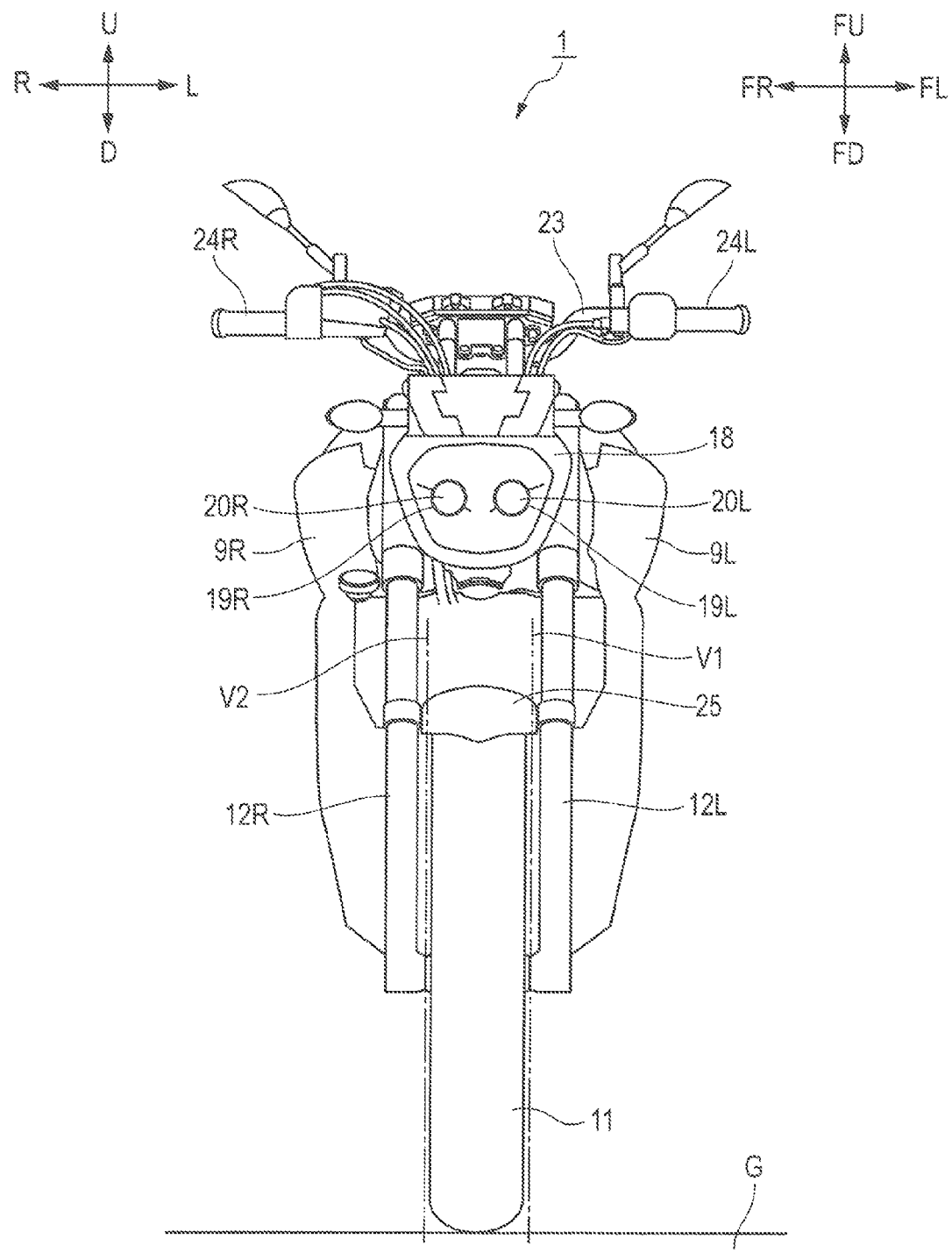
FIG. 2 is a front view of the straddled vehicle according to Embodiment 1 of the present invention.
Figure 3:
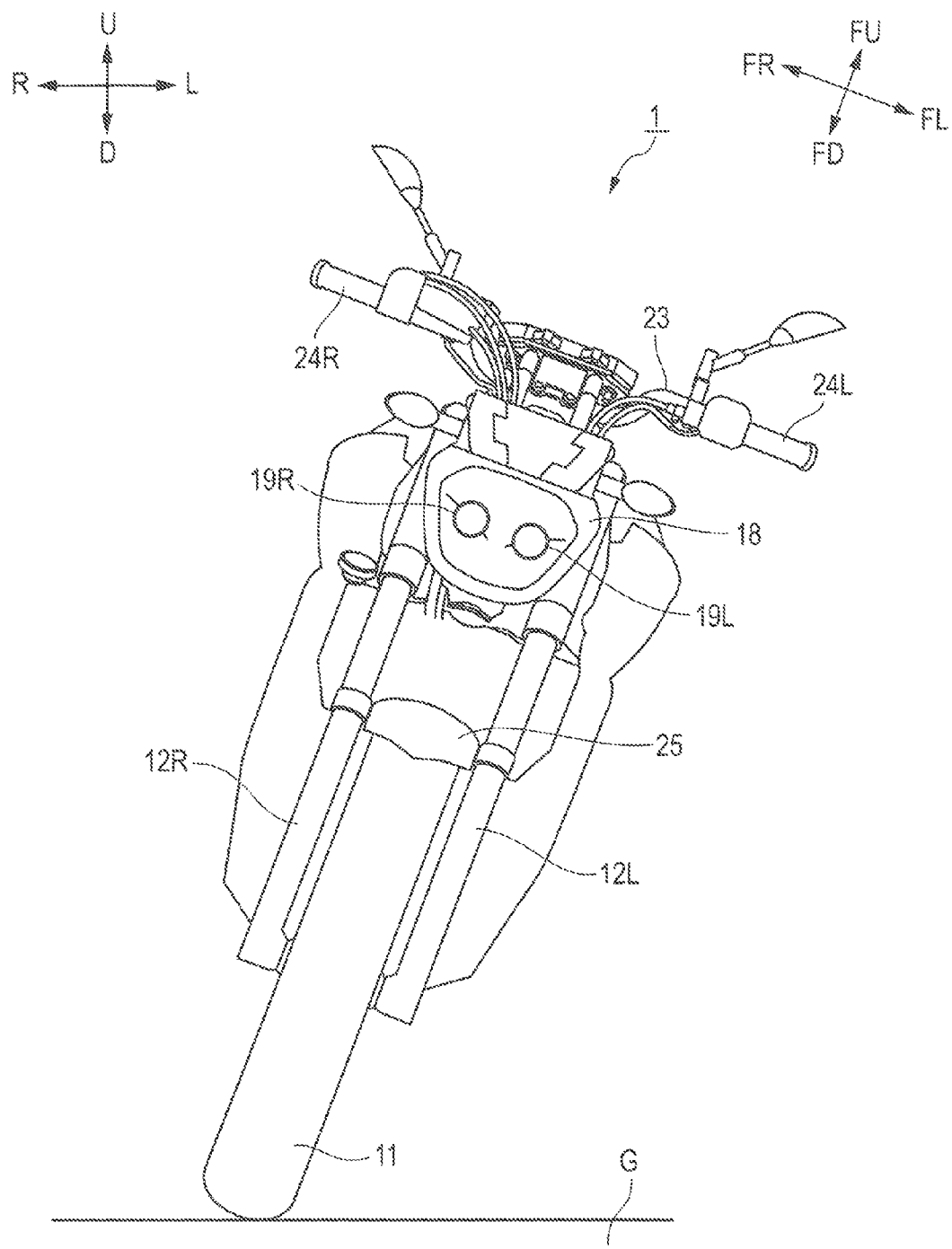
FIG. 3 is a front view of the straddled vehicle according to Embodiment 1 of the present invention during a left turn.

FIG. 1 is a side view illustrating a straddled vehicle according to Embodiment 1 of the present invention. FIG. 2 is a front view of the straddled vehicle according to Embodiment 1 of the present invention. FIG. 3 is a front view of the straddled vehicle according to Embodiment 1 of the present invention during a left turn.

As shown in FIG. 1, straddled vehicle 1 includes body frame 2, fuel tank 3, seat 4, and power unit 5. Straddled vehicle 1 is a naked type straddled vehicle that is capable of tiling (hereinafter, referred to as tiltable) and turnable.

Body frame 2 includes head pipe 6 and body frame 7. Body frame 7 is connected to head pipe 6 and disposed behind head pipe 6 in the front-rear direction of the vehicle.

Fuel tank 3 is disposed behind head pipe 6 in the front-rear direction of the vehicle. Fuel tank 3 is disposed above body frame 7 in the up-down direction of the vehicle. Seat 4 is disposed behind fuel tank 3 in the front-rear direction of the vehicle. Seat 4 is disposed above body frame 7 in the up-down direction of the vehicle.

Power unit 5 includes an engine section, a crank section and a transmission section. Power unit 5 is disposed below fuel tank 3 in the up-down direction of the vehicle. Power unit 5 is supported by body frame 7.

As shown in FIG. 1 and FIG. 2, straddled vehicle 1 includes steering shaft 8, left cover portion 9L, right cover portion 9R, rear wheel 10, front wheel 11, left front-wheel support unit 12L, right front-wheel support unit 12R, lower bracket 15, upper bracket 16, lamp unit 18, handlebar 23, left grip 24L, right grip 24R and fender 25. Since straddled vehicle 1 of Embodiment 1 has one front wheel 11, front wheel 11 means the front wheel portion. Hereinafter, each component will be described.

Handlebar 23 is long in the left-right direction of the vehicle and turns integrally with steering shaft 8 through steering by the rider. Left grip 24L to be gripped by the rider is disposed on the left side of handlebar 23. Right grip 24R to be gripped by the rider is disposed on the right side of handlebar 23.

Steering shaft 8 is supported by body frame 2 so as to be turnable. For example, steering shaft 8 is inserted into a hole of head pipe 6 and turns around a central axial line of head pipe 6.

Left cover portion 9L covers at least the left side of body frame 2. Right cover portion 9R covers at least the right side of body frame 2.

Figure 4:
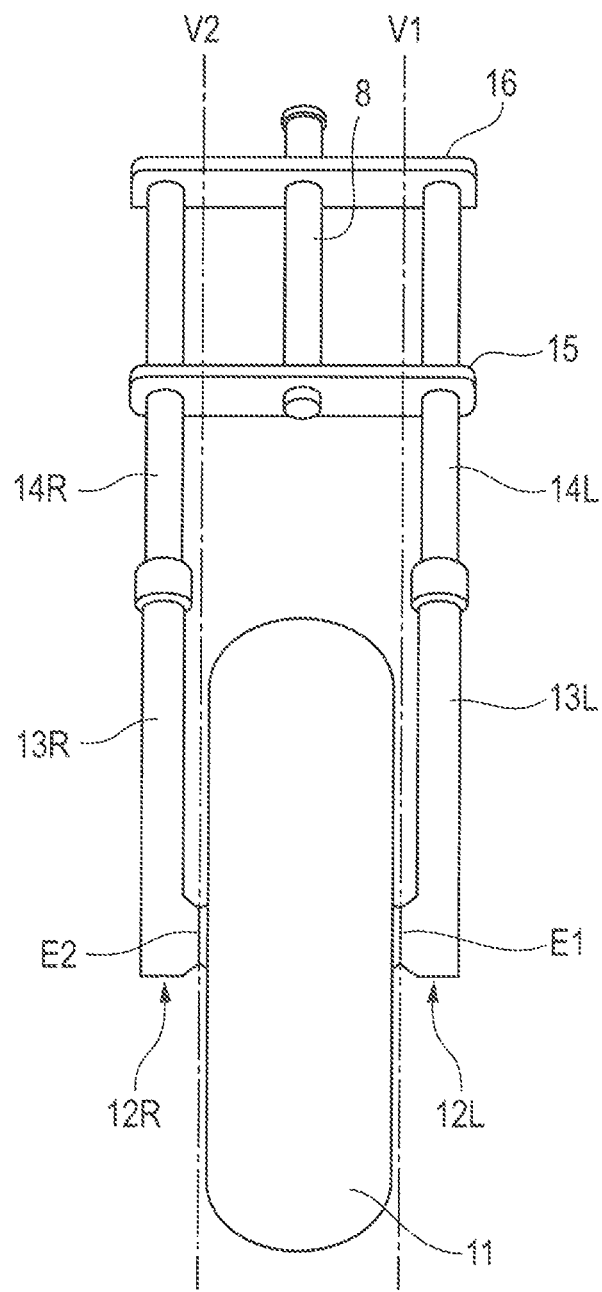
FIG. 4 is a front view for describing a left front-wheel support unit and a right front-wheel support unit of the straddled vehicle according to Embodiment 1 of the present invention.

FIG. 4 is a front view for describing left front-wheel support unit 12L and right front-wheel support unit 12R.

Left front-wheel support unit 12L and right front-wheel support unit 12R are disposed in pairs on left and right sides and support front wheel 11 in a manner that makes front wheel 11 rotatable. Left front-wheel support unit 12L and right front-wheel support unit 12R fixedly support fender 25 that covers the upper part of front wheel 11 in the up-down direction of the vehicle.

As shown in FIG. 4, left front-wheel support unit 12L is located on the left side of steering shaft 8 in the left-right direction of the vehicle. Left front-wheel support unit 12L includes upper member 14L supported by upper bracket 16 and lower member 13L which supports front wheel 11 and is displaceable with respect to upper member 14L in the up-down direction of the vehicle.

As shown in FIG. 4, right front-wheel support unit 12R is located on the right side of steering shaft 8 in the left-right direction of the vehicle. Right front-wheel support unit 12R includes upper member 14R supported by upper bracket 16 and lower member 13R which supports front wheel 11 and is displaceable with respect to upper member 14R in the up-down direction of the vehicle.

In FIG. 4, virtual line V1 is a line that passes through right end E1 in the lower part of lower member 13L of left front-wheel support unit 12L and extends vertically. Virtual line V2 is a line that passes through left end E2 in the lower part of lower member 13R of right front-wheel support unit 12R and extends vertically. As will be described later, virtual lines V1 and V2 are used to define dimensional conditions and interval conditions with respect to first and second highly-directional light units 19L and 19R.

Both right-front and left front-wheel support units 12R and 12L may be internally provided with a spring and a damper. Alternatively, one of right-front and left front-wheel support units 12R and 12L may be provided with a spring and the other may be provided with a damper. Alternatively, one of right-front and left front-wheel support units 12R and 12L may be provided with a spring and a damper and the other may be provided with neither spring nor damper.

A left portion of lower bracket 15 is connected to a lower portion of upper member 14L of left front-wheel support unit 12L and a right portion thereof is connected to a lower portion of upper member 14R of right front-wheel support unit 12R, and a center portion thereof is connected to a lower portion of steering shaft 8.

A left portion of upper bracket 16 is connected to an upper portion of upper member 14L of left front-wheel support unit 12L and a right portion thereof is connected to an upper portion of upper member 14R of right front-wheel support unit 12R, and a center portion thereof is connected to an upper portion of steering shaft 8.

Lower bracket 15 and upper bracket 16 are fixedly supported by steering shaft 8. Lower bracket 15 fixedly supports left front-wheel support unit 12L and right front-wheel support unit 12R. Upper bracket 16 fixedly supports left front-wheel support unit 12L, right front-wheel support unit 12R and handlebar 23. Thus, upper member 14L, which is an upper part of left front-wheel support unit 12L, is supported by body frame 2 via lower bracket 15, upper bracket 16 and steering shaft 8. Upper member 14R, which is an upper part of right front-wheel support unit 12R, is supported by body frame 2 via lower bracket 15, upper bracket 16 and steering shaft 8.

As shown in FIG. 3, when the rider steers handlebar 23 to turn straddled vehicle 1 leftward, left front-wheel support unit 12L and right front-wheel support unit 12R tilt to the left of the vehicle with respect to ground G together with front wheel 11. Similarly, when the rider steers handlebar 23 to turn straddled vehicle 1 rightward, left front-wheel support unit 12L and right front-wheel support unit 12R tilt to the right of the vehicle with respect to ground G together with front wheel 11.

Lamp unit 18 includes first highly-directional light unit 19L and second highly-directional light unit 19R that radiate light. Lamp unit 18 radiates a dipped beam or main beam. Lamp unit 18 is disposed forward of handlebar 23 in the front-rear direction of the vehicle and above front wheel 11 in the up-down direction of the vehicle. Lamp unit 18 is supported by handlebar 23 or upper bracket 16. The support for lamp unit 18 includes direct support and indirect support via another part or a bracket or the like.

Here, the main beam refers to a beam that radiates light onto a region of the same level or higher than that of the center of lamp unit 18 in illumination of the headlight that illuminates forward of the vehicle to allow straddled vehicle 1 to travel even in the darkness. On the other hand, the dipped beam refers to a restrained beam that radiates light onto a region of the same level or higher than that of the center of lamp unit 18 in illumination of the headlight that illuminates forward of the vehicle to allow straddled vehicle 1 to travel even in the darkness so as not to dazzle the driver of the vehicle coming on the opposite side.

<Light Distribution>

Figure 5A:
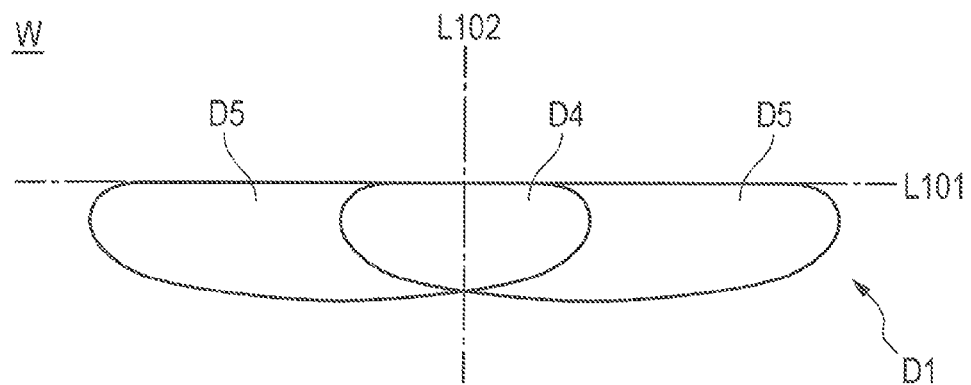
FIGS. 5A to 5C are diagrams illustrating light distribution of a lamp unit of the straddled vehicle according to Embodiment 1 of the present invention.
Figure 5B:
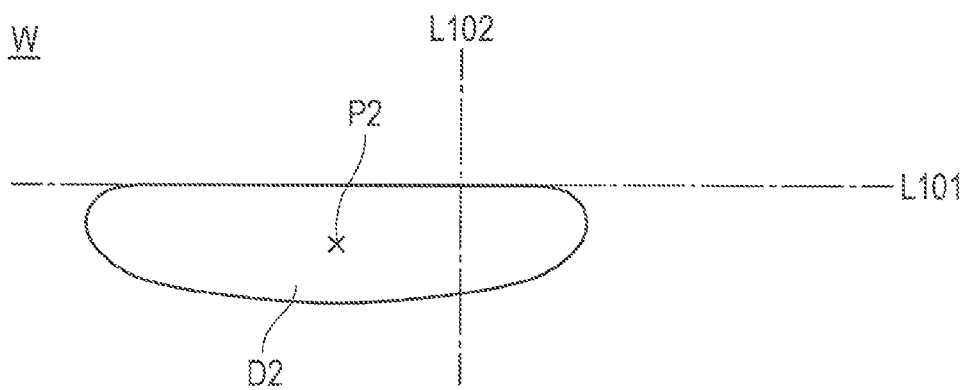
Figure 5C:
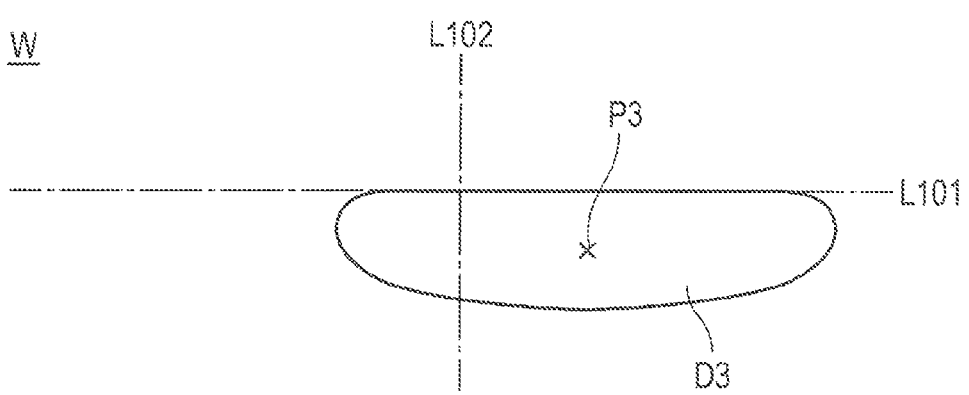

FIGS. 5A to 5C are diagrams illustrating light distribution of a lamp unit of the straddled vehicle according to Embodiment 1 of the present invention. FIG. 5A illustrates light distributions formed by both first and second optical lens section 20L and 20R of first and second highly-directional light unit 19L and 19R. FIG. 5B illustrates a light distribution formed by first optical lens section 20L of first highly-directional light unit 19L. FIG. 5C illustrates a light distribution formed by second optical lens section 20R of second highly-directional light unit 19R.

When lamp unit 18 radiates light onto wall body W, light distribution D1 of a dipped beam is obtained as shown in FIG. 5A.

Here, suppose that wall body W is located 10 m away from the foremost end of first highly-directional light unit 19L and second highly-directional light unit 19R in the front-rear direction of the vehicle and positioned toward straddled vehicle 1 and stands upright. In FIG. 5A to FIG. 5C, virtual line L101 represents a line along which a horizontal plane passing through the center of lamp unit 18 crosses wall body W while straddled vehicle 1 is in an upright state. Virtual line L102 represents a line along which a vertical plane passing through the center of lamp unit 18 and extending in the front-rear direction and the up-down direction of the vehicle crosses wall body W while straddled vehicle 1 is in an upright state. The same relationship between wall body W and virtual lines L101 and L102 applies to FIGS. 6A to 8C.

Light distribution D1 of the dipped beam includes region D5 located vertically below virtual line L101 where light of predetermined intensity spreads in the left-right direction of the vehicle and region D4 located vertically below virtual line L101 where intensity thereof is higher than in region D5 in a range at the center in the left-right direction of the vehicle.

Light distribution D1 of the dipped beam is formed of first wall light distribution D2 shown in FIG. 5B drawn on wall body W by the light passing through first optical lens section 20L of first highly-directional light unit 19L and second wall light distribution D3 shown in FIG. 5C drawn on wall body W by the light passing through second optical lens section 20R of second highly-directional light unit 19R overlapping each other. Regarding first highly-directional light unit 19L and second highly-directional light unit 19R, when one turns on, the other also turns on, and when one turns off, the other also turns off. Thus, when lamp unit 18 is on, both first and second highly-directional light units 19L and 19R are on, and light distribution D1 of the dipped beam shown in FIG. 5A is obtained.

Part of the light of first wall light distribution D2 by first highly-directional light unit 19L overlaps the light of second wall light distribution D3 by second highly-directional light unit 19R and the remaining part does not overlap the light of second wall light distribution D3 by second highly-directional light unit 19R. Part of the light of second wall light distribution D3 by second highly-directional light unit 19R overlaps the light of first wall light distribution D2 by first highly-directional light unit 19L and the remaining part does not overlap the light of first wall light distribution D2 by first highly-directional light unit 19L. First wall light distribution D2 by first highly-directional light unit 19L and second wall light distribution D3 by second highly-directional light unit 19R have the same shape but have different center positions P2 and P3.

Here, having the same light distribution shape means having the same light distribution shape in terms of design concept and does not include any difference due to a design error. Having different light distribution center positions means having different positions in terms of design concept and does not include any difference due to a design error. The expression "part of light distribution overlaps but the remaining part does not overlap" means, that part of light distribution is overlapped but the remaining part is not overlapped and does not include overlapping due to a design error in terms of design concept.

Note that regarding the light distribution of lamp unit 18, Variation 1 to Variation 3 to be described next may be adopted.

<Variation 1 of Light Distribution>

Figure 6A:
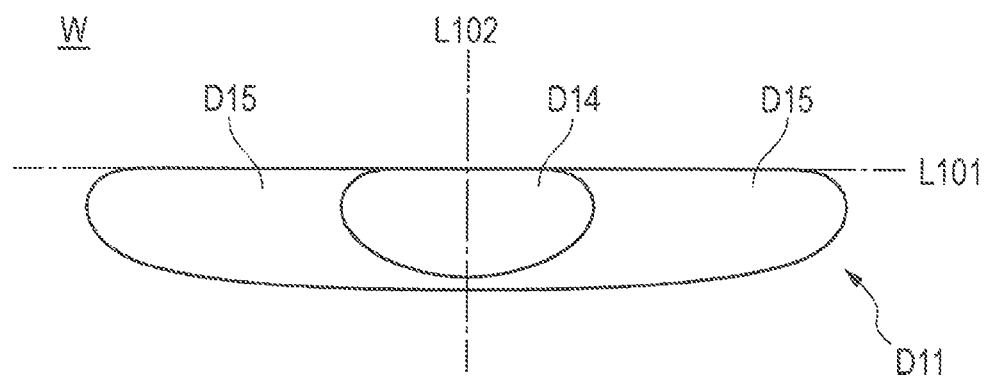
FIGS. 6A to 6C are diagrams illustrating Variation 1 of light distribution of the lamp unit of the straddled vehicle according to Embodiment 1 of the present invention.
Figure 6B:
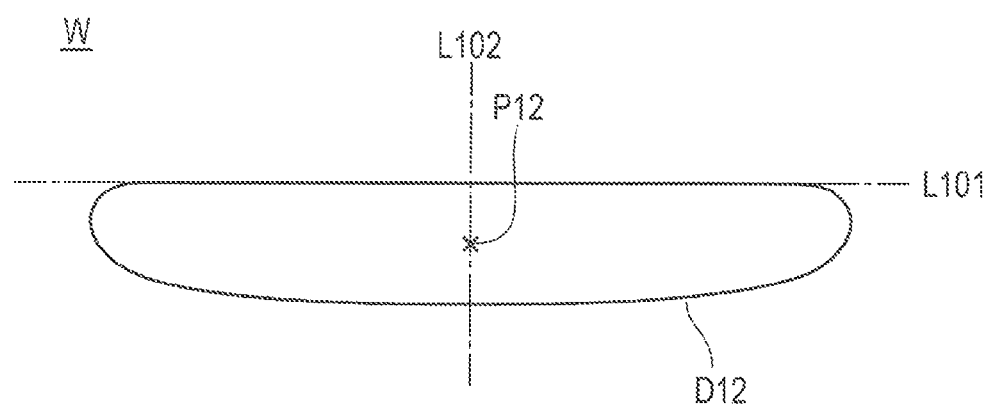
Figure 6C:
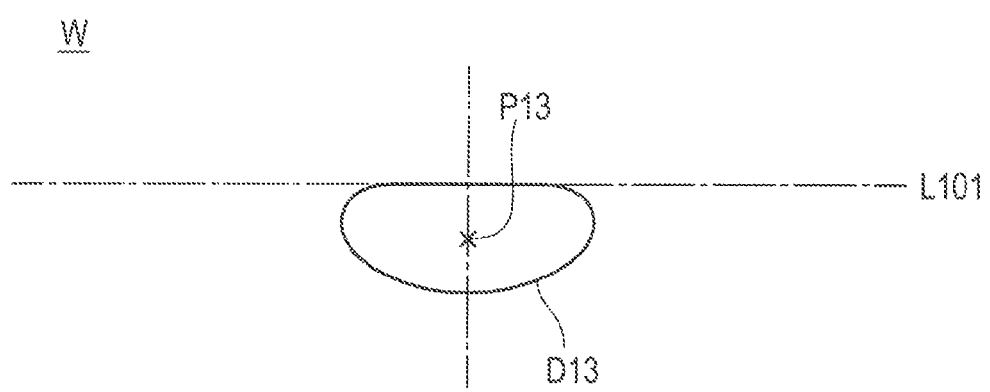

FIGS. 6A to 6C are diagrams illustrating Variation 1 of the light distribution of the lamp unit of the straddled vehicle according to Embodiment 1 of the present invention. FIG. 6A illustrates light distributions formed by both first and second optical lens sections 20L and 20R of first and second highly-directional light units 19L and 19R. FIG. 6B illustrates a light distribution formed by first optical lens section 20L of first highly-directional light unit 19L. FIG. 6C illustrates a light distribution formed by second optical lens section 20R of second highly-directional light unit 19R.

In Variation 1, when light is radiated from lamp unit 18 onto wall body W, light distribution D11 of a dipped beam is obtained as shown in FIG. 6A.

Light distribution D11 of the dipped beam includes region D15 located vertically below virtual line L101 where light of a predetermined intensity spreads in the left-right direction of the vehicle and region D14 located vertically below virtual line L101 where the intensity thereof is higher than in region D15 in a range at the center in the left-right direction of the vehicle vertically below virtual line L101.

Light distribution D11 of the dipped beam is formed of first wall light distribution D12 shown in FIG. 6B, which is a light distribution drawn on wall body W by the light passing through first optical lens section 20L of first highly-directional light unit 19L and second wall light distribution D13 shown in FIG. 6C, which is a light distribution drawn on wall body W by the light passing through second optical lens section 20R of second highly-directional light unit 19R, overlapping each other. Regarding first and second highly-directional light units 19L and 19R, when one turns on, the other also turns on, and when one turns off, the other also turns off. Thus, when lamp unit 18 is on, both first and second highly-directional light units 19L and 19R are on and light distribution D11 of the dipped beam shown in FIG. 6A is obtained.

Part of the light of first wall light distribution D12 by first highly-directional light unit 19L overlaps the light of second wall light distribution D13 by second highly-directional light unit 19R and the remaining part does not overlap the light of second wall light distribution D13 by second highly-directional light unit 19R. The whole of the light of second wall light distribution D13 by second highly-directional light unit 19R overlaps the light of first wall light distribution D12 by first highly-directional light unit 19L. First wall light distribution D12 by first highly-directional light unit 19L and second wall light distribution D13 by second highly-directional light unit 19R have different shapes. Different shapes include shapes with different contours and shapes in different sizes. First wall light distribution D12 by first highly-directional light unit 19L and second wall light distribution D13 by second highly-directional light unit 19R may have center positions P12 and P13 which are identical to each other.

Here, having different shapes of light distribution means having different shapes of light distribution in terms of design concept and does not include any difference due to a design error. Having an identical position of distribution center means having an identical position in terms of design concept and does not include any difference due to a design error.

<Variation 2 of Light Distribution>

Variation 2 of light distribution shows a case where lamp unit 18 radiates a main beam required for straddled vehicle 1.

Figure 7A:
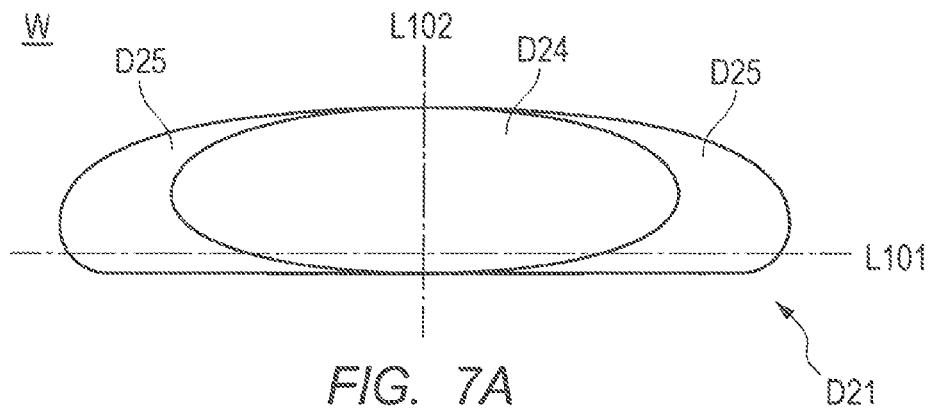
FIGS. 7A to 7C are diagrams illustrating Variation 2 of light distribution of the lamp unit of the straddled vehicle according to Embodiment 1 of the present invention.
Figure 7B:
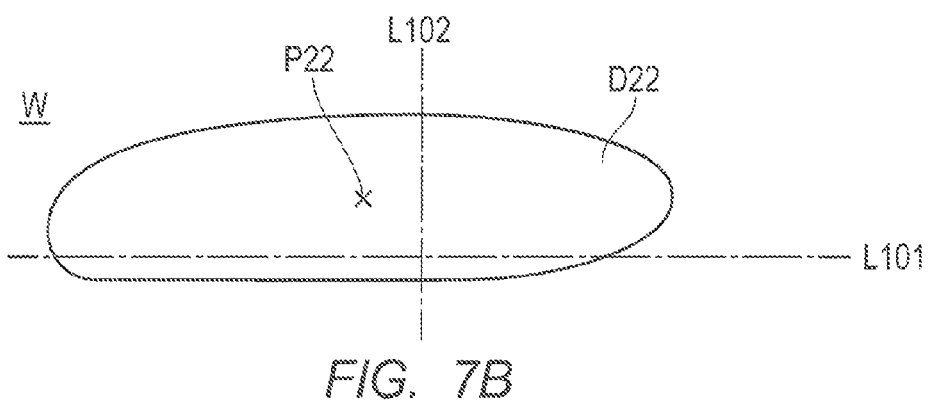
Figure 7C:
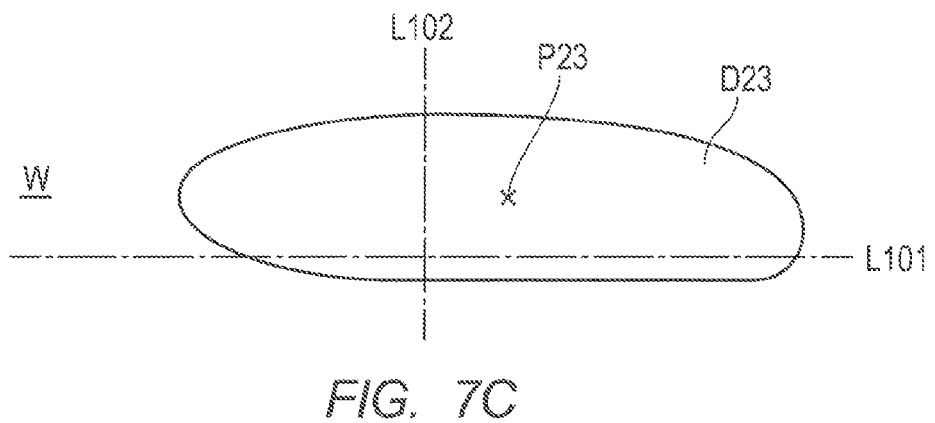

FIGS. 7A to 7C are diagrams illustrating Variation 2 of light distribution of the lamp unit of the straddled vehicle according to Embodiment 1 of the present invention. FIG. 7A illustrates light distributions formed by both first and second optical lens sections 20L and 20R of first and second highly-directional light units 19L and 19R. FIG. 7B illustrates a light distribution formed by first optical lens section 20L of first highly-directional light unit 19L. FIG. 7C illustrates a light distribution formed by second optical lens section 20R of second highly-directional light unit 19R.

In Variation 2, when lamp unit 18 radiates light onto wall body W, light distribution D21 of a main beam is obtained as shown in FIG. 7A.

Light distribution D21 of the main beam includes region D25 in which light of predetermined intensity spreads vertically above and vertically below virtual line L101 in the left-right direction of the vehicle and region D24 in which intensity is higher than in region D25 in a range at the center vertically above and vertically below virtual line L101 in the left-right direction of the vehicle.

Light distribution D21 of the main beam is formed of first wall light distribution D22 shown in FIG. 7B, which is a light distribution drawn on wall body W by light passing through first optical lens section 20L of first highly-directional light unit 19L and second wall light distribution D23 shown in FIG. 7C which is a light distribution drawn on wall body W by light passing through second optical lens section 20R of second highly-directional light unit 19R, overlapping each other. Regarding first and second highly-directional light unit 19L and 19R, when one turns on, the other also turns on, and when one turns off, the other also turns off. Thus, when lamp unit 18 is on, both first and second highly-directional light unit 19L and 19R are on and light distribution D21 of the main beam shown in FIG. 7A is obtained.

Part of the light of first wall light distribution D22 by first highly-directional light unit 19L overlaps the light of second wall light distribution D23 by second highly-directional light unit 19R and the remaining part does not overlap the light of second wall light distribution D23 by second highly-directional light unit 19R. Part of the light of second wall light distribution D23 by second highly-directional light unit 19R overlaps the light of first wall light distribution D22 by first highly-directional light unit 19L and the remaining part does not overlap the light of first wall light distribution D22 by first highly-directional light unit 19L. When right and left are reversed, first wall light distribution D22 by first highly-directional light unit 19L and second wall light distribution D23 by second highly-directional light unit 19R have an identical shape but have different center positions P22 and P23.

Here, having an identical shape of light distribution means having an identical shape of light distribution in terms of design concept and does not include any difference due to a design error. Moreover, having different center positions of light distribution means having different positions in terms of design concept, and does not include any difference due to a design error. That part of light distribution overlaps and the remaining part does not overlap means that part of light distribution overlaps and the remaining part does not overlap in terms of design concept, and does not include any overlapping due to a design error.

<Variation 3 of Light Distribution>

Figure 8A:
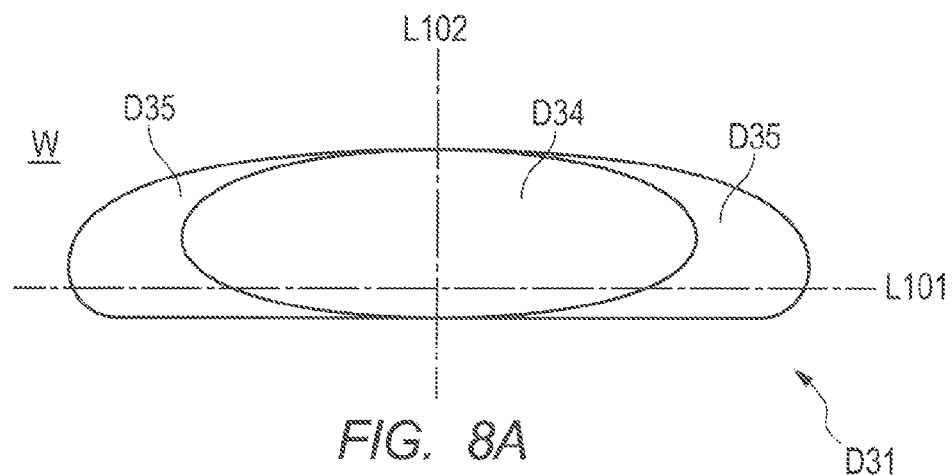
FIGS. 8 A to 8C are diagrams illustrating Variation 3 of light distribution of the lamp unit of the straddled vehicle according to Embodiment 1 of the present invention.
Figure 8B:
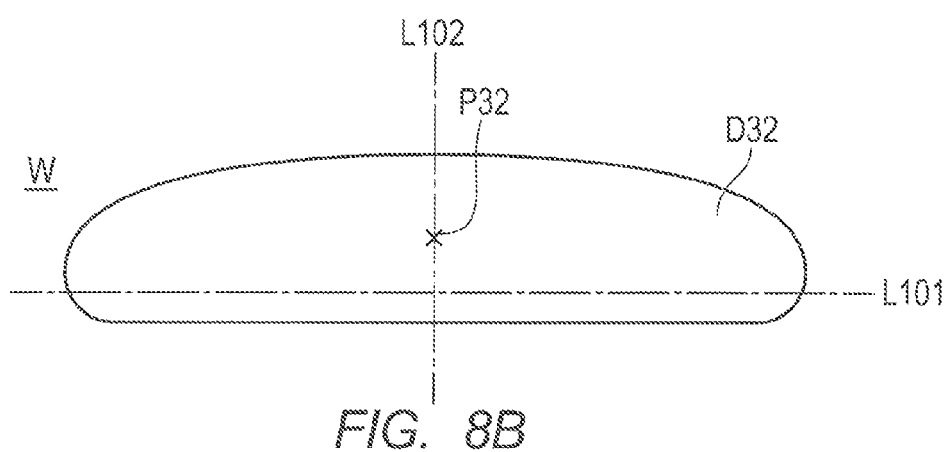
Figure 8C:
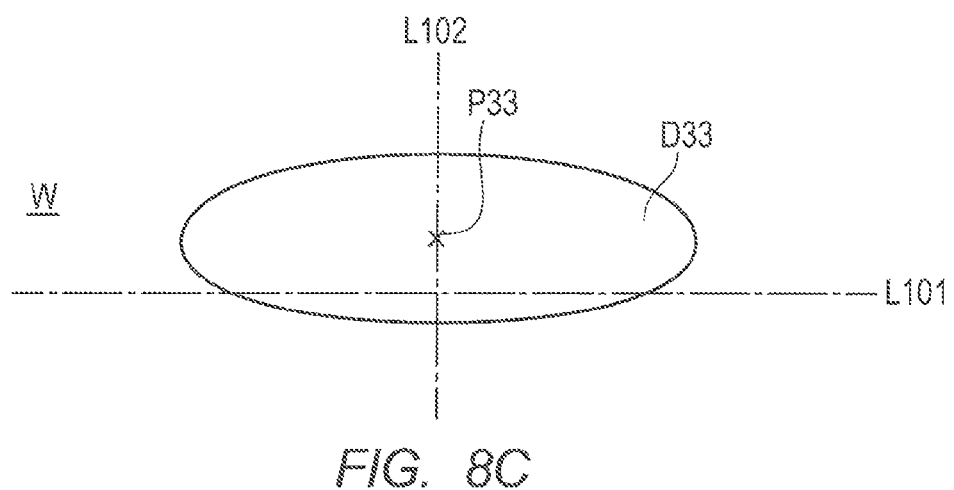

FIGS. 8A to 8C are diagrams illustrating Variation 1 of the light distribution of the lamp unit of the straddled vehicle according to Embodiment 1 of the present invention. FIG. 8A illustrates light distributions formed by first and second optical lens section 20L and 20R of first and second highly-directional light units 19L and 19R. FIG. 8B illustrates a light distribution formed by first optical lens section 20L of first highly-directional light unit 19L. FIG. 8C illustrates a light distribution formed by second optical lens section 20R of second highly-directional light unit 19R.

In Variation 3, when lamp unit 18 radiates light onto wall body W, light distribution D31 of a main beam is obtained as shown in FIG. 8A.

Light distribution D31 of the main beam includes region D35 in which light of predetermined intensity spreads vertically above and vertically below virtual line L101 in the left-right direction of the vehicle and region D34 in which intensity is higher than in region D35 in a range at the center in the left-right direction of the vehicle vertically above and vertically below virtual line L101.

Light distribution D31 of the main beam is formed of first wall light distribution D32 shown in FIG. 8B, which is a light distribution drawn on wall body W by light passing through first optical lens section 20L of first highly-directional light unit 19L, and second wall light distribution D33 shown in FIG. 8C, which is light distribution drawn on wall body W by light passing through second optical lens section 20R of second highly-directional light unit 19R, overlapping each other. Regarding first and second highly-directional light units 19L and 19R, when one turns on, the other also turns on, and when one turns off, the other also turns off. Thus, when lamp unit 18 is on, both first and second highly-directional light units 19L and 19R are on and light distribution D31 of the main beam shown in FIG. 8A is obtained.

Part of the light of first wall light distribution D32 by first highly-directional light unit 19L overlaps the light of second wall light distribution D33 by second highly-directional light unit 19R and the remaining part does not overlap the light of second wall light distribution D33 by second highly-directional light unit 19R. Substantially, the whole part of second wall light distribution D33 by second highly-directional light unit 19R overlaps first wall light distribution D32 by first highly-directional light unit 19L. First wall light distribution D32 by first highly-directional light unit 19L and second wall light distribution D33 by second highly-directional light unit 19R have different shapes. Different shapes include shapes with different contours and shapes in different sizes. First wall light distribution D32 by first highly-directional light unit 19L and second wall light distribution D33 by second highly-directional light unit 19R may have center positions P32 and P33 which are identical to each other.

Here, having different shapes of light distribution means having different shapes of light distribution in terms of design concept and does not include any difference due to a design error. Having identical distribution center positions means having identical positions in terms of design concept and does not include any difference due to a design error.

<Lamp Unit>

Figure 9:
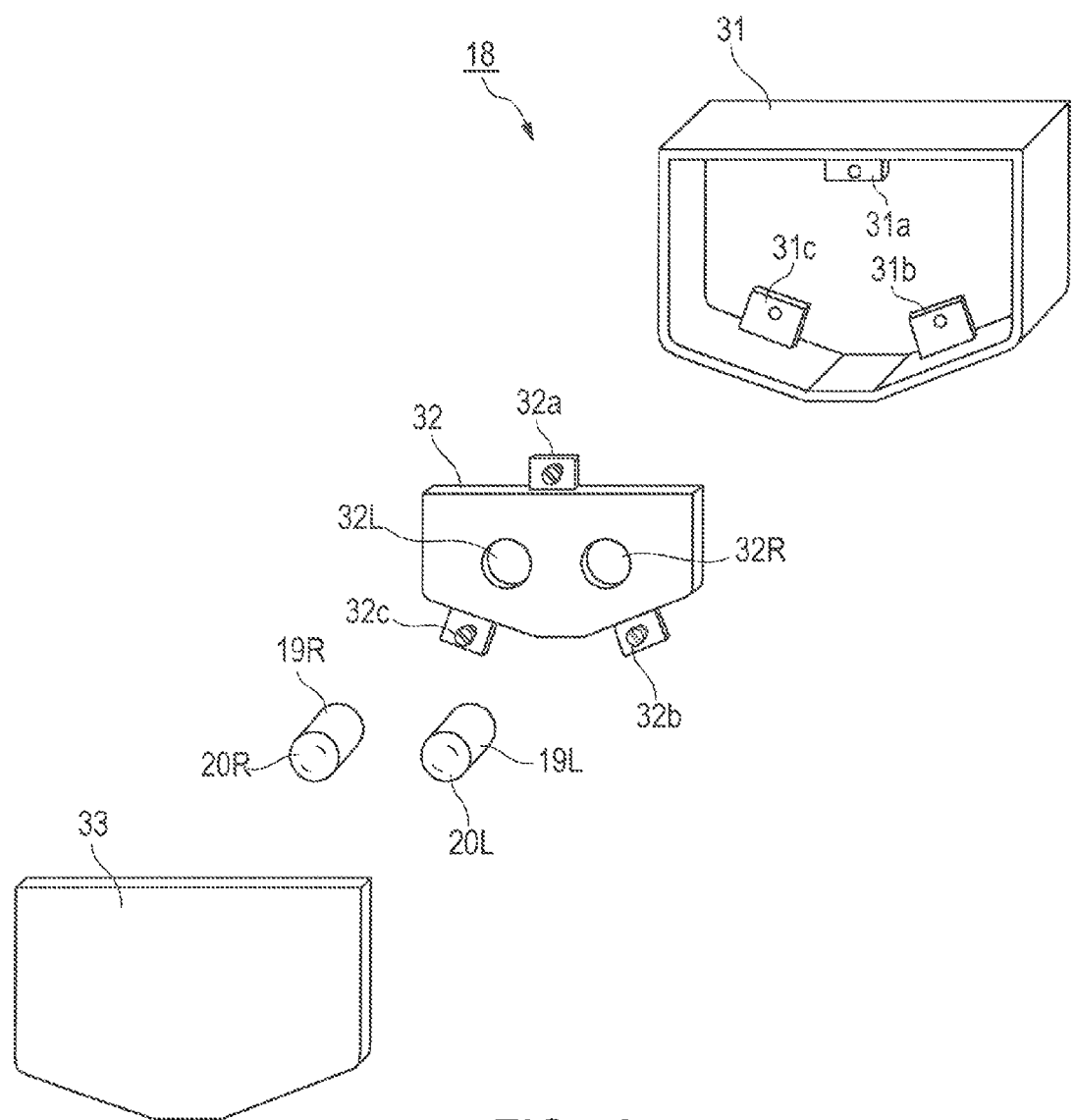
FIG. 9 is an exploded perspective view illustrating the lamp unit of the straddled vehicle according to Embodiment 1 of the present invention.
Figure 10A:
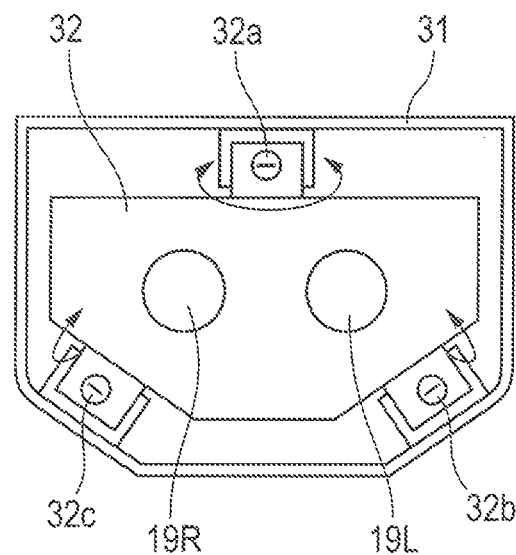
FIGS. 10A and 10B are a front view and a perspective view as viewed from a side illustrating the lamp unit of the straddled vehicle according to Embodiment 1 of the present invention.
Figure 10B:
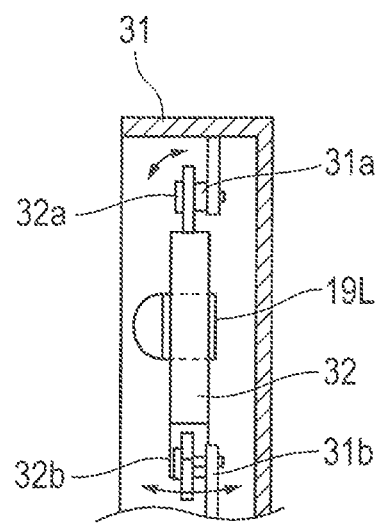

FIG. 9 is an exploded perspective view illustrating the lamp unit of the straddled vehicle according to Embodiment 1 of the present invention. FIG. 10A is a front view illustrating the lamp unit of the straddled vehicle according to Embodiment 1 of the present invention and FIG. 10B is a perspective view as viewed from the side face thereof.

Lamp unit 18 includes casing 31, base portion 32, first highly-directional light unit 19L, second highly-directional light unit 19R and outer cover 33.

Casing 31 covers at least side faces of first and second highly-directional light units 19L and 19R, and an upper part in the up-down direction of the vehicle. Casing 31 includes engaged parts 31a, 31b and 31c with which base portion 32 engages at an adjustable angle. Casing 31 is directly or indirectly supported by handlebar 23 or upper bracket 16.

Base portion 32 includes fixing portions 32L and 32R that fix first highly-directional light unit 19L and second highly-directional light unit 19R. First and second highly-directional light units 19L and 19R fixed to fixing portions 32L and 32R are relatively immovable.

Base portion 32 includes engaging parts 32a, 32b and 32c that engage with engaged parts 31a, 31b and 31c of casing 31. There may be three engaging parts 32a, 32b and 32c. As shown in FIG. 10A and FIG. 10B, one engaging part 32a may engage with one engaged part 31a of casing 31 via a universal joint at any given angle. Remaining two engaging parts 32b and 32c engage with engaged parts 31b and 31c of casing 31 so that their positions are respectively adjustable in the front-rear direction of the vehicle.

The engagement described above enables base portion 32 to move relative to casing 31 without changing positions of overlapping between first wall light distribution D2 by first highly-directional light unit 19L and second wall light distribution D3 by second highly-directional light unit 19R. The relative movable direction is, for example, a turn direction around a universal joint, for example. Since casing 31 is fixedly supported by handlebar 23 or upper bracket 16, the above-described engagement enables base portion 32 to move relative to handlebar 23 or upper bracket 16. Thus, it is possible to adjust optical axes of first and second highly-directional light units 19L and 19R altogether.

Note that it is possible to change as appropriate the arrangement of engaged parts 31a, 31b and 31c of casing 31 and the arrangement of engaged parts 32a, 32b and 32c of base portion 32; for example, the arrangement may be change to three locations including a top end and bottom end at the center in the left-right direction of base portion 32 and a left end of base portion 32 in the left-right direction in the directions of the vehicle.

Outer cover 33 is transparent and fixed to casing 31 while covering the front of first and second highly-directional light units 19L and 19R in the front-rear direction of the vehicle.

<Highly-Directional Light Unit>

Figure 11A:
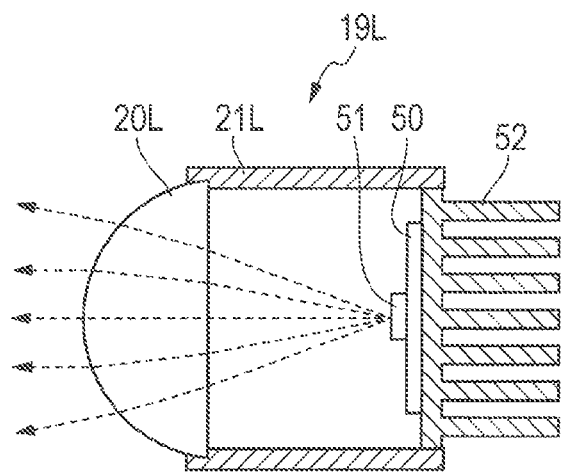
FIGS. 11A to 11C are diagrams illustrating first example A, second example B and third example C of a first highly-directional light unit of the straddled vehicle according to Embodiment 1 of the present invention.
Figure 11B:
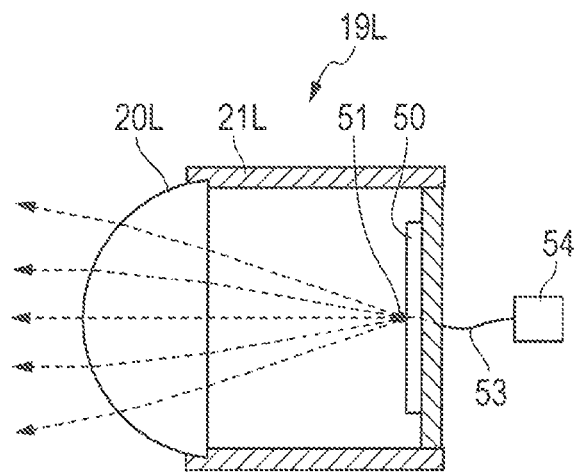
Figure 11C:
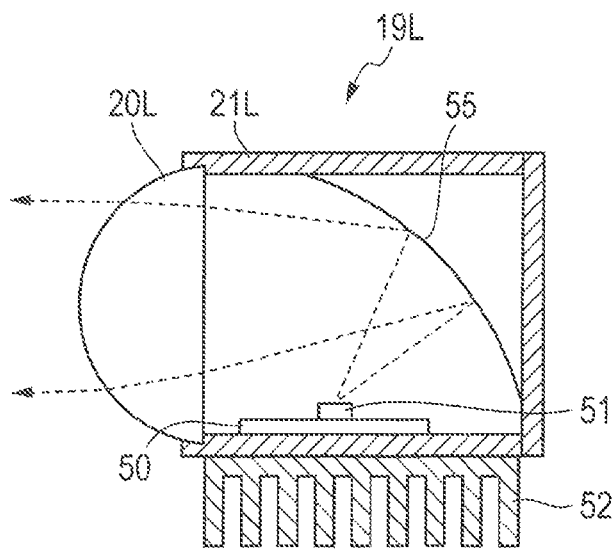

Here, detailed configuration examples of first highly-directional light unit 19L will be described using FIG. 11A to FIG. 11C. FIG. 11A to FIG. 11C are side views of first highly-directional light unit 19L.

First highly-directional light unit 19L shown in FIG. 11A to FIG. 11C is a module including one first light-emitting section 51 and one first optical lens section 20L. The term "module" means components that are replaceable as a single unit.

As shown in FIG. 11A, first highly-directional light unit 19L is provided with substrate 50 in the rear of case 21L in the front-rear direction of the vehicle. First light-emitting section 51 is disposed on an inner side surface of case 21L of substrate 50 and heat sink 52 is disposed on an outer side surface of case 21L of substrate 50.

In FIG. 11A, first light-emitting section 51 is, for example, an LED (light emitting diode) and emits highly-directional light. First optical lens section 20L refracts light of first light-emitting section 51 and forms light distribution. Light radiated outward from first optical lens section 20L makes up at least part of the main beam or dipped beam. Note that first optical lens section 20L and first light-emitting section 51 may or may not be modularized.

First highly-directional light unit 19L may also have a configuration shown in FIG. 11B or FIG. 11C.

In the configuration shown in FIG. 11B, substrate 50 holds first light-emitting section 51 which is one end of optical fiber 53. Light source 54 is connected at the other end of optical fiber 53. Light source 54 is, for example, a semiconductor laser.

In the configuration shown in FIG. 11C, substrate 50, first light-emitting section 51 (e.g., LED) and heat sink 52 are arranged on a side surface of case 21L. Reflector 55 that reflects light of first light-emitting section 51 is disposed in case 21L.

Second highly-directional light unit 19R can employ one of the configurations in FIG. 11A to FIG. 11C as in the case of first highly-directional light unit 19L. Second highly-directional light unit 19R includes second optical lens section 50R and a second light-emitting section in correspondence with first optical lens section 20L of first highly-directional light unit 19L and first light-emitting section 51.

First highly-directional light unit 19L and second highly-directional light unit 19R simultaneously turn on under the control of an electric circuit that turns on/off a power supply. That is, first highly-directional light unit 19L turns on when second highly-directional light unit 19R turns on and turns off when second highly-directional light unit 19R turns off.

<Dimensional Condition of Optical Lens Section>

Figure 12A:
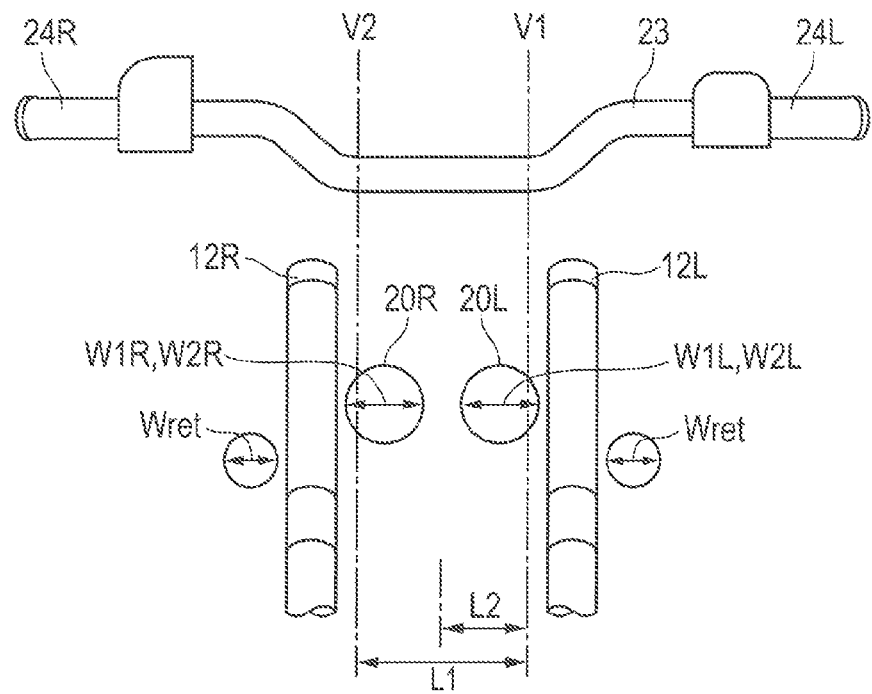
FIGS. 12A and 12B are diagrams illustrating first and second examples respectively for describing dimensional conditions of the first and the second highly-directional light units of the straddled vehicle according to Embodiment 1 of the present invention.
Figure 12B:
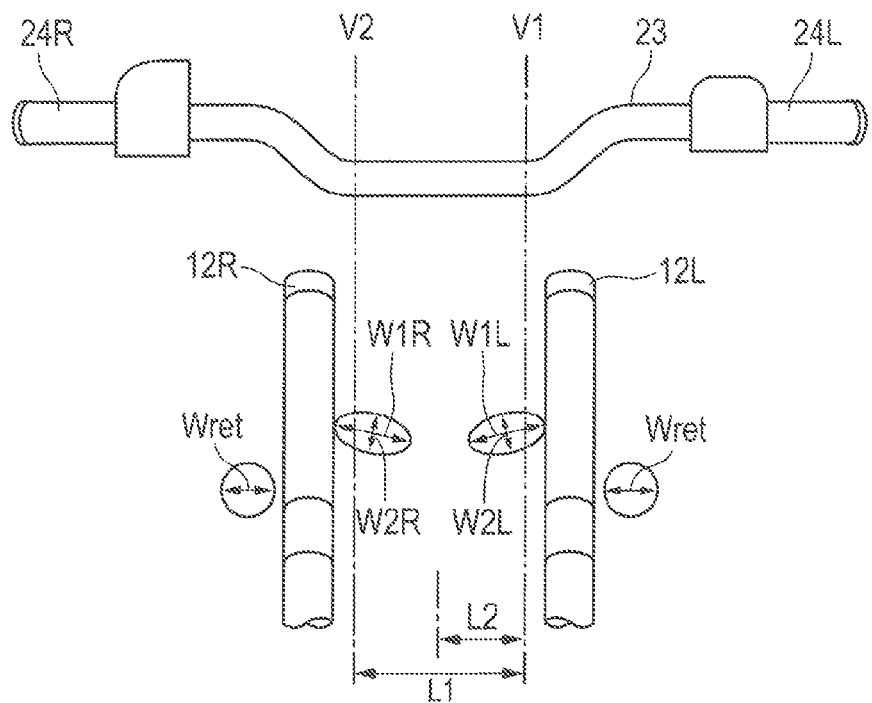

FIGS. 12A and 12B are diagrams of first and second examples for describing dimensional conditions of first and second highly-directional light units 19L and 19R of the straddled vehicle according to Embodiment 1 of the present invention. Virtual lines V1 and V2 in FIGS. 12A and 12B indicate the positions of bottom-right end E1 of left front-wheel support unit 12L and bottom-left end E2 of right front-wheel support unit 12R in the left-right direction of the vehicle (see FIG. 4).

First optical lens section 20L of first highly-directional light unit 19L and second optical lens section 20R of second highly-directional light unit 19R satisfy the following dimensional conditions.

When viewed from the front of the vehicle while straddled vehicle 1 is in an upright state, maximum width W1L of first optical lens section 20L of first highly-directional light unit 19L is smaller than L2 which is half of length L1 between virtual line V1 and virtual line V2 in the left-right direction of the vehicle (W1L<L2).

When viewed from the front of the vehicle while straddled vehicle 1 is in an upright state, maximum width W1L of first optical lens section 20L of first highly-directional light unit 19L is preferably greater than reference length Wref (20 mm) It is known that when the distance between directional indicators of 250 candelas to 400 candelas and main beam or dipped beam light devices is greater than reference length Wref, the directional indicators and the headlight that radiates a main beam or dipped beam become more distinguishable from each other. Setting maximum width W1L of first optical lens section 20L to be greater than reference length Wref can reliably improve the visibility from outside of first optical lens section 20L.

When viewed from the front of the vehicle while straddled vehicle 1 is in an upright state, maximum width W1R of second optical lens section 20R of second highly-directional light unit 19R is smaller than L2 which is half of length L1 between virtual line V1 and virtual line V2 (W1R<L2).

When viewed from the front of the vehicle while straddled vehicle 1 is in an upright state, maximum width W1R of second optical lens section 20R of second highly-directional light unit 19R is preferably greater than reference length Wref (20 mm) Reference length Wref has the length as described above. Setting maximum width W1R of second optical lens section 20R to be greater than reference length Wref can reliably improve the visibility from outside of second optical lens section 20R.

Maximum width W1L of first optical lens section 20L refers to a length corresponding to the maximum interval of two straight lines whereby the contour of first optical lens section 20L as viewed from the front of the vehicle is sandwiched from various directions, the two straight lines being mutually parallel straight lines which do not cross the contour but contact the contour. On the other hand, minimum width W2L of first optical lens section 20L refers to a length corresponding to the minimum interval of two straight lines whereby the contour of first optical lens section 20L is sandwiched from various directions, the two straight lines being mutually parallel straight lines which do not cross the contour but contact the contour. When first optical lens section 20L viewed from the front of the vehicle is a true circle, maximum width W1L is equal to minimum width W2L.

The same applies to maximum width W1R and minimum width W2R of second optical lens section 20R of second highly-directional light unit 19R.

As shown in FIG. 12B, first optical lens section 20L of first highly-directional light unit 19L may be different from a true circle, and maximum width W1L may have a shape different from that of minimum width W2L. As shown in FIG. 12B, second optical lens section 20R of second highly-directional light unit 19R may be different from a true circle, and maximum width W1R may have a shape different from that of minimum width W2R.

<Interval Condition of Optical Lens Section>

Figure 13:
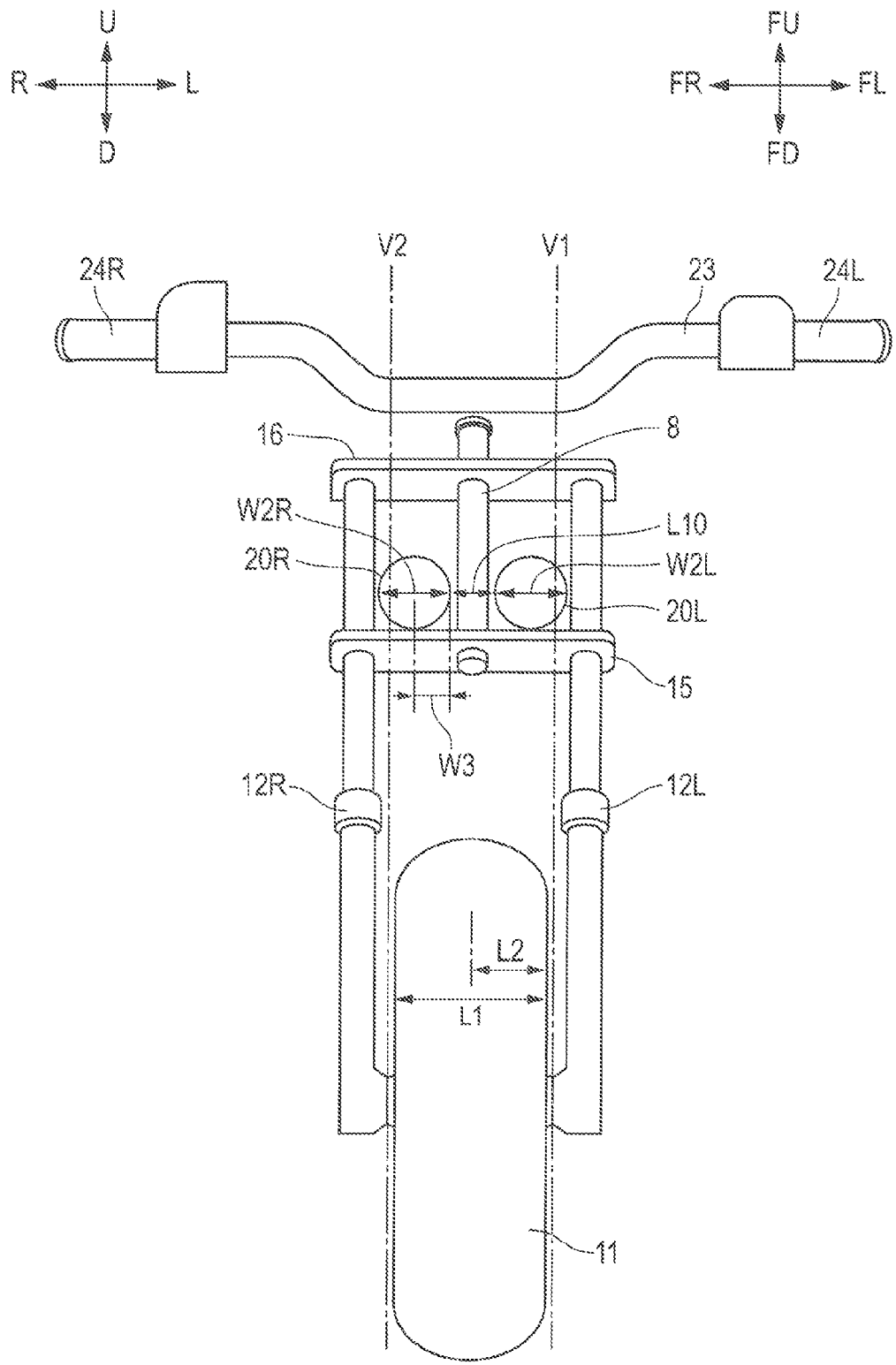
FIG. 13 is a diagram illustrating an interval condition between the first and the second highly-directional light units of the straddled vehicle according to Embodiment 1 of the present invention.

FIG. 13 is a diagram illustrating a condition of interval between first highly-directional light unit 19L and second highly-directional light unit 19R of the straddled vehicle according to Embodiment 1 of the present invention.

First and second optical lens sections 20L and 20R of first and second highly-directional light units 19L and 19R are arranged so as to satisfy the following interval conditions.

When viewed from the front of the vehicle while straddled vehicle 1 is in an upright state, length L10 between first optical lens section 20L of first highly-directional light unit 19L and second optical lens section 20R of second highly-directional light unit 19R is smaller than L2 which is half of length L1 between virtual line V1 and virtual line V2 in the left-right direction of the vehicle (L10<L2). Distance L10 is greater than W3 which is half of minimum width W2L of first optical lens section 20L of first highly-directional light unit 19L or minimum width W2R of second optical lens section 20R of second highly-directional light unit 19R, whichever is the smaller (L10>W3).

<Arrangement Condition of Optical Lens Section>

Figure 14:
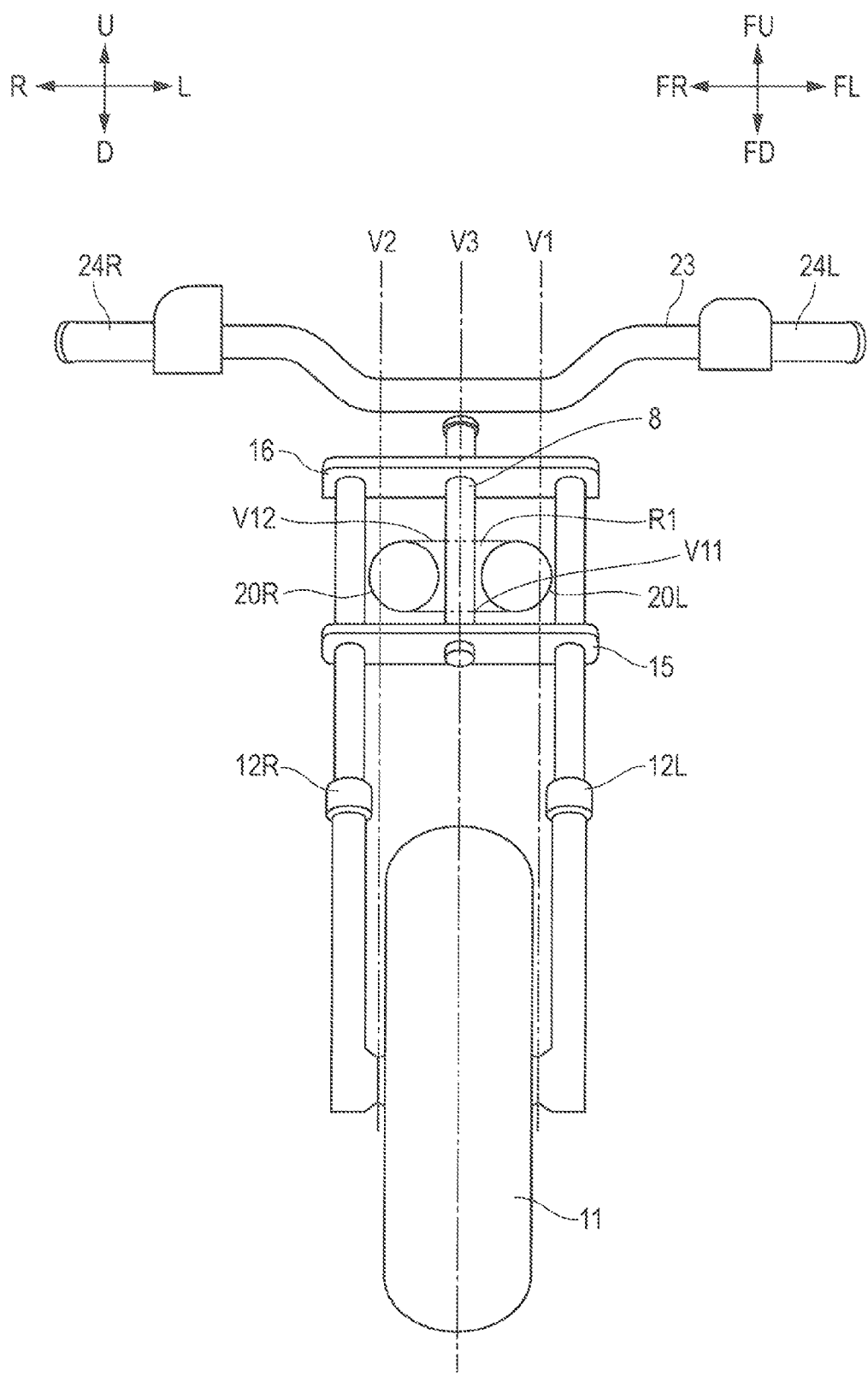
FIG. 14 is a diagram for describing arrangement conditions of the first highly-directional light unit and the second highly-directional light unit of the straddled vehicle according to Embodiment 1 of the present invention.

FIG. 14 is a diagram illustrating arrangement conditions of first highly-directional light unit 19L and second highly-directional light unit 19R of the straddled vehicle according to Embodiment 1 of the present invention.

First and second optical lens sections 20L and 20R of first and second highly-directional light units 19L and 19R are preferably arranged so as to satisfy the following arrangement conditions.

When viewed from the front of the vehicle while straddled vehicle 1 is in an upright state, region R1 between first optical lens section 20L of first highly-directional light unit 19L and second optical lens section 20R of second highly-directional light unit 19R is located at the center of straddled vehicle 1 in the left-right direction of the vehicle. In FIG. 14, region R1 is shown using virtual line V11 and virtual line V12. Region R1 is a region between first optical lens section 20L, second optical lens section 20R, virtual line V11 and virtual line V12. That is, when viewed from the front of the vehicle, region R1 overlaps virtual line V3 that vertically extends at the center of straddled vehicle 1 in the left-right direction of the vehicle.

Figure 15:
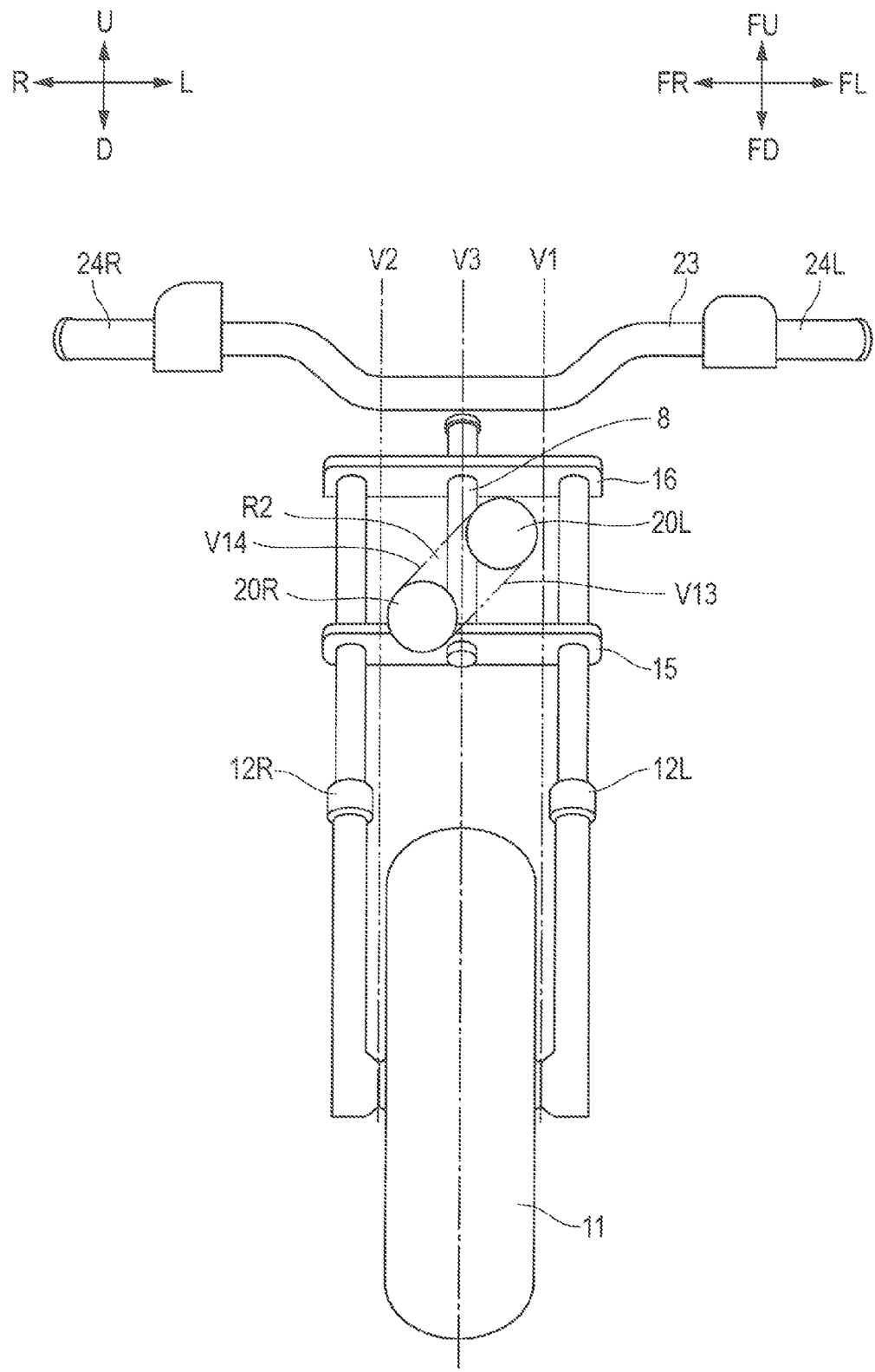
FIG. 15 is a diagram for describing Variation 1 of an arrangement of the first and the second highly-directional light units.
Figure 16:
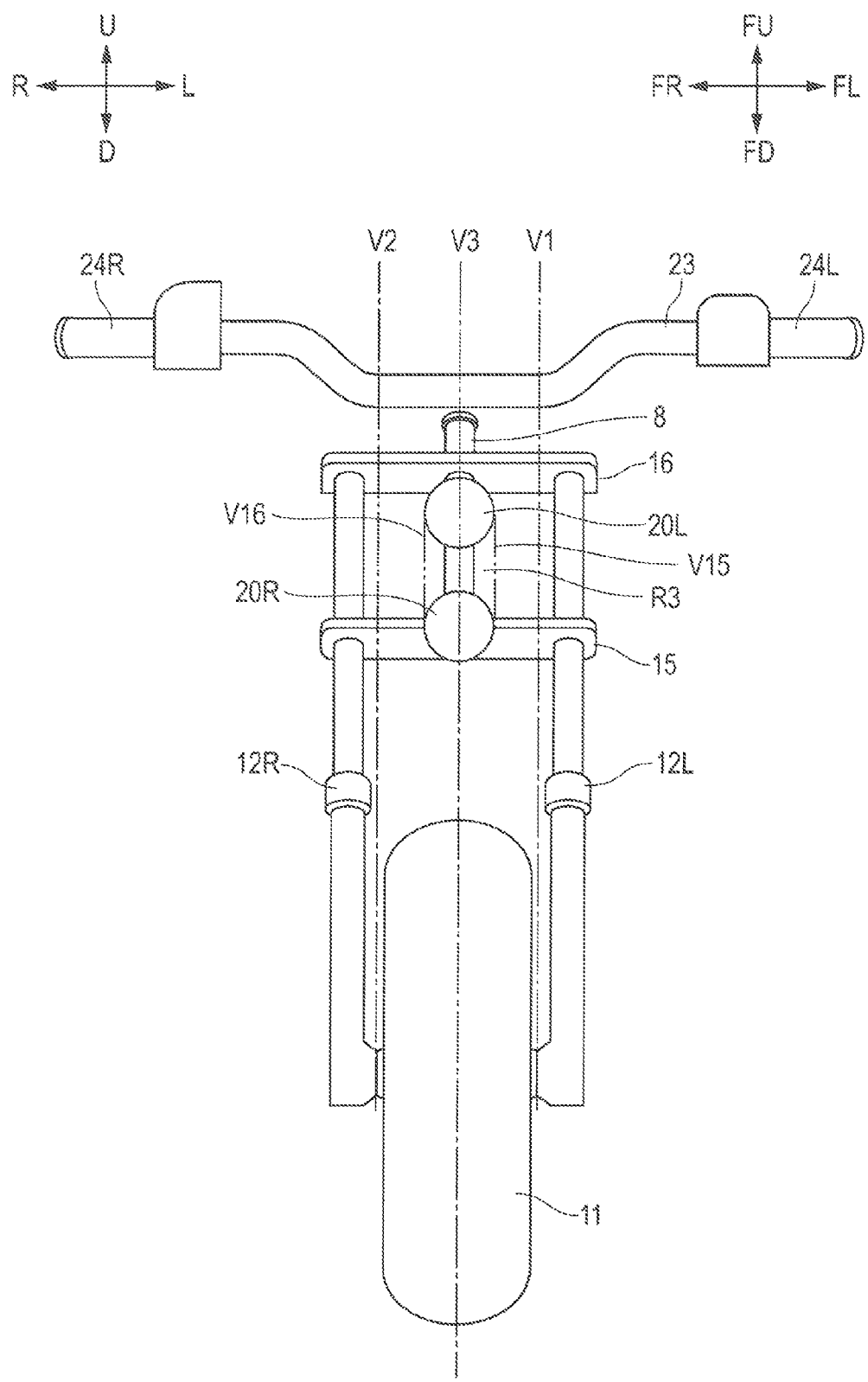
FIG. 16 is a diagram for describing Variation 2 of an arrangement of the first and the second highly-directional light units.

FIG. 15 is a diagram for describing Variation 1 of the arrangement of first highly-directional light unit 19L and second highly-directional light unit 19R. FIG. 16 is a diagram for describing Variation 2 of the arrangement of first highly-directional light unit 19L and second highly-directional light unit 19R.

The arrangement conditions of aforementioned first highly-directional light unit 19L and second highly-directional light unit 19R are also satisfied by the arrangement in FIG. 15 and the arrangement in FIG. 16.

According to the arrangement in FIG. 15, first optical lens section 20L of first highly-directional light unit 19L and second optical lens section 20R of second highly-directional light unit 19R are located at different positions in the up-down direction of the vehicle. When viewed from the front of the vehicle in this case as well, region R2 between first optical lens section 20L of first highly-directional light unit 19L and second optical lens section 20R of second highly-directional light unit 19R is located at the center of straddled vehicle 1 in the left-right direction of the vehicle. In FIG. 15, region R2 is shown using virtual line V13 and virtual line V14. Region R2 is a region between first optical lens section 20L, second optical lens section 20R, virtual line V13 and virtual line V14. That is, when viewed from the front of the vehicle, region R2 overlaps virtual line V3 that vertically extends at the center of straddled vehicle 1 in the left-right direction of the vehicle.

According to the arrangement shown in FIG. 16, when viewed from the front of the vehicle, first optical lens section 20L of first highly-directional light unit 19L and second optical lens section 20R of second highly-directional light unit 19R are arranged side by side in the up-down direction of the vehicle. In this case, when viewed from the front of the vehicle, region R3 between first optical lens section 20L of first highly-directional light unit 19L and second optical lens section 20R of second highly-directional light unit 19R is also located at the center of straddled vehicle 1 in the left-right direction of the vehicle. In FIG. 16, region R3 is shown using virtual line V15 and virtual line V16. Region R3 is a region between first optical lens section 20L, second optical lens section 20R, virtual line V15 and virtual line V16. That is, when viewed from the front of the vehicle, region R3 overlaps virtual line V3 that vertically extends at the center of straddled vehicle 1 in the left-right direction of the vehicle.

<Relationship Between Highly-Directional Light Unit and Other Parts>

Figure 17A:
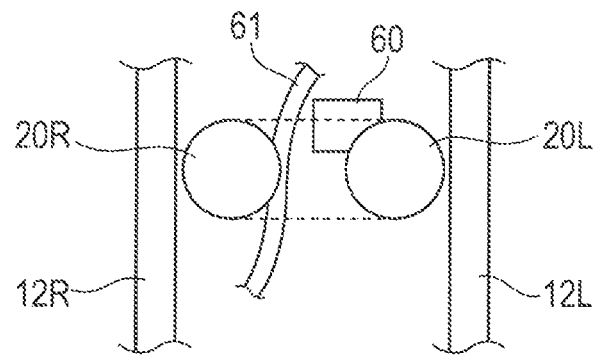
FIGS. 17A to 17C are a front view, a plan view and a plan view of a variation respectively for illustrating an arrangement relationship between the first highly-directional light unit, the second highly-directional light unit and other parts of the straddled vehicle according to Embodiment 1 of the present invention.
Figure 17B:
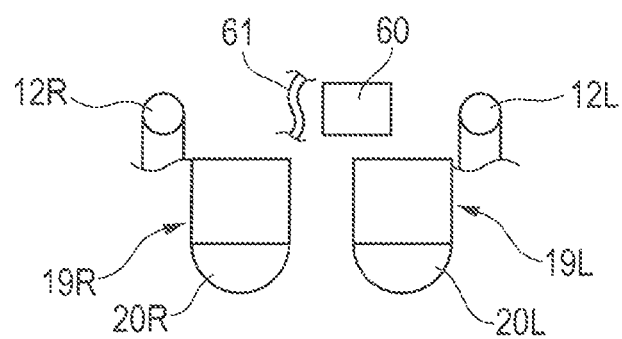
Figure 17C:
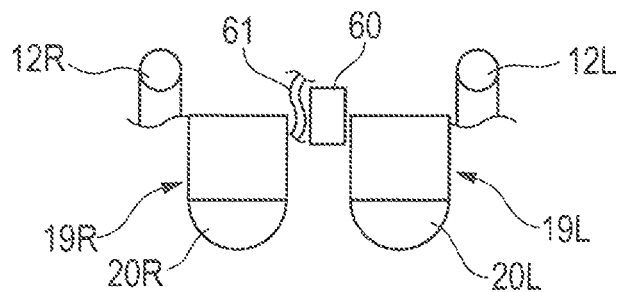

FIGS. 17A to 17C are diagrams for describing an arrangement relationship between first highly-directional light unit 19L, second highly-directional light unit 19R and other parts of the straddled vehicle according to Embodiment 1 of the present invention, FIG. 17A showing a front view, FIG. 17B showing a plan view and FIG. 17C showing a plan view of a variation.

As shown in FIG. 17A, when viewed from the front of the vehicle, part 60 or part 61 of straddled vehicle 1 is arranged so as to overlap a region between first optical lens section 20L of first highly-directional light unit 19L and second optical lens section 20R of second highly-directional light unit 19R. Part 60 is an electric/electronic part which is different from the highly-directional light unit, and more specifically, may be one of an engine control unit (ECU), various types of electronic control units (ECUs), a hydraulic unit (HU) that includes a motor and controls a fluid pressure of a hydraulic brake, a global positioning system (GPS) unit, an electronic toll collection (ETC) system, an ETC antenna, a horn, a laser unit, various types of electronic boards and batteries. Part 61 may be one of a throttle wire, a brake wire, a brake hose, a clutch wire, and a wire harness, for example.

As shown in FIG. 17B, part 60 or part 61 may also be arranged behind the rear end of first highly-directional light unit 19L or behind the rear end of second highly-directional light unit 19R in the front-rear direction of the vehicle. Furthermore, as shown in FIG. 17C, at least part of part 60 or part 61 may be arranged in a region between first highly-directional light unit 19L and second highly-directional light unit 19R in the front-rear direction of the vehicle.

<Effects of Embodiment 1>

As described above, according to straddled vehicle 1 of Embodiment 1, the following operational effects can be obtained. That is, when refracting and emitting light of first light-emitting section 51 to the outside, first optical lens section 20L allows the light to pass through the lens while causing part of the light to diffuse due to the nature of the lens material. Also, when refracting and emitting light of the second light-emitting section to the outside, second optical lens section 20R allows the light to pass through the lens while causing part of the light to diffuse due to the nature of the lens material. Due to this diffused light, first optical lens section 20L and second optical lens section 20R themselves appear to glow. Thus, first optical lens section 20L and second optical lens section 20R appear as light-emitting regions even when viewed from a range in which intensity of light distribution by first highly-directional light unit 19L and second highly-directional light unit 19R is low.

Furthermore, in first highly-directional light unit 19L and second highly-directional light unit 19R, each of maximum width W1L or W1R of first optical lens section 20L or second optical lens section 20R is formed to be smaller than L2 which is half of length L1 between the bottom-left end of left front-wheel support unit 12L and the bottom-right end of right front-wheel support unit 12R in the left-right direction of the vehicle when viewed from the front of the vehicle. The length in the left-right direction of the vehicle between the bottom-left end of the left front-wheel support unit and the bottom-right end of the right front-wheel support unit of the straddled vehicle is very small compared to that of a four-wheel automobile. For this reason, it is possible to make more compact not only first optical lens section 20L and second optical lens section 20R but also first highly-directional light unit 19L and second highly-directional light unit 19R.

In first highly-directional light unit 19L and second highly-directional light unit 19R, length L10 between first optical lens section 20L and second optical lens section 20R is formed to be smaller than half of the interval in the left-right direction of the vehicle between the bottom-left end of left front-wheel support unit 12L and the bottom-right end of right front-wheel support unit 12R when viewed from the front of the vehicle, and is also formed to be greater than half of minimum width W2L of first optical lens section 20L or minimum width W2R of second optical lens section 20R, whichever is the smaller. For this reason, by taking advantage of the fact that first highly-directional light unit 19L and second highly-directional light unit 19R can be made more compact, it is possible to limit an increase in the size of the vehicle even when the interval between first highly-directional light unit 19L and second highly-directional light unit 19R is increased. Moreover, since the two optical lens sections which appear to glow by diffused light are arranged apart from each other, it is possible to improve visibility from outside of the vehicle even when viewed from a range in which intensity of light distribution of first highly-directional light unit 19L and second highly-directional light unit 19R is low.

Thus, first optical lens section 20L and second optical lens section 20R that appear to glow by diffused light can improve the visibility from outside of the vehicle even when viewed from a range in which intensity of light distribution of first highly-directional light unit 19L and second highly-directional light unit 19R is low while limiting an increase in the size of the vehicle.

Furthermore, first highly-directional light unit 19L and second highly-directional light unit 19R each include a light-emitting section that emits highly-directional light and an optical lens section that refracts light of the light-emitting section and forms light distribution. The light distribution formed by second optical lens section 20R of second highly-directional light unit 19R becomes a light distribution of at least part of the beam identical to one of the main beam and dipped beam that includes the beam of first highly-directional light unit 19L of the main beam or dipped beam, turns on when first highly-directional light unit 19L is on and turns off when first highly-directional light unit 19L is off. First optical lens section 20L and second optical lens section 20R are arranged at positions separated from each other. For this reason, there is a high degree of design freedom in light distributions of light radiated through first optical lens section 20L of first highly-directional light unit 19L and light distributions of light radiated through second optical lens section 20R of second highly-directional light unit 19R.

Thus, according to straddled vehicle 1 of present Embodiment 1, first and second highly-directional light units 19L and 19R are fixed to base portion 32 so that, when the position of base portion 32 is changed relative to body frame 2 or handlebar 23, a state is maintained in which first wall light distribution D2 drawn on wall body W by the light radiated through first optical lens section 20L partially overlaps second wall light distribution D3 drawn on wall body W by the light radiated through second optical lens section 20R and the remaining part does not overlap. This allows light distribution D1 required for the vehicle to be formed even when first and second optical lens sections 20L and 20R are compact in size.

Straddled vehicle 1 further includes base portion 32 that supports first and second highly-directional light units 19L and 19R, and base portion 32 can maintain light distributions of first and second highly-directional light units 19L and 19R and change the position relative to body frame 2 or handlebar 23. It is thereby possible to maintain light distribution D1 formed by first highly-directional light unit 19L and second highly-directional light unit 19R arranged at separated positions.

Therefore, according to the straddled vehicle of aspect 1, it is possible to provide a straddled vehicle which is turnable leftward with body frame 2 tilted leftward in the left-right direction of the vehicle and turnable rightward with body frame 2 tilted rightward in the left-right direction of the vehicle, capable of limiting an increase in the size of the vehicle while maintaining light distribution D1 required for the vehicle and improving the visibility from outside of the vehicle.

According to straddled vehicle 1 of Embodiment 1, when viewed from the front of the vehicle, region R1 between first optical lens section 20L of first highly-directional light unit 19L and second optical lens section 20R of second highly-directional light unit 19R is located at the center of straddled vehicle 1 in the left-right direction of the vehicle. This allows the visibility from outside of straddled vehicle 1 to further improve. Thus, according to straddled vehicle 1 of Embodiment 1, it is possible to limit an increase in the size of the vehicle while maintaining light distributions and further improve the visibility from outside of straddled vehicle 1.

Furthermore, according to straddled vehicle 1 of Embodiment 1, when viewed from the front of the vehicle, maximum width W1L of first optical lens section 20L of first highly-directional light unit 19L is greater than 20 mm, and when viewed from the front of the vehicle, maximum width W1R of second optical lens section 20R of second highly-directional light unit 19R is greater than 20 mm. In the vehicle, it is known that when the distance between the directional indicator having 250 candelas to 400 candelas and the headlight that radiates a main beam or dipped beam is greater than reference length 20 mm, the directional indicator and the headlight that radiates the main beam or dipped beam become more distinguishable from each other. Maximum widths W1L and W1R with respect to above-described first optical lens section 20L and second optical lens section 20R surely improves the visibility from outside straddled vehicle. Thus, according to straddled vehicle 1 of Embodiment 1, it is possible to limit an increase in the size of straddled vehicle 1 while maintaining light distribution required for straddled vehicle 1 and reliably improve the visibility from outside of straddled vehicle 1.

According to straddled vehicle 1 of Embodiment 1, at least part of at least one of parts 60 and 61 of electric/electronic part other than a highly-directional light unit, among a throttle wire, a brake wire, a brake hose, a clutch wire, a wire harness and a key cylinder is arranged so as to overlap the region between first optical lens section 20L of first highly-directional light unit 19L and second optical lens section 20R of second highly-directional light unit 19R when viewed from the front of the vehicle. Thus, an interval provided between first highly-directional light unit 19L and second highly-directional light unit 19R and a space behind this interval in the front-rear direction of the vehicle are used to arrange parts 60 and 61, thus making it possible to limit an increase in the size of the body section of straddled vehicle 1 in the front-rear direction. Thus, according to straddled vehicle 1 of Embodiment 1, it is possible to limit an increase in the size of the vehicle while maintaining the light distribution required for the vehicle and to improve the visibility from outside of the vehicle Embodiment 2

Figure 18:
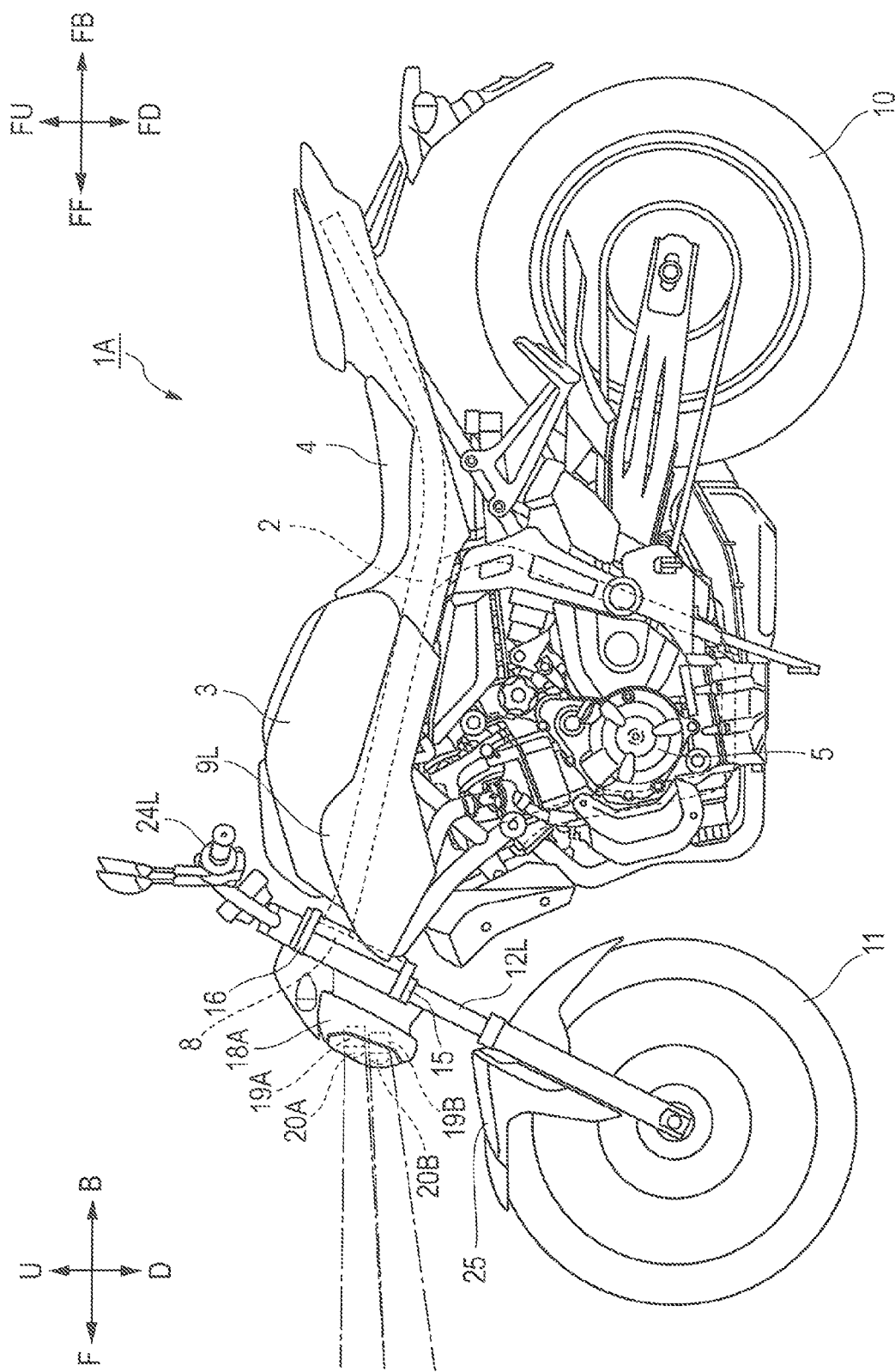
FIG. 18 is a side view illustrating a straddled vehicle according to Embodiment 2 of the present invention.

FIG. 18 is a side view illustrating a straddled vehicle according to Embodiment 2 of the present invention. FIG.

19 is a front view of the straddled vehicle according to Embodiment 2 of the present invention. Embodiment 2 is different from Embodiment 1 in the lamp unit but is similar to Embodiment 1 in other components. Similar components are assigned the same reference numerals and the description thereof will be omitted.

Straddled vehicle 1A of Embodiment 2 is provided with body frame 2, fuel tank 3, seat 4, power unit 5, steering shaft 8, left cover portion 9L, right cover portion 9R, rear wheel 10, front wheel 11, left front-wheel support unit 12L, right front-wheel support unit 12R, lower bracket 15, upper bracket 16, lamp unit 18A, handlebar 23, left grip 24L, right grip 24R, and fender 25.

Lamp unit 18A includes first highly-directional light unit 19A, second highly-directional light unit 19B, third highly-directional light unit 19C, and fourth highly-directional light unit 19D.

First, second, third and fourth highly-directional light units 19A, 19B, 19C, and 19D each adopt one of the configurations in FIG. 11A to FIG. 11C as in the case of first highly-directional light unit 19L of Embodiment 1. In correspondence with first optical lens section 20L of first highly-directional light unit 19L and first light-emitting section 51 in FIG. 11A to FIG. 11C: first highly-directional light unit 19A includes first optical lens section 20A and a first light-emitting section; second highly-directional light unit 19B includes second optical lens section 20B and a second light-emitting section; third highly-directional light unit 19C includes third optical lens section 20C and a third light-emitting section; and fourth highly-directional light unit 19D includes fourth optical lens section 20D and a fourth light-emitting section.

First highly-directional light unit 19A and second highly-directional light unit 19B simultaneously turn on under the control of an electric circuit that turns on/off a power supply. That is, first highly-directional light unit 19A turns on when second highly-directional light unit 19B turns on and turns off when second highly-directional light unit 19B turns off.

The light distribution of first highly-directional light unit 19A becomes first wall light distribution D2 in FIG. 5 or first wall light distribution D12 in FIG. 6. The light distribution of second highly-directional light unit 19B becomes second wall light distribution D3 in FIG. 5 or second wall light distribution D13 in FIG. 6. Thus, when first highly-directional light unit 19A and second highly-directional light unit 19B turn on, light distribution D1 of the dipped beam or light distribution D11 of the dipped beam required for straddled vehicle 1A is obtained.

When straddled vehicle 1A is in an upright state, first optical lens section 20A of first highly-directional light unit 19A and second optical lens section 20B of second highly-directional light unit 19B are arranged on the left of the center of straddled vehicle 1 in the left-right direction of the vehicle.

Third highly-directional light unit 19C and fourth highly-directional light unit 19D simultaneously turn on under the control of an electric circuit that turns on/off a power supply. That is, third highly-directional light unit 19C turns on when fourth highly-directional light unit 19D turns on and turns off when fourth highly-directional light unit 19D turns off.

The light distribution of third highly-directional light unit 19C becomes first wall light distribution D22 in FIG. 7 or first wall light distribution D32 in FIG. 8. The light distribution drawn on wall body W by light of third highly-directional light unit 19C is called "third wall light distribution." The light distribution of fourth highly-directional light unit 19D becomes second wall light distribution D23 in FIG. 7 or second wall light distribution D33 in FIG. 8. The light distribution drawn on wall body W by light of fourth highly-directional light unit 19D is called "fourth wall light distribution." Thus, when third highly-directional light unit 19C and fourth highly-directional light unit 19D turn on, light distribution D21 of the main beam or light distribution D31 of straddled vehicle 1A is obtained.

When straddled vehicle 1A is in an upright state, third optical lens section 20C of third highly-directional light unit 19C and fourth optical lens section 20D of fourth highly-directional light unit 19D are arranged on the right of the center of straddled vehicle 1 in the left-right direction of the vehicle.

<Dimensional Condition and Interval Condition of Optical Lens Section>

Figure 20:
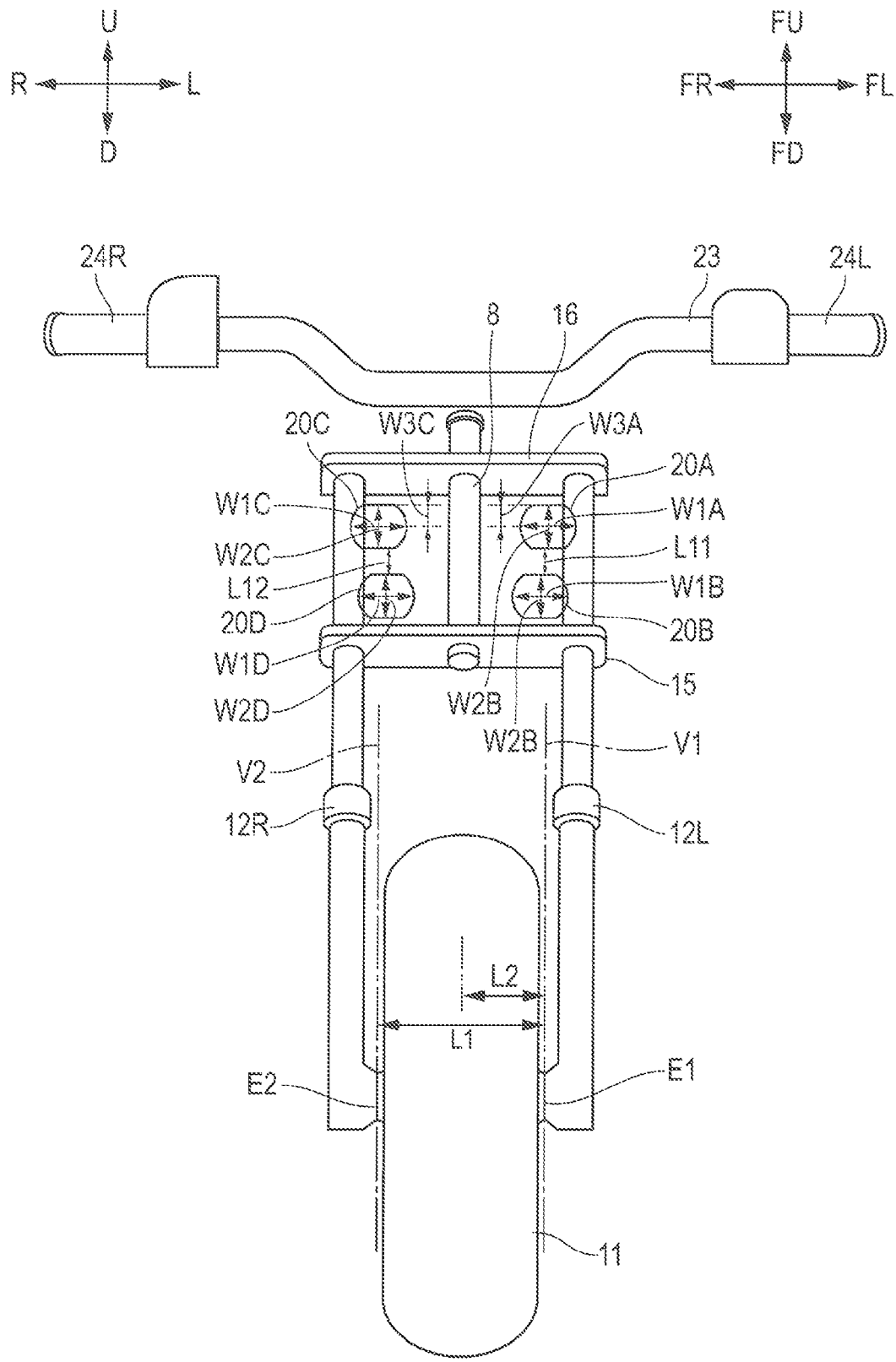
FIG. 20 is a diagram for describing first, second, third and fourth highly-directional light units of the straddled vehicle according to Embodiment 2 of the present invention.

FIG. 20 is a diagram for describing the first, second, third and fourth highly-directional light units of the straddled vehicle according to Embodiment 2 of the present invention.

Virtual lines V1 and V2 in FIG. 20 show the positions of bottom-right end E1 of left front-wheel support unit 12L and bottom-left end E2 of right front-wheel support unit 12R in the left-right direction of the vehicle when viewed from the front of the vehicle.

First, second, third, and fourth optical lens sections 20A, 20B, 20C, and 20D, respectively, of first, second, third, and fourth highly-directional light units 19A, 19B, 19C, and 19D satisfy the following dimensional conditions.

When viewed from the front of the vehicle while straddled vehicle 1A is in an upright state, maximum width W1A of first optical lens section 20A of first highly-directional light unit 19A is smaller than L2 which is half of length L1 between virtual line V1 and virtual line V2 in the left-right direction of the vehicle (W1A<L2).

When viewed from the front of the vehicle while straddled vehicle 1A is in an upright state, maximum width W1A of first optical lens section 20A of first highly-directional light unit 19A is preferably greater than reference length 20 mm. In the vehicle, it is known that when the distance between the directional indicator having 250 candelas to 400 candelas and the headlight that radiates a main beam or dipped beam is greater than reference length 20 mm, the directional indicator and the headlight that radiates the main beam or dipped beam become more distinguishable from each other.

When viewed from the front of the vehicle while straddled vehicle 1A is in an upright state, maximum width W1B of second optical lens section 20B of second highly-directional light unit 19B is smaller than L2 which is half of length L1 between virtual line V1 and virtual line V2 in the left-right direction of the vehicle (W1B<L2).

When viewed from the front of the vehicle while straddled vehicle 1A is in an upright state, maximum width W1B of second optical lens section 20B of second highly-directional light unit 19B is preferably greater than reference length 20 mm. The meaning of reference length 20 mm is the same as above.

When viewed from the front of the vehicle while straddled vehicle 1A is in an upright state, length L11 between first optical lens section 20A of first highly-directional light unit 19A and second optical lens section 20B of second highly-directional light unit 19B is smaller than L2 which is half of length L1 between virtual line V1 and virtual line V2 in the left-right direction of the vehicle (L11<L2). Distance L11 is greater than W3A which is half of minimum width W2A of first optical lens section 20A of first highly-directional light unit 19A or minimum width W2B of second optical lens section 20B of second highly-directional light unit 19B, whichever is the smaller (L11>W3A).

When viewed from the front of the vehicle while straddled vehicle 1A is in an upright state, maximum width W1C of third optical lens section 20C of third highly-directional light unit 19C is smaller than L2 which is half of length L1 between virtual line V1 and virtual line V2 in the left-right direction of the vehicle (W1C<L2).

When viewed from the front of the vehicle while straddled vehicle 1A is in an upright state, maximum width W1C of third optical lens section 20C of third highly-directional light unit 19C is preferably greater than reference length 20 mm. The meaning of reference length 20 mm is the same as above.

When viewed from the front of the vehicle while straddled vehicle 1A is in an upright state, maximum width W1D of fourth optical lens section 20D of fourth highly-directional light unit 19D is smaller than L2 which is half of length L1 between virtual line V1 and virtual line V2 in the left-right direction of the vehicle (W1D<L2).

When viewed from the front of the vehicle while straddled vehicle 1A is in an upright state, maximum width W1D of fourth optical lens section 20D of fourth highly-directional light unit 19D is preferably greater than reference length 20 mm. The meaning of reference length 20 mm is the same as above.

When viewed from the front of the vehicle while straddled vehicle 1A is in an upright state, length L12 between third optical lens section 20C of third highly-directional light unit 19C and fourth optical lens section 20D of fourth highly-directional light unit 19D is smaller than L2 which is half of length L1 between virtual line V1 and virtual line V2 in the left-right direction of the vehicle (L12<L2). Furthermore, distance L12 is greater than W3C which is half of minimum width W2C of third optical lens section 20C of third highly-directional light unit 19C or minimum width W2D of fourth optical lens section 20D of fourth highly-directional light unit 19D, whichever is the smaller (L12>W3C).

<Relationship Between Highly-Directional Light Unit and Other Parts>

In straddled vehicle 1A of Embodiment 2, first highly-directional light unit 19A, second highly-directional light unit 19B, and other parts 60 and 61 may have the arrangement relationship in FIG. 17A to FIG. 17C. In this case, in FIG. 17A to FIG. 17C, first highly-directional light unit 19L is replaced by first highly-directional light unit 19A of Embodiment 2, and second highly-directional light unit 19R is replaced by second highly-directional light unit 19B of Embodiment 2 and the arrangement of left front-wheel support unit 12L and right front-wheel support unit 12R is changed.

Moreover, third highly-directional light unit 19C, fourth highly-directional light unit 19D, and other parts 60 and 61 may have the arrangement relationship in FIG. 17A to FIG. 17C. In this case, in FIG. 17A to FIG. 17C, first highly-directional light unit 19L is replaced by third highly-directional light unit 19C of Embodiment 2, second highly-directional light unit 19R is replaced by fourth highly-directional light unit 19D of Embodiment 2 and the arrangement of left front-wheel support unit 12L and right front-wheel support unit 12R is changed.

<Detailed Structure of Lamp Unit>

Figure 21:
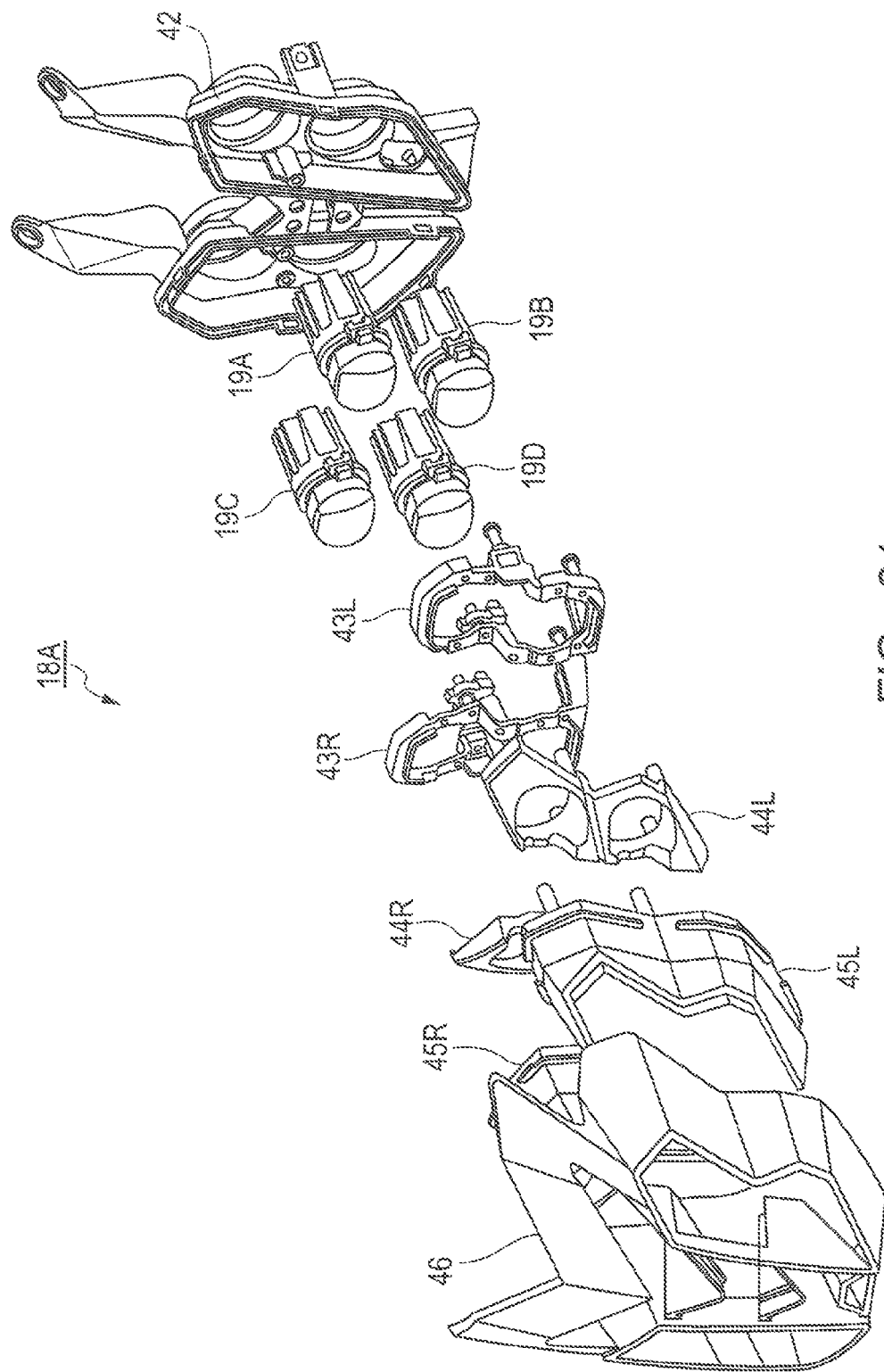
FIG. 21 is an exploded perspective view illustrating a lamp unit of the straddled vehicle according to Embodiment 2 of the present invention.
Figure 22:
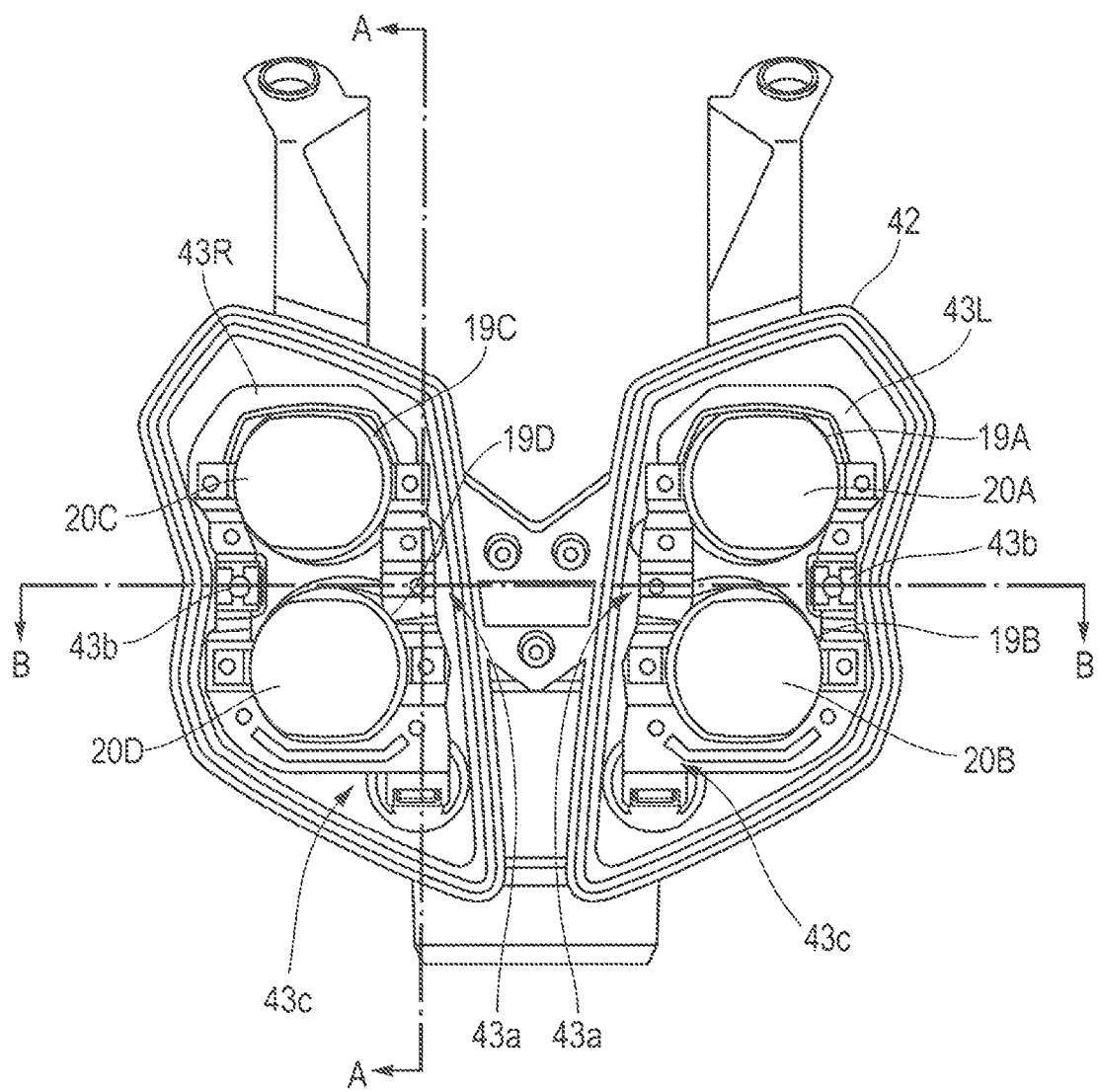
FIG. 22 is a front view illustrating part of the lamp unit of the straddled vehicle according to Embodiment 2 of the present invention.
Figure 23:
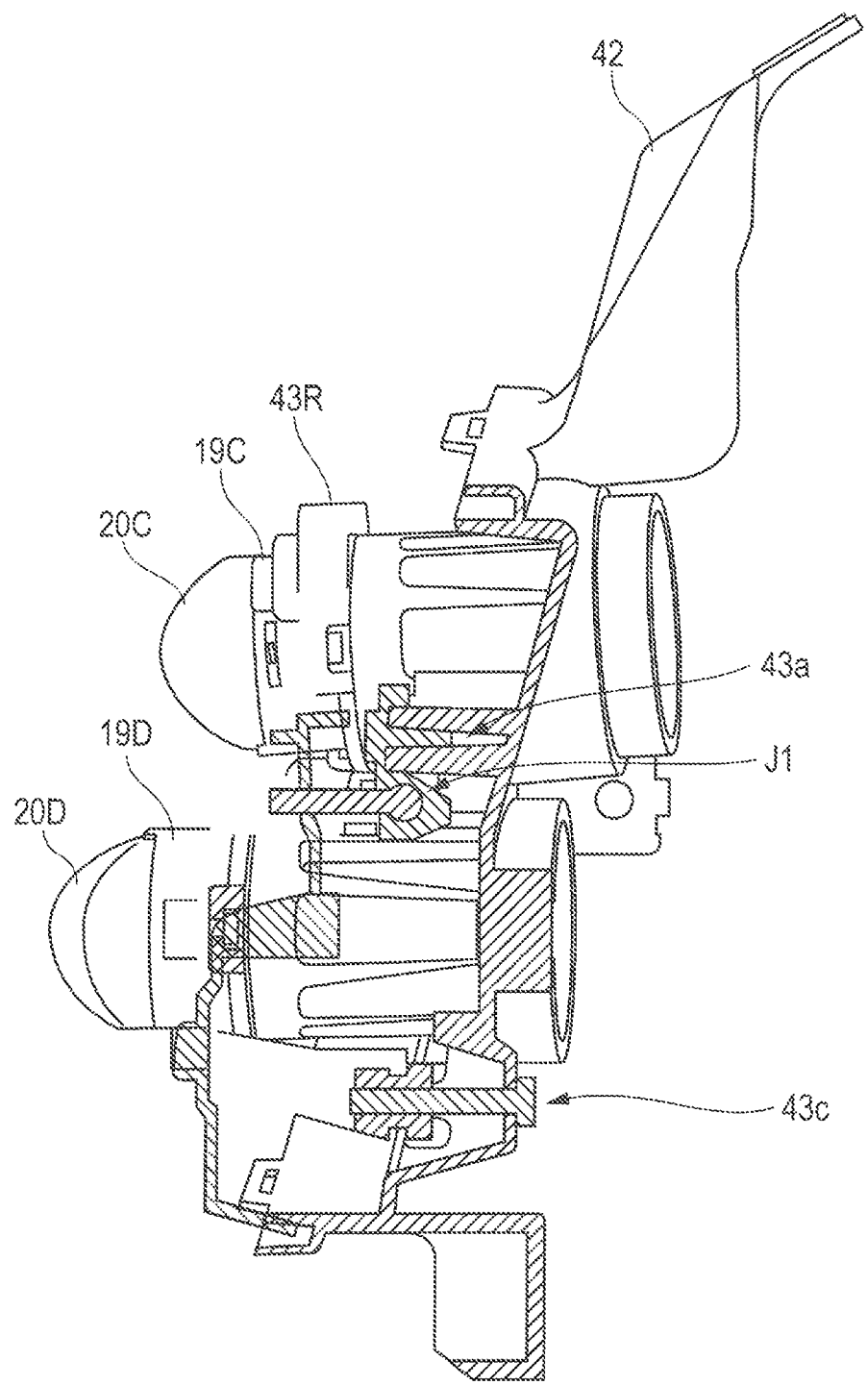
FIG. 23 is a cross-sectional view taken along line A-A of FIG. 22.
Figure 24:
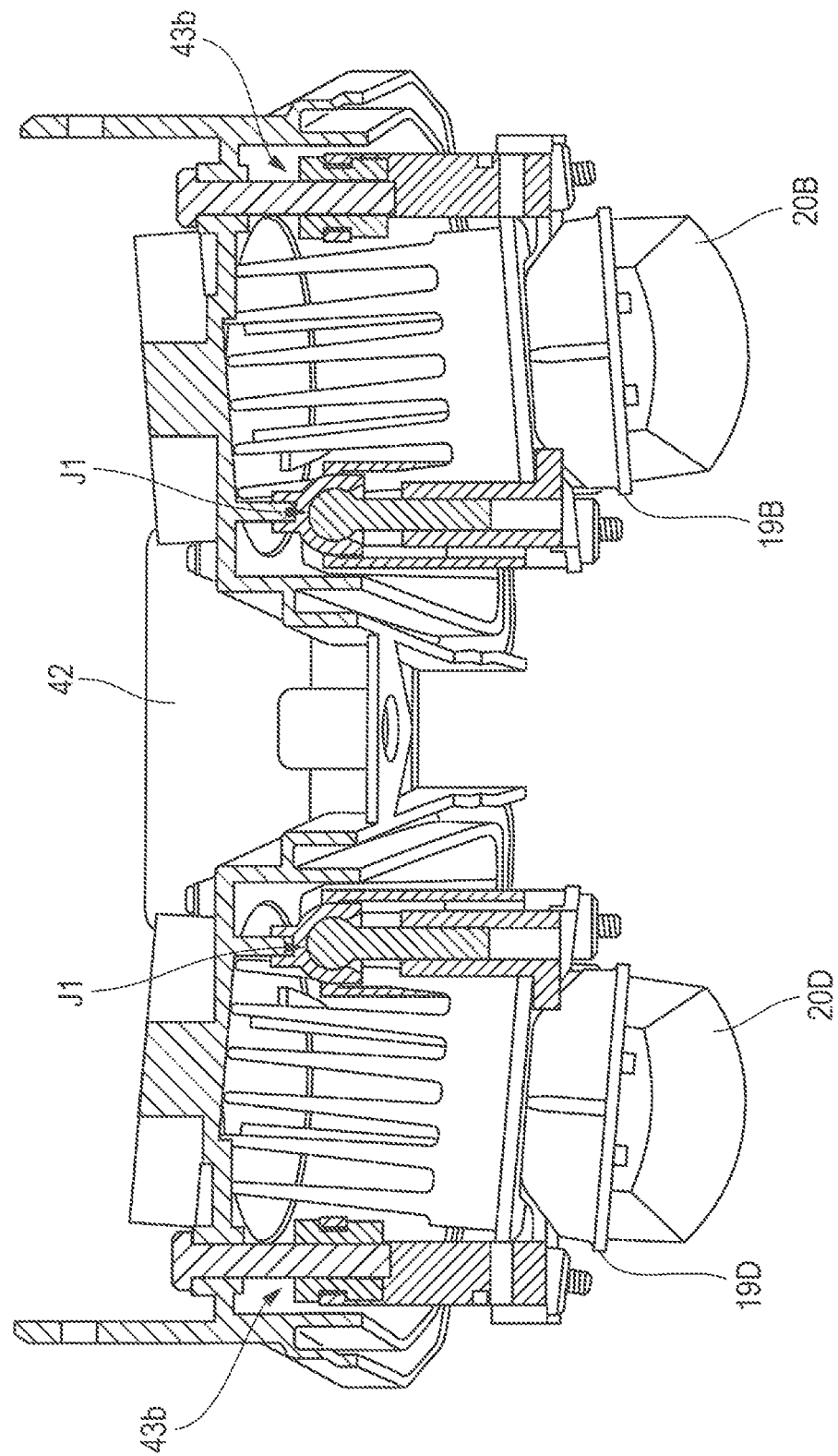
FIG. 24 is a cross-sectional view taken along line B-B of FIG. 22.

FIG. 21 is an exploded perspective view illustrating a lamp unit of the straddled vehicle according to Embodiment 2 of the present invention. FIG. 22 is a front view illustrating part of the lamp unit of the straddled vehicle according to Embodiment 2 of the present invention. FIG. 23 is a cross-sectional view taken along line A-A of FIG. 22. FIG. 24 is a cross-sectional view taken along line B-B of FIG. 22.

As shown in FIG. 21, lamp unit 18A includes casing 42, first, second, third, and fourth highly-directional light units 19A, 19B, 19C, and 19D, first and second base portions 43L and 43R, decorative covers 44L and 44R, outer covers 45L and 45R, and front cover 46. FIG. 22 shows a configuration in which first and second base portions 43L and 43R, first, second, third, and fourth highly-directional light units 19A, 19B, 19C, and 19D are assembled into casing 42.

Casing 42 covers at least side faces, upper and lower parts in the up-down direction of the vehicle of first, second, third, and fourth highly-directional light units 19A, 19B, 19C, and 19D. Casing 42 is supported by first base portion 43L and second base portion 43R at an adjustable angle. Casing 42 is supported directly or indirectly by handlebar 23 or upper bracket 16.

First base portion 43L fixedly supports first and second highly-directional light units 19A and 19B. This fixed support makes first and second highly-directional light units 19A and 19B relatively immovable.

Second base portion 43R fixedly supports third and fourth highly-directional light units 19C and 19D. This fixed support makes third and fourth highly-directional light units 19C and 19D relatively immovable.

First base portion 43L includes engaging parts 43a, 43b and 43c that engage with casing 42. Second base portion 43R likewise includes engaging parts 43a, 43b and 43c that engage with casing 42. As shown in FIG. 22 to FIG. 24, engaging part 43a engages with casing 42 via universal joint J1. Universal joint J1 is a joint that joins two members together at any angle. Engaging part 43b engages with an engaged part of casing 42 in a position in an adjustable manner in the front-rear direction. Engaging part 43b may be provided at a position substantially different from universal joint J1 in the horizontal direction. Engaging part 43c engages with an engaged part of casing 42 in a position in an adjustable manner in the front-rear direction. Engaging part 43c may be provided at a position substantially different from universal joint J1 in the vertical direction.

The engagement between first base portion 43L and the casing makes first base portion 43L movable relative to casing 42 without changing positions of overlapping between the light distribution of first highly-directional light unit 19A and the light distribution of second highly-directional light unit 19B. The relative movable direction is a direction of turning around universal joint J1 as a fulcrum. Since casing 42 is fixedly supported by handlebar 23 or upper bracket 16, first base portion 43L can move relative to handlebar 23 or upper bracket 16 with the above-described engagement. It is thereby possible to adjust the optical axes of first highly-directional light unit 19A and second highly-directional light unit 19B collectively.

Similarly, the engagement between second base portion 43R and casing 42 makes second base portion 43R movable relative to casing 42 without changing positions of overlapping between the light distribution of third highly-directional light unit 19C and the light distribution of fourth highly-directional light unit 19D. The relative movable direction is a direction of rotation around universal joint J1 as a fulcrum. Since casing 42 is fixedly supported by handlebar 23 or upper bracket 16, second base portion 43R can move relative to handlebar 23 or upper bracket 16 with the above-described engagement. It is thereby possible to adjust the optical axes of third highly-directional light unit 19C and fourth highly-directional light unit 19D collectively.

First base portion 43L and second base portion 43R are supported by casing 42 without mutual interference. Thus, it is possible to adjust the optical axes of first highly-directional light unit 19A and second highly-directional light unit 19B and adjust the optical axes of third highly-directional light unit 19C and fourth highly-directional light unit 19D independently of each other.

Decorative covers 44L and 44R cover first, second, third, and fourth highly-directional light units 19A, 19B, 19C, and 19D arranged in casing 42 so as to expose four first optical lens sections 20A to 20D and hide the other parts. Decorative covers 44L and 44R are fixed to casing 42.

Outer covers 45L and 45R are transparent and cover the fronts of first, second, third, and fourth highly-directional light units 19A, 19B, 19C, and 19D. Outer covers 45L and 45R are fixed to casing 42.

Front face cover 46 exposes the transparent surfaces of outer covers 45L and 45R and covers the front of casing 42 in the front-rear direction of the vehicle.

<Effects of Embodiment 2>

As described above, according to straddled vehicle 1A of Embodiment 2, first, second, third, and fourth highly-directional light units 19A, 19B, 19C, and 19D improve the visibility from outside of straddled vehicle 1A. Straddled vehicle 1A can also be made compact compared to the case where two reflector-type lamp units are arranged on the left and right sides of the center of the vehicle and the same light distribution is formed.

Furthermore, first and second optical lens sections 20A and 20B of first and second highly-directional light units 19A and 19B satisfy the dimensional conditions and the interval conditions described in Embodiment 1. First wall light distribution D2 formed by first optical lens section 20A of first highly-directional light unit 19A and second wall light distribution D3 formed by second optical lens section 20B of second highly-directional light unit 19B overlap with each other to form light distribution D1 required for straddled vehicle 1A. Thus, although individual first optical lens sections 20A and 20B are compact, it is possible to easily form light distributions required for straddled vehicle 1A while improving the visibility from outside. Furthermore, since first and second optical lens sections 20A and 20B of first and second highly-directional light units 19A and 19B are arranged apart from each other as appropriate, interference between the optical axis setting of first optical lens section 20A of first highly-directional light unit 19A and the optical axis setting of second optical lens section 20B of second highly-directional light unit 19B is less likely to occur. Thus, it is possible to more easily form light distributions required for straddled vehicle 1A while improving the visibility from outside. Furthermore, first highly-directional light unit 19A and second highly-directional light unit 19B are fixed to first base portion 43L so as not to relatively move. First base portion 43L can change a position relative to body frame 2 or handlebar 23 without changing the relationship of the light radiated through first optical lens section 20A of first highly-directional light unit 19A with the light radiated through second optical lens section 20B of second highly-directional light unit 19B in which part of the light overlaps and the remaining part does not overlap. Therefore, light distribution D1 remains the same, which is formed by causing first wall light distribution D2 by first optical lens section 20A of first highly-directional light unit 19A to overlap second wall light distribution D3 by second optical lens section 20B of second highly-directional light unit 19B. First optical lens section 20A and second optical lens section 20B can thereby form light distribution D1 required for the vehicle although these optical lens sections are compact.

Similarly, third and fourth optical lens sections 20C and 20D of third and fourth highly-directional light units 19C and 19D satisfy the dimensional conditions and the interval conditions described in Embodiment 1. First wall light distribution D2 formed by third optical lens section 20C of third highly-directional light unit 19C and second wall light distribution D3 formed by fourth optical lens section 20D of fourth highly-directional light unit 19D overlap each other to form light distribution D21 required for straddled vehicle 1A. It is thereby possible to more easily form light distribution required for straddled vehicle 1A while improving the visibility from outside even when individual third optical lens sections 20C and 20D are more compacts. Furthermore, since third and fourth optical lens sections 20C and 20D of third and fourth highly-directional light units 19C and 19D are arranged apart from each other as appropriate, interference between the optical axis setting of third optical lens section 20C of third highly-directional light unit 19C and the optical axis setting of fourth optical lens section 20D of fourth highly-directional light unit 19D is less likely to occur. Thus, it is possible to more easily form light distributions required for straddled vehicle 1A while improving the visibility from outside. Furthermore, third highly-directional light unit 19C and fourth highly-directional light unit 19D are fixed to second base portion 43R so as not to relatively move. Second base portion 43R can change a position relative to body frame 2 or handlebar 23 without changing the relationship of the light radiated through third optical lens section 20C of third highly-directional light unit 19C with the light radiated through fourth optical lens section 20D of fourth highly-directional light unit 19D in which in which part of the light overlaps and the remaining part does not overlap. Therefore, light distribution D21 remains the same, which is formed by causing first wall light distribution D2 by third optical lens section 20C of third highly-directional light unit 19C to overlap second wall light distribution D3 by fourth optical lens section 20D of fourth highly-directional light unit 19D. First optical lens section 20A and second optical lens section 20B can thereby form light distribution D1 required for the vehicle although these optical lens sections are compact.

Thus, according to straddled vehicle 1A of Embodiment 2, it is possible to limit an increase in the size of straddled vehicle 1 while maintaining light distribution D1 of the dipped beam and light distribution D21 of the main beam required for straddled vehicle 1 and to improve the visibility from outside of straddled vehicle 1.

Embodiment 3

Figure 25:
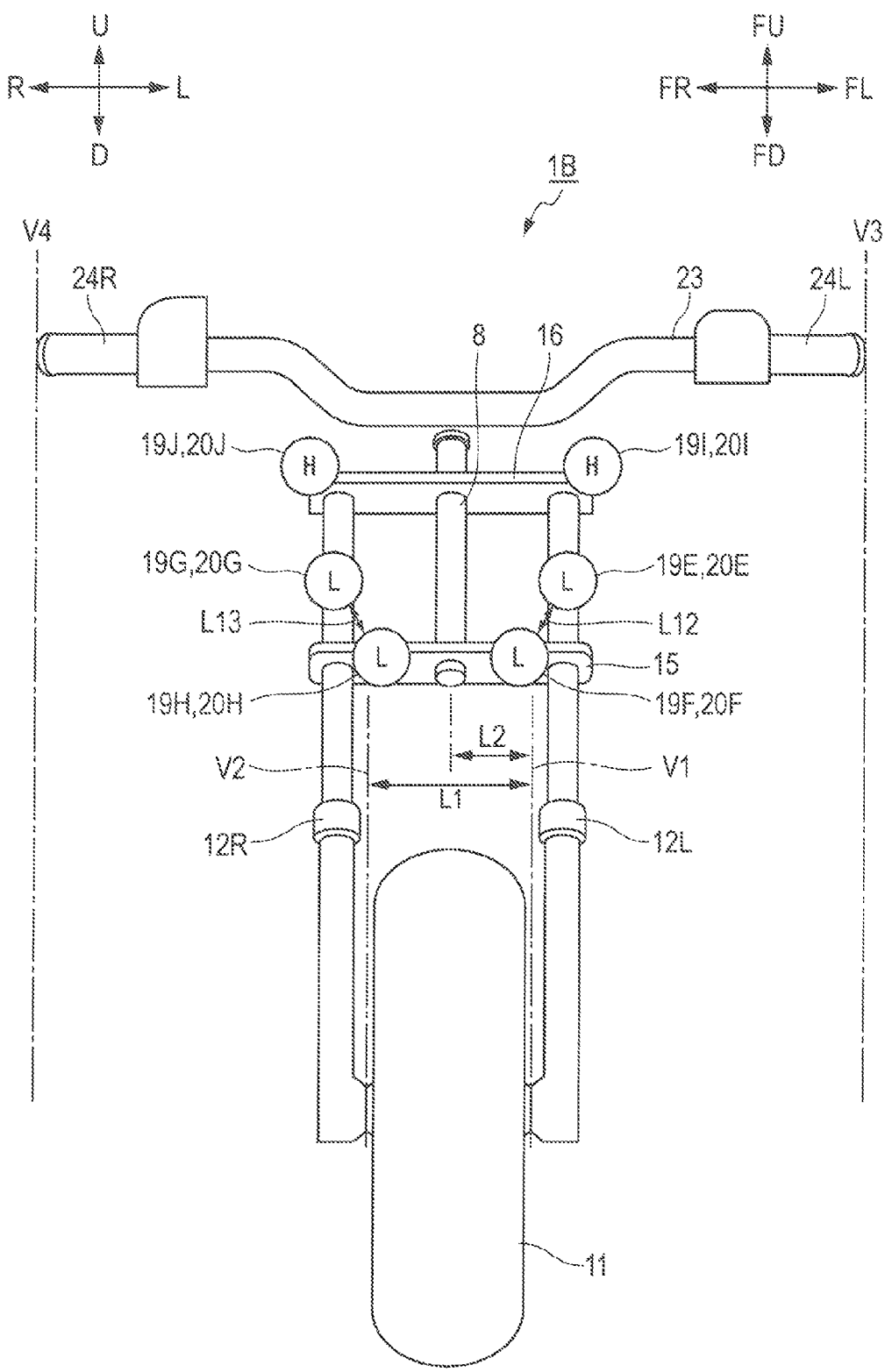
FIG. 25 is a diagram for describing an arrangement of first to sixth highly-directional light units of a straddled vehicle according to Embodiment 3 of the present invention.

FIG. 25 illustrates an arrangement of a first highly-directional light unit to a sixth highly-directional light unit of a straddled vehicle according to Embodiment 3 of the present invention.

Straddled vehicle 1B of Embodiment 3 is different from Embodiment 2 in the number and arrangement of highly-directional light units, and the type of light distribution formed by each highly-directional light unit, and other components are similar to those of Embodiment 2. Identical components are assigned the same reference numerals and the description thereof will be omitted.

Straddled vehicle 1B of Embodiment 3 includes first, second, third, fourth, fifth, and sixth highly-directional light units 19E, 19F, 19G, 19H, 19I, and 19J. Each of the first highly-directional light unit to the sixth highly-directional light unit adopts one of the configurations in FIG. 11A to FIG. 11C as in the case of first highly-directional light unit 19L of Embodiment 1. In correspondence with first optical lens section 20L of first highly-directional light unit 19L and first light-emitting section 51 in FIG. 11A to FIG. 11C: first highly-directional light unit 19E includes first optical lens section 20E and a first light-emitting section; second highly-directional light unit 19F includes second optical lens section 20F and a second light-emitting section; third highly-directional light unit 19G includes third optical lens section 20G and a third light-emitting section; fourth highly-directional light unit 19H includes fourth optical lens section 20H and a fourth light-emitting section; fifth highly-directional light unit 19I includes fifth optical lens section 20I and a fifth light-emitting section; and sixth highly-directional light unit 19J includes sixth optical lens section 20J and sixth light-emitting section.

First and second optical lens section 20E and 20F of first and second highly-directional light units 19E and 19F satisfy the dimensional conditions of the highly-directional light unit and the interval conditions that define length L12 between the two described in Embodiment 1.

Third and fourth optical lens sections 20G and 20H of third and fourth highly-directional light units 19G and 19H satisfy the dimensional conditions of the highly-directional light unit and the interval conditions that define length L13 between the two described in Embodiment 1.

First highly-directional light unit 19E and second highly-directional light unit 19F simultaneously turn on under the control of an electric circuit that turns on/off a power supply. That is, first highly-directional light unit 19E turns on when second highly-directional light unit 19F turns on and turns off when second highly-directional light unit 19F turns off.

The light distribution of first highly-directional light unit 19E becomes first wall light distribution D2 in FIG. 5 or first wall light distribution D12 in FIG. 6. The light distribution of second highly-directional light unit 19F becomes second wall light distribution D3 in FIG. 5 or second wall light distribution D13 in FIG. 6. Thus, when first highly-directional light unit 19E and second highly-directional light unit 19F turn on, light distribution D1 or light distribution D11 of the dipped beam required for straddled vehicle 1B is obtained.

When straddled vehicle 1B is in an upright state, first optical lens section 20E of first highly-directional light unit 19E and second optical lens section 20F of second highly-directional light unit 19F are arranged on the left of the center of straddled vehicle 1B 1 in the left-right direction of the vehicle.

Third highly-directional light unit 19G and fourth highly-directional light unit 19H simultaneously turn on under the control of an electric circuit that turns on/off a power supply. That is, third highly-directional light unit 19G turns on when fourth highly-directional light unit 19H turns on and turns off when fourth highly-directional light unit 19H turns off.

The light distribution of third highly-directional light unit 19G becomes first wall light distribution D2 in FIG. 5 or first wall light distribution D12 in FIG. 6. The light distribution of fourth highly-directional light unit 19H becomes second wall light distribution D3 in FIG. 5 or second wall light distribution D13 in FIG. 6. Thus, when third highly-directional light unit 19G and fourth highly-directional light unit 19H turn on, light distribution D1 or light distribution D11 of the dipped beam is obtained in straddled vehicle 1B.

When straddled vehicle 1A is in an upright state, third optical lens section 20G of third highly-directional light unit 19G and fourth optical lens section 20H of fourth highly-directional light unit 19H are arranged on the right of the center of straddled vehicle 1B in the left-right direction of the vehicle.

Fifth optical lens section 20I of fifth highly-directional light unit 19I forms light distributions of the main beam required for straddled vehicle 1B. Fifth highly-directional light unit 19I is arranged on the left of the center of straddled vehicle 1B in the left-right direction of the vehicle.

Sixth optical lens section 20J of sixth highly-directional light unit 19J forms light distributions of the main beam required for straddled vehicle 1B. Sixth highly-directional light unit 19I is arranged on the right of the center of straddled vehicle 1B in the left-right direction of the vehicle.

When straddled vehicle 1B is in an upright state, first optical lens section 20E of first highly-directional light unit 19E, second optical lens section 20F of second highly-directional light unit 19F, and fifth optical lens section 20I of fifth highly-directional light unit 19I are arranged in such a way that each right end is arranged on the left of the vehicle center and each left end is arranged on the right of virtual line V3 in the left-right direction of the vehicle. When straddled vehicle 1B is in an upright state, virtual line V3 is a vertical line that passes through the left end of left grip 24L.

When straddled vehicle 1B is in an upright state, third optical lens section 20G of third highly-directional light unit 19G, fourth optical lens section 20H of fourth highly-directional light unit 19H, and sixth optical lens section 20J of sixth highly-directional light unit 19J are arranged in such a way that each left end is arranged on the right of the vehicle center and each right end is arranged on the left of virtual line V4 in the left-right direction of the vehicle. When straddled vehicle 1B is in an upright state, virtual line V4 is a vertical line that passes through the right end of right grip 24R.

As described above, straddled vehicle 1B of Embodiment 3 makes the configuration compact while improving the visibility from outside compared to the case where first highly-directional light unit 19E and second highly-directional light unit 19F are each formed of a lamp unit that forms light distribution using a reflector. Furthermore, straddled vehicle 1B of Embodiment 3 makes the configuration compact while improving the visibility from outside compared to the case where third highly-directional light unit 19G and fourth highly-directional light unit 19H are each formed of a lamp unit that forms light distribution using a reflector. Thus, it is possible to make the configuration compact while improving the visibility from outside compared to the configuration in which the two lamp units that form light distribution using reflectors each radiate a dipped beam.

Furthermore, according to straddled vehicle 1B of Embodiment 3, since the light distribution of the main beam required for the vehicle is formed by fifth highly-directional light unit 19I and sixth highly-directional light unit 19J, the structure for switching the light distribution in one highly-directional light unit becomes unnecessary. Furthermore, when viewed from the front of the vehicle, each left end of first optical lens section 20E of first highly-directional light unit 19E, second optical lens section 20F of second highly-directional light unit 19F and fifth optical lens section 20I of fifth highly-directional light unit 19I is on the right of the left end of left grip 24L in the left-right direction of the vehicle. Furthermore, when viewed from the front of the vehicle, each right end of third optical lens section 20G of third highly-directional light unit 19G, fourth optical lens section 20H of fourth highly-directional light unit 19H, and sixth optical lens section 20J of sixth highly-directional light unit 19J is on the left of the right end of right grip 24R in the left-right direction of the vehicle. Thus, it is possible to make the configuration compact while improving the visibility from outside compared to the case where first highly-directional light unit 19E to sixth highly-directional light unit 19J are formed of lamp units which form light distributions using reflectors.

Thus, according to straddled vehicle 1B of Embodiment 3, it is possible to limit an increase in the size of straddled vehicle 1B while maintaining light distributions required for straddled vehicle 1B and to improve the visibility from outside of straddled vehicle 1B.

Embodiment 4

The configuration has been described in aforementioned Embodiment 2 in which large naked type straddled vehicle 1A is provided with lamp unit 18A, and next, a configuration will be described in which small naked type straddled vehicle 1C is provided with lamp unit 18A.

Figure 26:
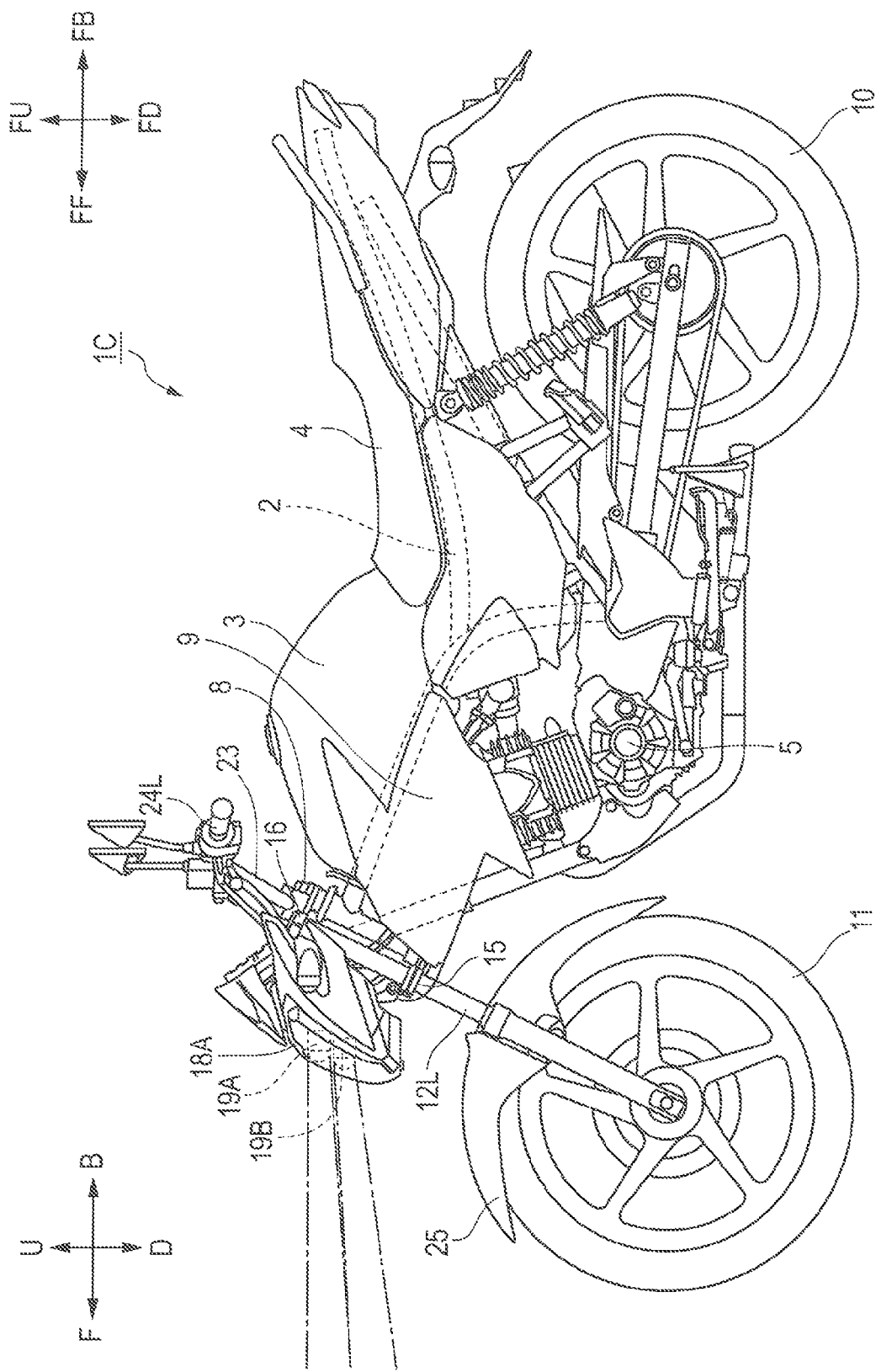
FIG. 26 is a side view illustrating a straddled vehicle according to Embodiment 4 of the present invention.
Figure 27:
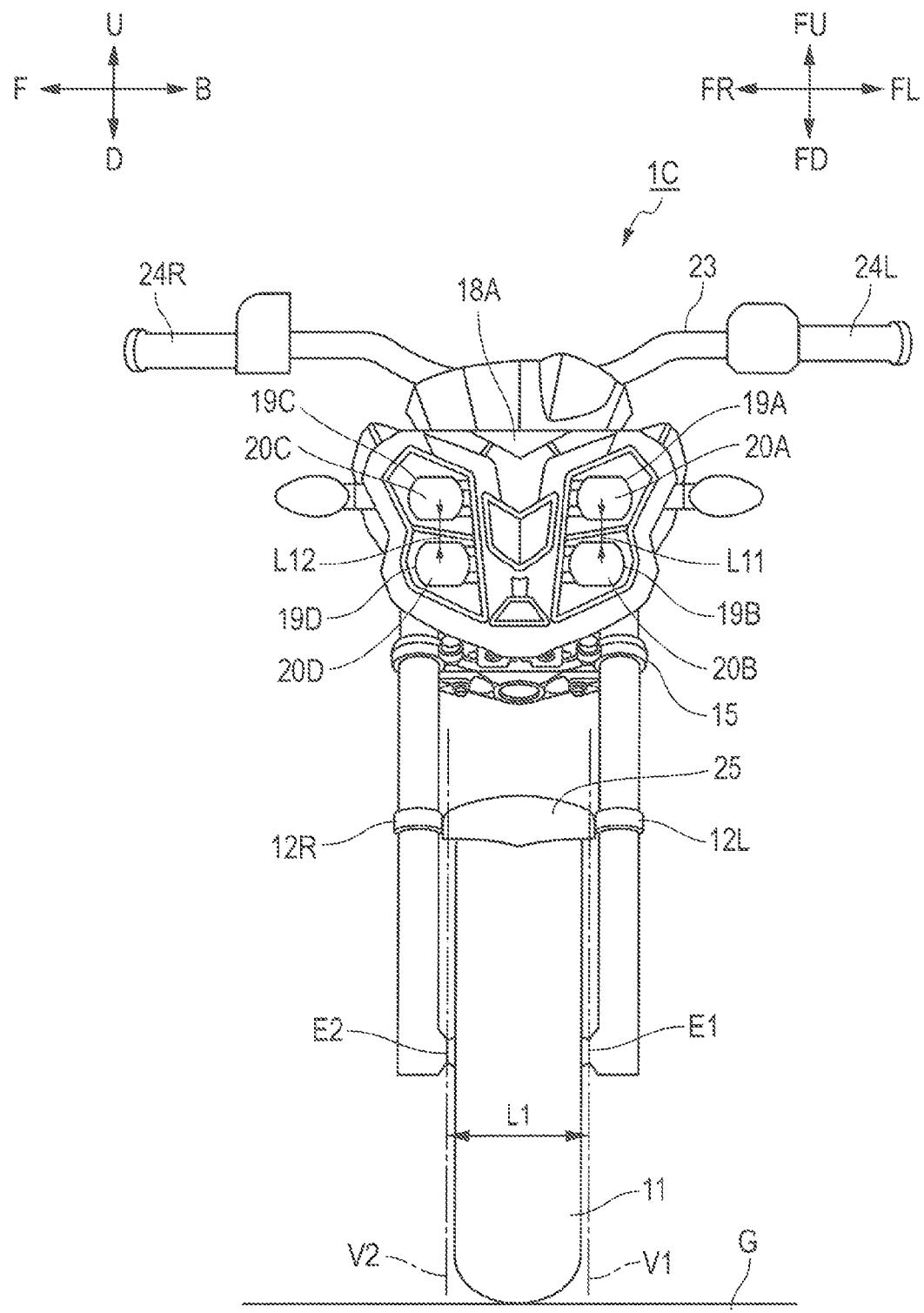
FIG. 27 is a front view illustrating the straddled vehicle according to Embodiment 4 of the present invention.
Figure 28:
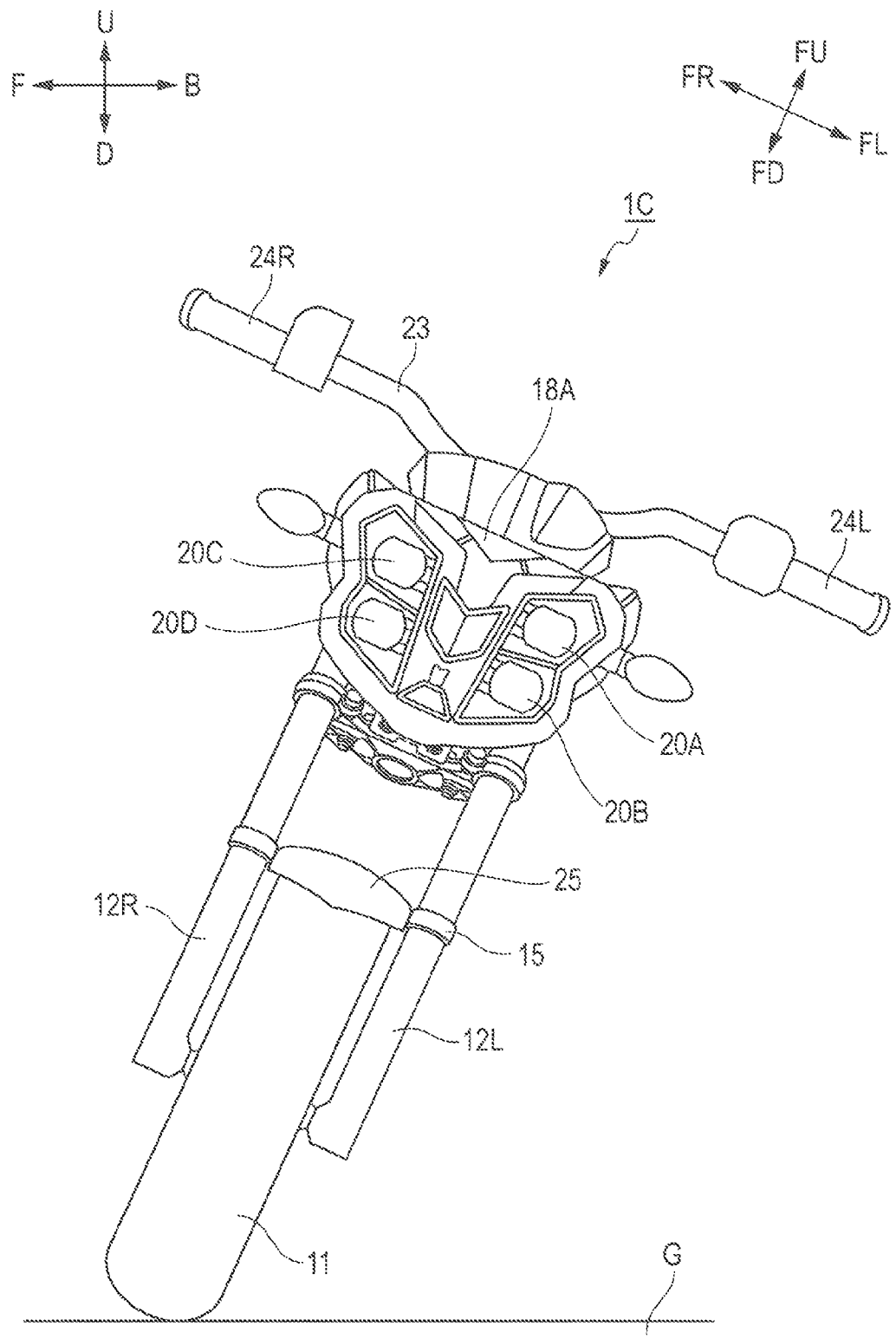
FIG. 28 is a front view of the straddled vehicle according to Embodiment 4 of the present invention during a left turn.

FIG. 26 is a side view illustrating a straddled vehicle according to Embodiment 4 of the present invention. FIG. 27 is a front view illustrating the straddled vehicle according to Embodiment 4 of the present invention. FIG. 28 is a front view illustrating the straddled vehicle according to Embodiment 4 of the present invention during a left turn.

Figure 19:
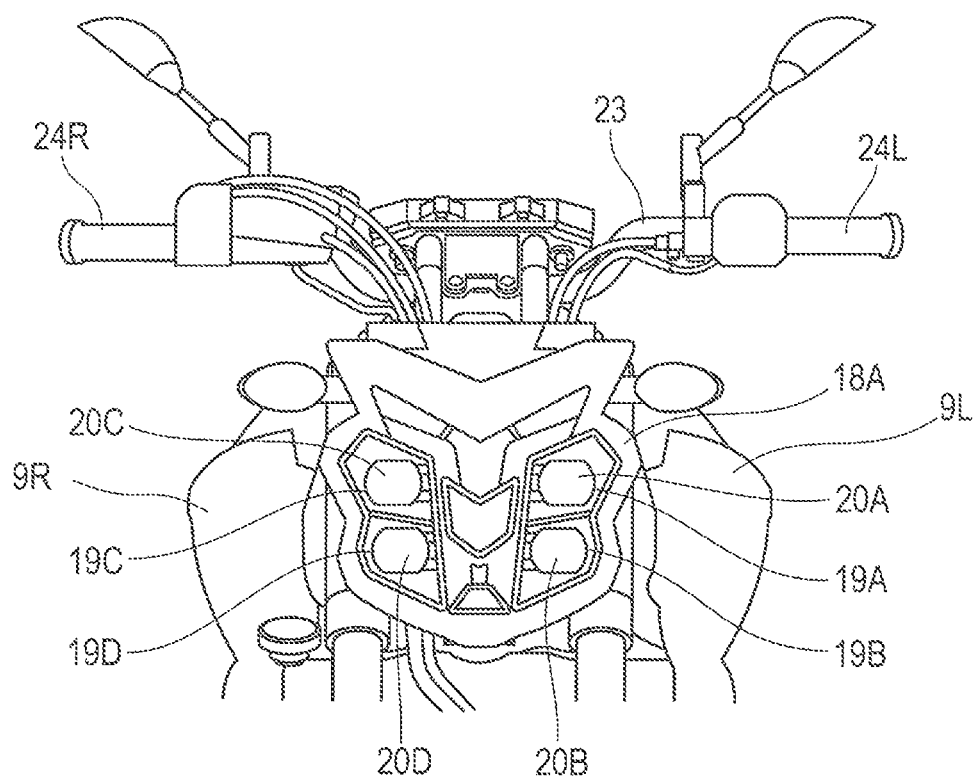
FIG. 19 is a front view of the straddled vehicle according to Embodiment 2 of the present invention.

In FIG. 26 to FIG. 28, the same components as the components shown in FIG. 18 and FIG. 19 will be assigned the same reference numerals and the description thereof will be omitted.

As shown in FIG. 26 to FIG. 28, straddled vehicle 1C includes body frame 2, fuel tank 3, seat 4, power unit 5, steering shaft 8, cover portion 9, rear wheel 10, front wheel 11, left front-wheel support unit 12L, right front-wheel support unit 12R, lower bracket 15, upper bracket 16, lamp unit 18A, handlebar 23, left grip 24L, right grip 24R, and fender 25.

As shown in FIG. 28, when the rider steers handlebar 23 and straddled vehicle 1C turns leftward, left front-wheel support unit 12L and right front-wheel support unit 12R tilt leftward with respect to ground G together with front wheel 11. Similarly, when the rider steers handlebar 23 and straddled vehicle 1C turns rightward, left front-wheel support unit 12L and right front-wheel support unit 12R tilt rightward with respect to ground G together with front wheel 11.

Lamp unit 18A is similar to that described in Embodiment 2. Light distributions obtained by first highly-directional light unit 19A, second highly-directional light unit 19B, third highly-directional light unit 19C, and fourth highly-directional light unit 19D are also similar to those described in Embodiment 2.

Lamp unit 18A is disposed forward of handlebar 23 in the front-rear direction of the vehicle and also disposed above front wheel 11 in the up-down direction of the vehicle. Lamp unit 18A is directly or indirectly supported by handlebar 23 or upper bracket 16 and is fixed to handlebar 23 or upper bracket 16.

In small straddled vehicle 1C, length L1 in the left-right direction of the vehicle between bottom-right end E1 of left front-wheel support unit 12L and bottom-left end E2 of right front-wheel support unit 12R is shorter than that of large straddled vehicle 1A. In FIG. 27, virtual lines V1 and V2 indicate the positions of bottom-right end E1 of left front-wheel support unit 12L and bottom-left end E2 of right front-wheel support unit 12R in the left-right direction of the vehicle.

However, the relationship between the size of each of first, second, third, and fourth optical lens sections 20A, 20B, 20C, and 20D of first, second, third, and fourth highly-directional light units 19A, 19B, 19C, and 19D of lamp unit 18A and length L1 between two virtual lines V1 and V2 in the left-right direction of the vehicle is similar to that described in Embodiment 2. The relationship between length L11 between first and second optical lens sections 20A and 20B of first and second highly-directional light units 19A and 19B, length L12 between third and fourth optical lens sections 20C and 20D of third and fourth highly-directional light units 19C and 19D, and length L1 between two virtual lines V1 and V2 in the left-right direction of the vehicle described in Embodiment 2 is also similar to that described in Embodiment 2.

In this way, small straddled vehicle 1C can also be equipped with lamp unit 18A similar to that in Embodiment 2 and obtain effects similar to those of Embodiment 2.

Embodiment 5

Next, a configuration in which straddled vehicle 1D with a cowl is provided with lamp unit 18A will be described.

Figure 29:
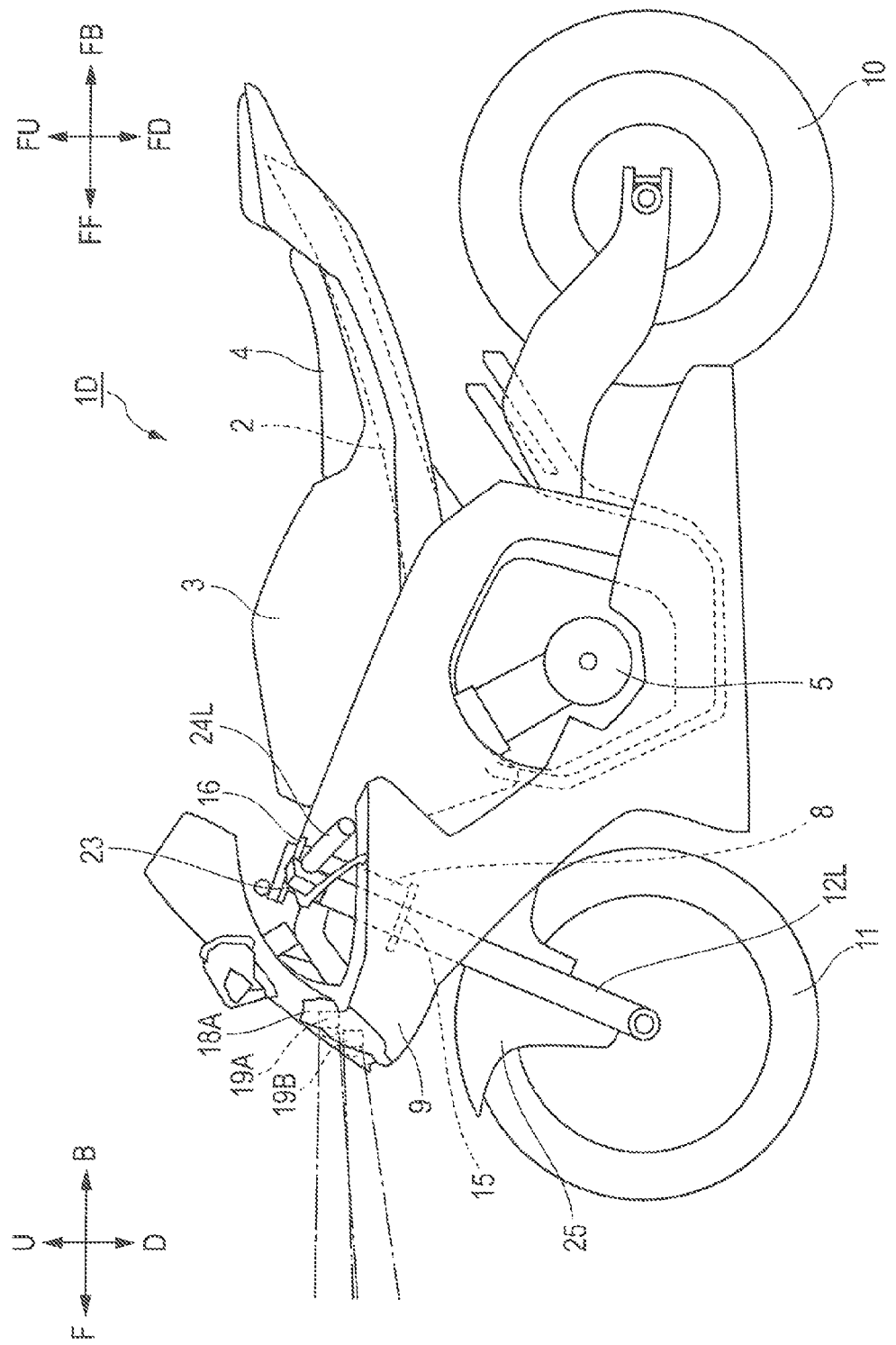
FIG. 29 is a side view illustrating a straddled vehicle according to Embodiment 5 of the present invention.
Figure 30:
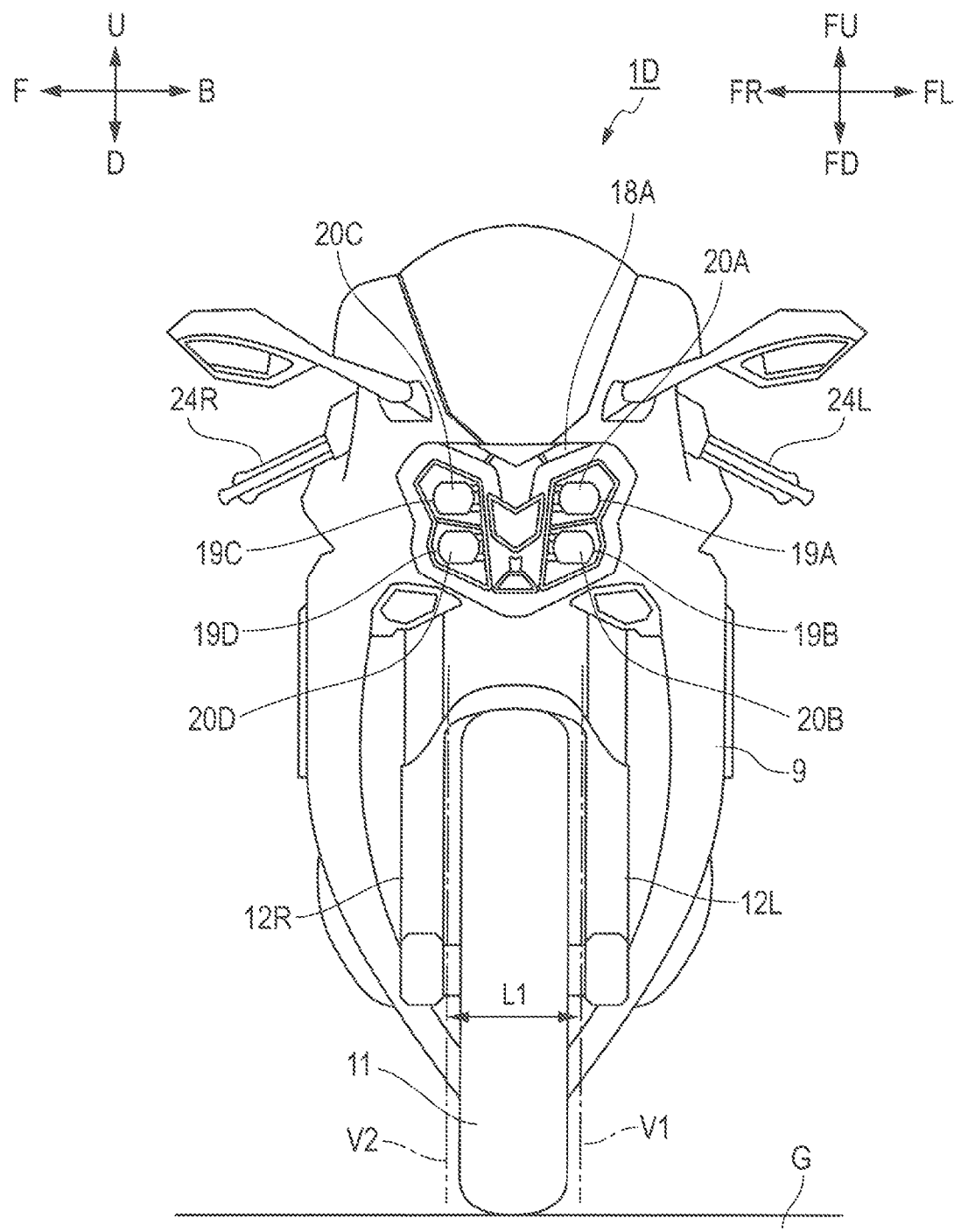
FIG. 30 is a front view illustrating the straddled vehicle according to Embodiment 5 of the present invention.
Figure 31:
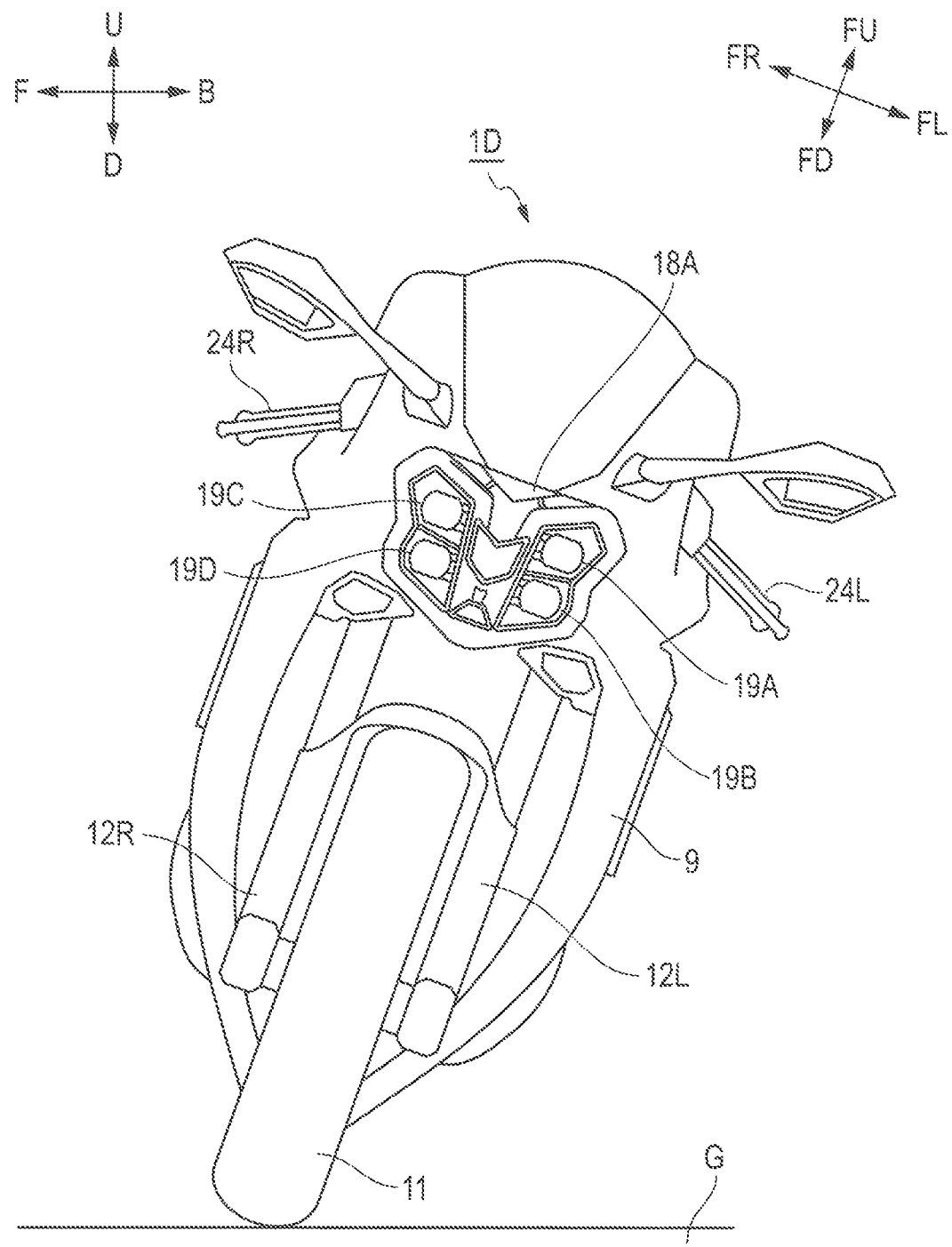
FIG. 31 is a front view of the straddled vehicle according to Embodiment 5 of the present invention during a left turn.

FIG. 29 is a side view illustrating a straddled vehicle according to Embodiment 5 of the present invention. FIG. 30 is a front view illustrating the straddled vehicle according to Embodiment 5 of the present invention. FIG. 31 is a front view of the straddled vehicle according to Embodiment 5 of the present invention during a left turn.

In FIG. 29 to FIG. 31, the same components as the components shown in FIG. 18 and FIG. 19 are assigned the same reference numerals and the description thereof will be omitted.

As shown in FIG. 29 to FIG. 31, straddled vehicle 1D includes body frame 2, fuel tank 3, seat 4, power unit 5, steering shaft 8, cowl 9, rear wheel 10, front wheel 11, left front-wheel support unit 12L, right front-wheel support unit 12R, lower bracket 15, upper bracket 16, lamp unit 18A, handlebar 23, left grip 24L, right grip 24R, and fender 25.

As shown in FIG. 31, when the rider steers handlebar 23 and straddled vehicle 1D turns leftward, left front-wheel support unit 12L and right front-wheel support unit 12R tilt to the left of the vehicle with respect to ground G together with front wheel 11. Similarly, when the rider steers handlebar 23 and straddled vehicle 1D turns rightward, left front-wheel support unit 12L and right front-wheel support unit 12R tilt to the right of the vehicle with respect to ground G together with front wheel 11.

Cowl 9 is directly or indirectly supported by body frame 2. Cowl 9 covers the front and part of the top of handlebar 23 and at least part of the left, right and bottom of power unit 5 in the front-rear direction, left-right direction, and up-down direction of the vehicle.

Lamp unit 18A is similar to the one described in Embodiment 2. The light distributions obtained by first highly-directional light unit 19A, second highly-directional light unit 19B, third highly-directional light unit 19C, and fourth highly-directional light unit 19D are also similar to those described in Embodiment 2.

Lamp unit 18A is disposed forward of handlebar 23 in the front-rear direction of the vehicle and also disposed above front wheel 11 in the up-down direction of the vehicle. Lamp unit 18A is directly or indirectly supported by body frame 2 and fixed to body frame 2. In lamp unit 18A, front cover 46 may also be configured to be integral with cowl 9.

In straddled vehicle 1D, length L1 between bottom-right end E1 of left front-wheel support unit 12L and bottom-left end E2 of right front wheel length apparatus 12R in the left-right direction of the vehicle may be different from that of the other straddled vehicles. In FIG. 30, virtual lines V1 and V2 indicate the positions of bottom-right end E1 of left front-wheel support unit 12L and bottom-left end E2 of right front-wheel support unit 12R in the left-right direction of the vehicle.

However, the relationship between the size of each of first, second, third, and fourth optical lens sections 20A, 20B, 20C, and 20D of first, second, third, and fourth highly-directional light units 19A, 19B, 19C, and 19D of lamp unit 18A and length L1 between two virtual lines V1 and V2 in the left-right direction of the vehicle is similar to that described in Embodiment 2. The relationship between length L11 between first and second optical lens sections 20A and 20B of first and second highly-directional light units 19A and 19B, length L12 between third and fourth optical lens sections 20C and 20D of third and fourth highly-directional light units 19C and 19D and length L1 between two virtual lines V1 and V2 in the left-right direction of the vehicle is also similar to that described in Embodiment 2.

Thus, straddled vehicle 1D with a cowl can also be equipped with lamp unit 18A similar to that of Embodiment 2 and obtain effects similar to those of Embodiment 2.

Embodiment 6

Next, a configuration in which straddled vehicle 1E including left front wheel 11L and right front wheel 11R is provided with lamp unit 18A will be described.

Figure 32:
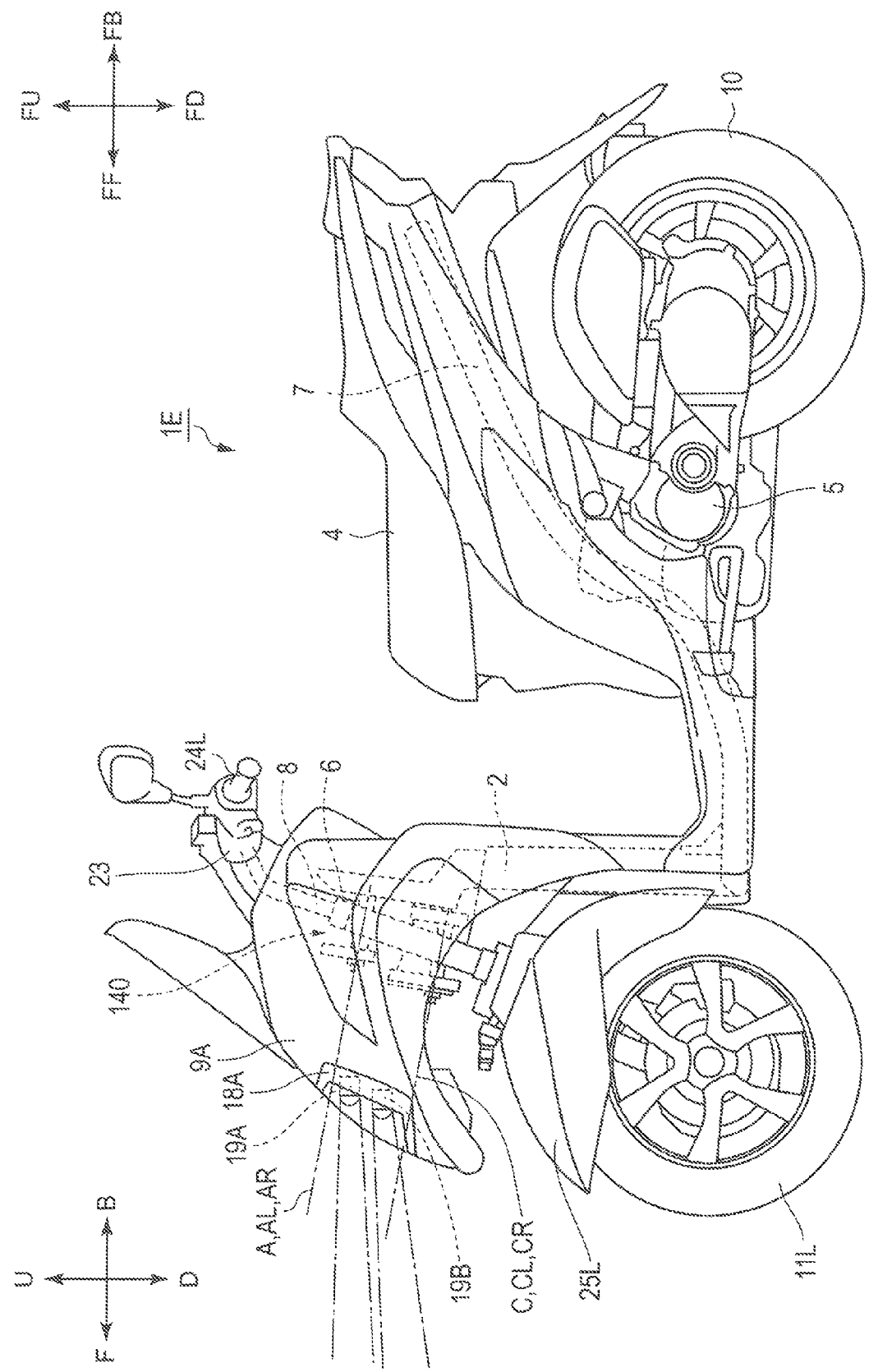
FIG. 32 is a side view illustrating a straddled vehicle according to Embodiment 6 of the present invention.
Figure 33:
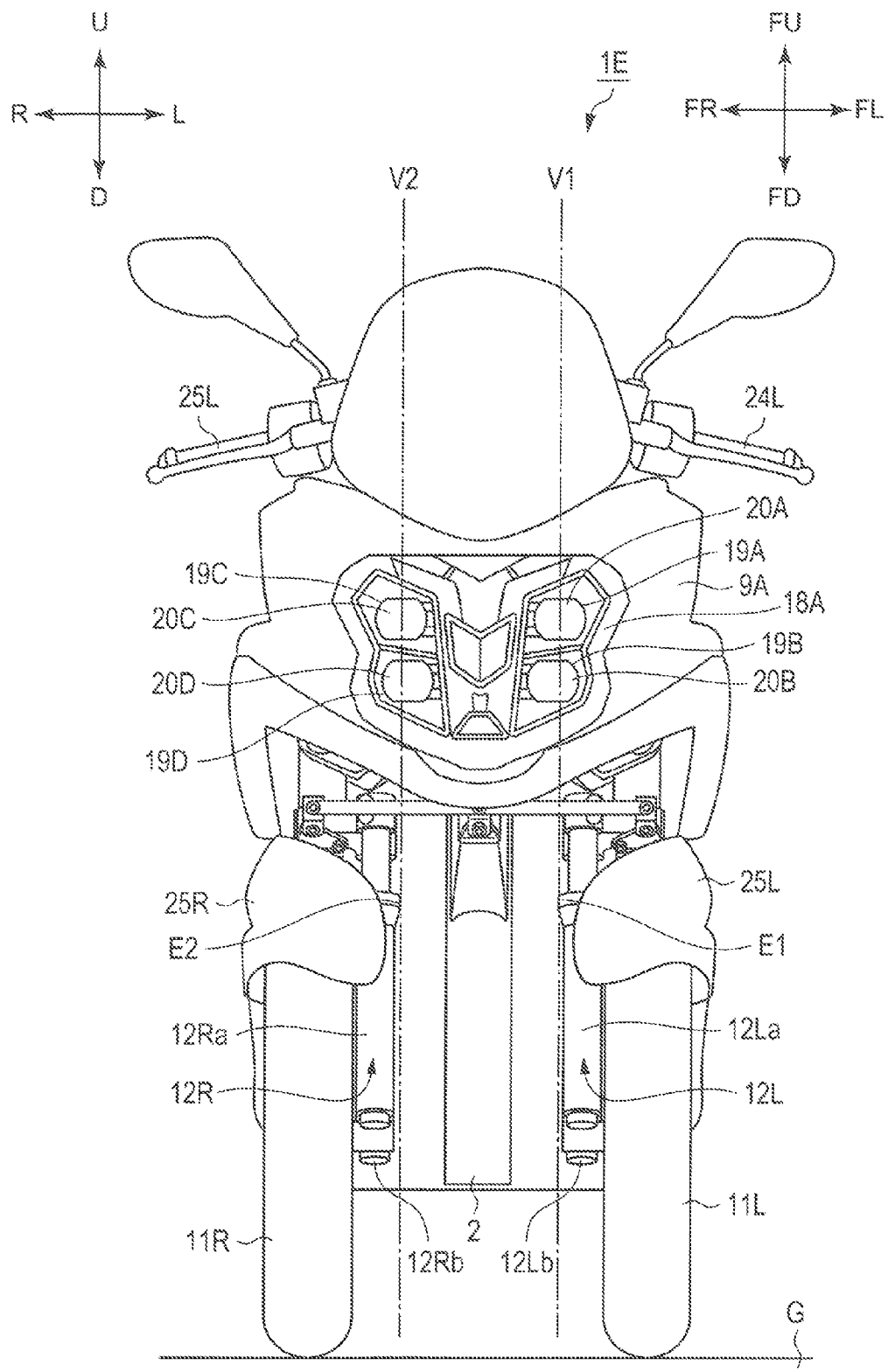
FIG. 33 is a front view illustrating the straddled vehicle according to Embodiment 6 of the present invention.

FIG. 32 is a side view illustrating a straddled vehicle according to Embodiment 6 of the present invention. FIG. 33 is a front view illustrating the straddled vehicle according to Embodiment 6 of the present invention.

As shown in FIG. 32 and FIG. 33, straddled vehicle 1E includes body frame 2, seat 4, power unit 5, steering shaft 8, front cover 10, a front wheel having left front wheel 11L and right front wheel 11R, left front-wheel support unit 12L, right front-wheel support unit 12R, link mechanism 140, lamp unit 18A, handlebar 23, left grip 24L, right grip 24R, left fender 25L, and right fender 25R.

Body frame 2 includes head pipe 6 and body frame 7. Body frame 7 is connected to head pipe 6 and disposed behind head pipe 6 in the front-rear direction of the vehicle.

Steering shaft 8 is turnably supported by body frame 2. For example, steering shaft 8 is inserted through a hole of head pipe 6 and turns around a central shaft of head pipe 6.

Front cover 9A covers at least part of the front, left, right and rear of link mechanism 140 in the front-rear direction and the left-right direction of the vehicle. Front cover 9A is supported by body frame 2. Front cover 9A is provided in front of lamp unit 18A.

Left front wheel 11L and right front wheel 11R are arranged side by side in the left-right direction of body frame 2. Left front wheel 11L and right front wheel 11R tilt leftward or right in the left-right direction of the vehicle together with body frame 2.

Figure 34:
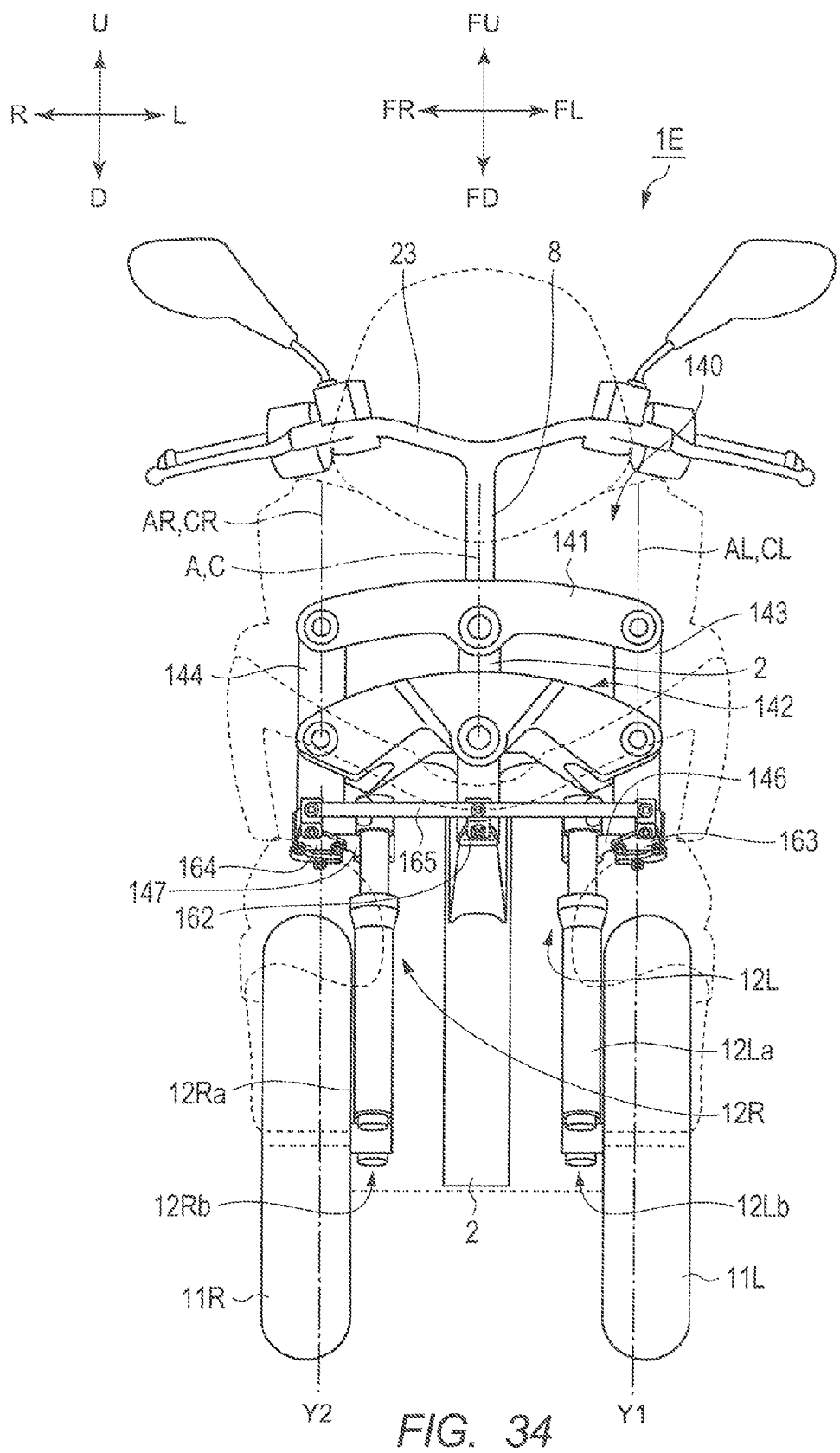
FIG. 34 is a front view for describing a link mechanism of the straddled vehicle according to Embodiment 6 of the present invention.
Figure 35:
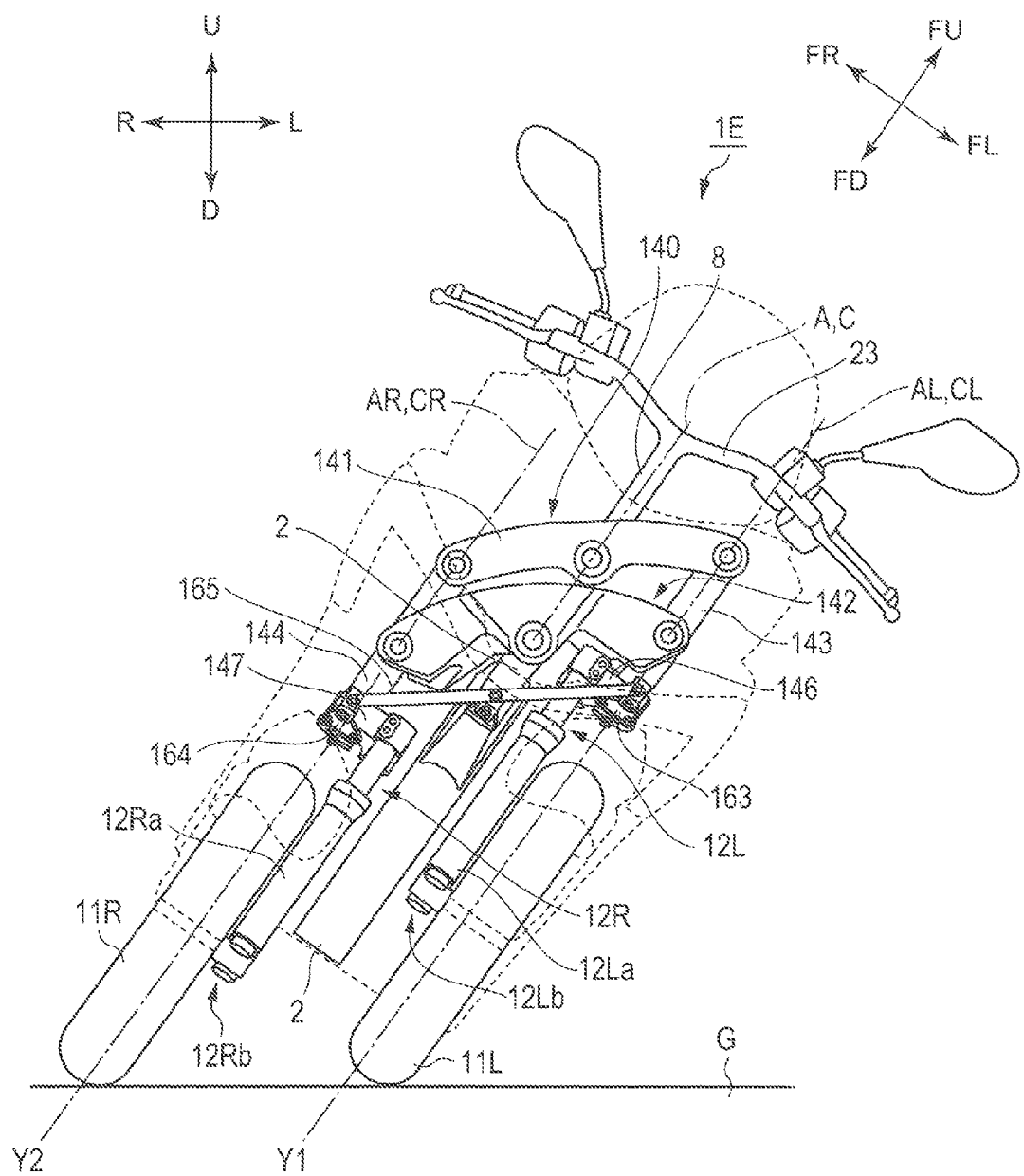
FIG. 35 is a front view for describing the straddled vehicle according to Embodiment 6 of the present invention during a left turn.
Figure 36:
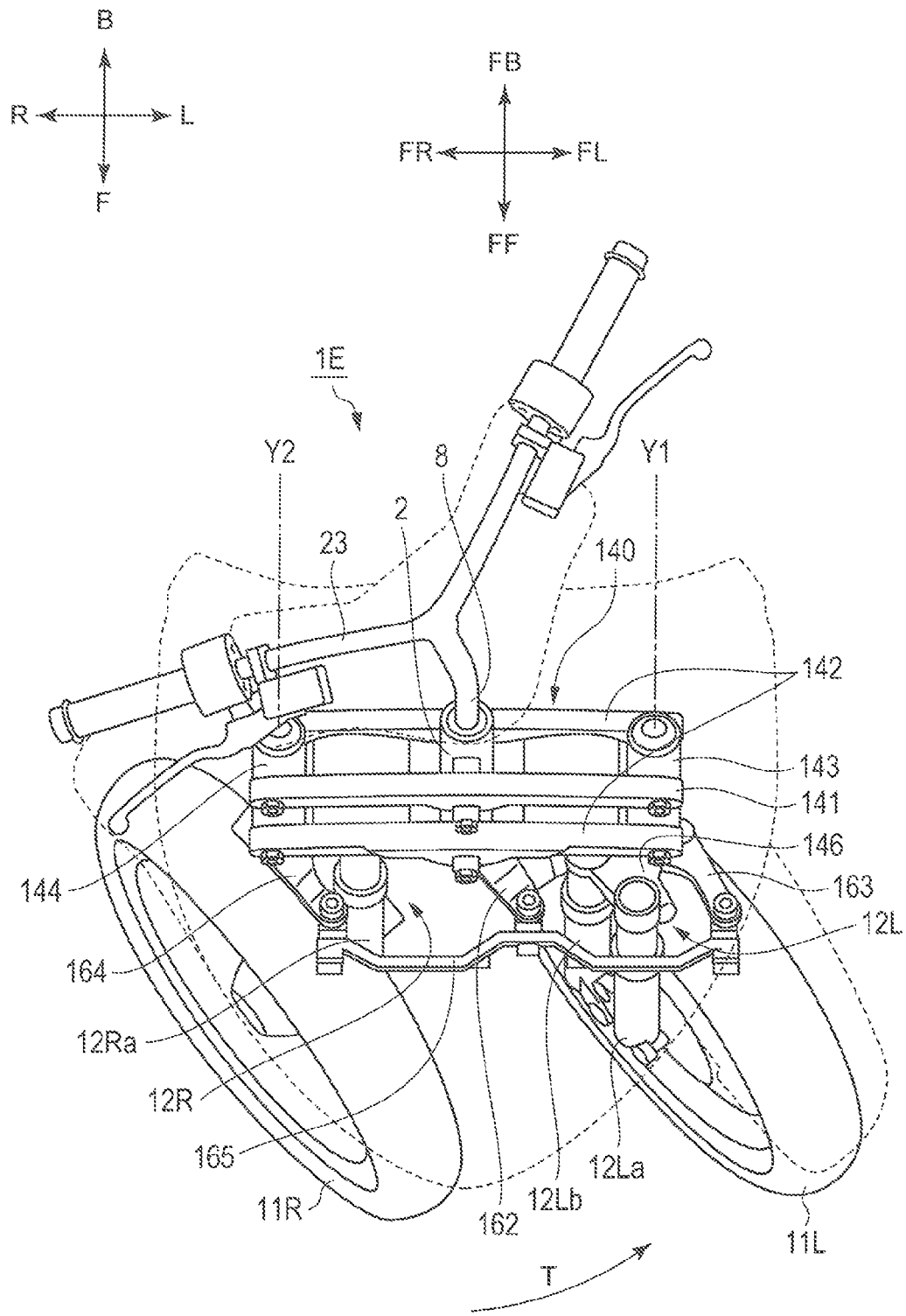
FIG. 36 is a plan view for describing when a handlebar of the straddled vehicle according to Embodiment 6 of the present invention is steered leftward.

FIG. 34 is a front view for describing a link mechanism of the straddled vehicle according to Embodiment 6 of the present invention. FIG. 35 is a front view for describing the straddled vehicle according to Embodiment 6 of the present invention during a left turn. FIG. 36 is a plan view for describing when the handlebar of the straddled vehicle according to Embodiment 6 of the present invention is steered leftward.

As shown in, FIG. 34, FIG. 35 and FIG. 36, link mechanism 140 is a mechanism based on a parallel four-joint link scheme (also called "parallelogram link").

Link mechanism 140 is supported by body frame 2. As the configuration for tilting body frame 2 with respect to ground G during a turn of straddled vehicle 1E, link mechanism 140 includes upper cross member 141, lower cross member 142, left-side rod 143 and right-side rod 144.

Upper cross member 141, lower cross member 142, left-side rod 143 and right-side rod 144 are arranged below handlebar 23 and above the top ends of left front wheel 11L and right front wheel 11R in the up-down direction of the vehicle.

Upper cross member 141 is long in the left-right direction of the vehicle and an intermediate part thereof is supported by body frame 2. Upper cross member 141 is supported turnably around upper axial line A (see FIG. 32, FIG. 34 and FIG. 35) extending in the front-rear direction of body frame 2. Upper axial line A may also include a component in the up-down direction of body frame 2.

The left end portion of upper cross member 141 is supported by left-side rod 143. Upper cross member 141 is turnable with respect to left-side rod 143 around a left upper axial line AL (see FIG. 32, FIG. 34 and FIG. 35) parallel to upper axial line A. The right end portion of upper cross member 141 is supported by right-side rod 144. Upper cross member 141 is turnable with respect to right-side rod 144 around a right upper axial line AR (see FIG. 32, FIG. 34 and FIG. 35) parallel to upper axial line A.

Lower cross member 142 is long in the left-right direction of the vehicle and an intermediate part thereof is supported by body frame 2. Lower cross member 142 is supported so as to be turnable around lower axial line C (see FIG. 34) parallel to upper axial line A. Lower cross member 142 is disposed at a position of body frame 2 lower than upper cross member 141 in the up-down direction. Lower cross member 142 has substantially the same length as that of upper cross member 141 in the left-right direction of body frame 2 and is disposed parallel to upper cross member 141.

The left end of lower cross member 142 is supported by left-side rod 143. Lower cross member 142 is rotatable with respect to left-side rod 143 around left lower axial line CL parallel to lower axial line C. The right end portion of lower cross member 142 is supported by right-side rod 144. Lower cross member 142 is turnable with respect to right-side rod 144 around right lower axial line CR parallel to lower axial line C.

Left-side rod 143 is long in the up-down direction of body frame 2 and is disposed to the left of steering shaft 8 in the left-right direction of the vehicle and in a direction parallel to the direction in which steering shaft 8 extends. Left-side rod 143 is disposed above body frame 2 of left front wheel 11L in the up-down direction. Left-side rod 143 turnably supports left front-wheel support unit 12L around left axial line Y1.

Right-side rod 144 is long in the up-down direction of body frame 2 and is disposed to the right of steering shaft 8 in the left-right direction of the vehicle and in a direction parallel to the direction in which steering shaft 8 extends. Right-side rod 144 is disposed above body frame 2 of right front wheel 11R in the up-down direction. Right-side rod 144 turnably supports right front-wheel support unit 12R around right axial line Y2.

Upper cross member 141, lower cross member 142, left-side rod 143, and right-side rod 144 are supported so that upper cross member 141 and lower cross member 142 are kept parallel to each other and so that left-side rod 143 and right-side rod 144 are kept parallel to each other.

A steering mechanism is provided between handlebar 23, and left front wheel 11L and right front wheel 11R. The steering mechanism includes steering shaft 8, center steering arm 162, tie rod 165, left steering arm 163, right steering arm 164, left front-wheel support unit 12L, and right front-wheel support unit 12R.

Left front-wheel support unit 12L includes left shock absorber 12La, left bracket 146, and left turn prevention mechanism 12Lb. Left front-wheel support unit 12L is supported by left-side rod 143 and tilted together with left-side rod 143.

Left shock absorber 12La attenuates vibration from a road surface through, for example, a telescopic structure. The top end of left shock absorber 12La is fixed to left bracket 146. The bottom end of the left shock absorber supports left front wheel 11L. Thus, left shock absorber 12La damps displacement in the up-down direction of body frame 2 of left front wheel 11L with respect to the top of left shock absorber 12La.

Left turn prevention mechanism 12Lb is disposed parallel to left shock absorber 12La. Left turn prevention mechanism 12Lb has a telescopic structure. The top end of left turn prevention mechanism 12Lb is fixed to left bracket 146. The bottom end of left turn prevention mechanism 12Lb supports left front wheel 11L.

Left shock absorber 12La and left turn prevention mechanism 12Lb support left front wheel 11L so that left bracket 146 and left front wheel 11L are associated with each other to prevent the orientation of left bracket 146 from changing relative to the orientation of left front wheel 11L.

Right front-wheel support unit 12R includes right shock absorber 12Ra, right bracket 147 and right turn prevention mechanism 12Rb. Right front-wheel support unit 12R is supported by right-side rod 144 and tilts together with right-side rod 144.

Right shock absorber 12Ra attenuates vibration from a road surface through, for example, a telescopic structure. The top end of right shock absorber 12Ra is fixed to right bracket 147. The bottom of right shock absorber 12Ra supports right front wheel 11R. Thus, right shock absorber 12Ra damps displacement in the up-down direction of body frame 2 of right front wheel 11R with respect to the top of right shock absorber 12Ra.

Right turn prevention mechanism 12Rb is disposed parallel to right shock absorber 12Ra. Right turn prevention mechanism 12Rb has a telescopic structure. The top end of right turn prevention mechanism 12Rb is fixed to right bracket 147. The bottom end of right turn prevention mechanism 12Rb supports right front wheel 11R.

Right shock absorber 12Ra and right turn prevention mechanism 12Rb support right front wheel 11R so that right bracket 147 and right front wheel 11R are associated with each other to prevent the orientation of right bracket 147 from changing relative to the orientation of right front wheel 11R.

Center steering arm 162 and tie rod 165 are arranged above left front wheel 11L and right front wheel 11R in the up-down direction of body frame 2. One end of center steering arm 162 is fixed to steering shaft 8 and turns together with steering shaft 8. The other end of center steering arm 162 is supported by tie rod 165. Center steering arm 162 transmits the turning of steering shaft 8 to tie rod 165.

Left steering arm 163 is fixed to left bracket 146.
Right steering arm 164 is fixed to right bracket 147.
Tie rod 165 supports center steering arm 162, left steering arm 163 and right steering arm 164, and transmits the turning of center steering arm 162 to left steering arm 163 and right steering arm 164.

With these configurations, as shown in FIG. 36, when handlebar 23 is operated and steering shaft 8 and center steering arm 162 turn, left bracket 146 and right bracket 147 turn at the same angle. Thus, left front wheel 11L and right front wheel 11R are steered in identical direction T.

Furthermore, the upper part of left front-wheel support unit 12L is supported by body frame 2 via link mechanism 140, and the lower part thereof supports left front wheel 11L of the front wheel so that the lower part is displaceable with respect to the upper part in the up-down direction of body frame 2. Left front-wheel support unit 12L is located on the left of steering shaft 8 in the left-right direction of the vehicle, turns together with steering shaft 8 through steering of handlebar 23, tilts to the left of the vehicle together with left front wheel 11L when straddled vehicle 1E turns leftward, and tilts to the right of the vehicle together with left front wheel 11L when straddled vehicle 1E turns rightward. Note that the direction in which the lower part of left front-wheel support unit 12L is displaced with respect to the upper part may include components in the front-rear direction and the left-right direction of body frame 2.

The upper part of right front-wheel support unit 12R is supported by body frame 2 via link mechanism 140, and the lower part thereof supports right front wheel 11R of the front wheel so that the lower part is displaceable with respect to the upper part in the up-down direction of the vehicle. Right front-wheel support unit 12R is located on the right of steering shaft 8 in the left-right direction of the vehicle, turns together with steering shaft 8 through steering of handlebar 23, tilts to the left of the vehicle together with right front wheel 11R when straddled vehicle 1E turns leftward, and tilts to the right of the vehicle together with right front wheel 11R when straddled vehicle 1E turns rightward. Note that the direction in which the lower part of right front-wheel support unit 12R displaces with respect to the upper part may include components in the front-rear direction and the left-right direction of body frame 2.

Left front-wheel support unit 12L fixedly supports left fender 25L that covers the upper part of left front wheel 11L in the up-down direction of the vehicle.

Right front-wheel support unit 12R fixedly supports right fender 25R that covers the upper part of right front wheel 11R in the up-down direction of the vehicle.

In FIG. 33, virtual line V1 is a line that extends vertically, passing through bottom-right end E1 of left front-wheel support unit 12L. Virtual line V2 is a line that extends vertically, passing through bottom-left end E2 of right front-wheel support unit 12R.

In straddled vehicle 1E, length L1 between bottom-right end E1 of left front-wheel support unit 12L and bottom-left end E2 of right front-wheel support unit 12R in the left-right direction of the vehicle may be different from that of other straddled vehicles.

However, the relationship between the size of each of first, second, third, and fourth optical lens sections 20A, 20B, 20C, and 20D of first, second, third, and fourth highly-directional light units 19A, 19B, 19C, and 19D of lamp unit 18A and length L1 between two virtual lines V1 and V2 in the left-right direction of the vehicle is similar to that described in Embodiment 2. The relationship between length L11 between first and second optical lens sections 20A and 20B of first and second highly-directional light units 19A and 19B, length L12 between third and fourth optical lens sections 20C and 20D of third and fourth highly-directional light units 19C and 19D and length L1 between two virtual lines V1 and V2 in the left-right direction of the vehicle is also similar to that described in Embodiment 2.

Thus, straddled vehicle 1E including left front wheel 11L and right front wheel 11R can also be provided with lamp unit 18A similar to that of Embodiment 2 and obtain effects similar to those of Embodiment 2.

Embodiment 7

Next, naked type straddled vehicle 1F including lamp unit 18B which is round in a front view will be described.

Figure 37:
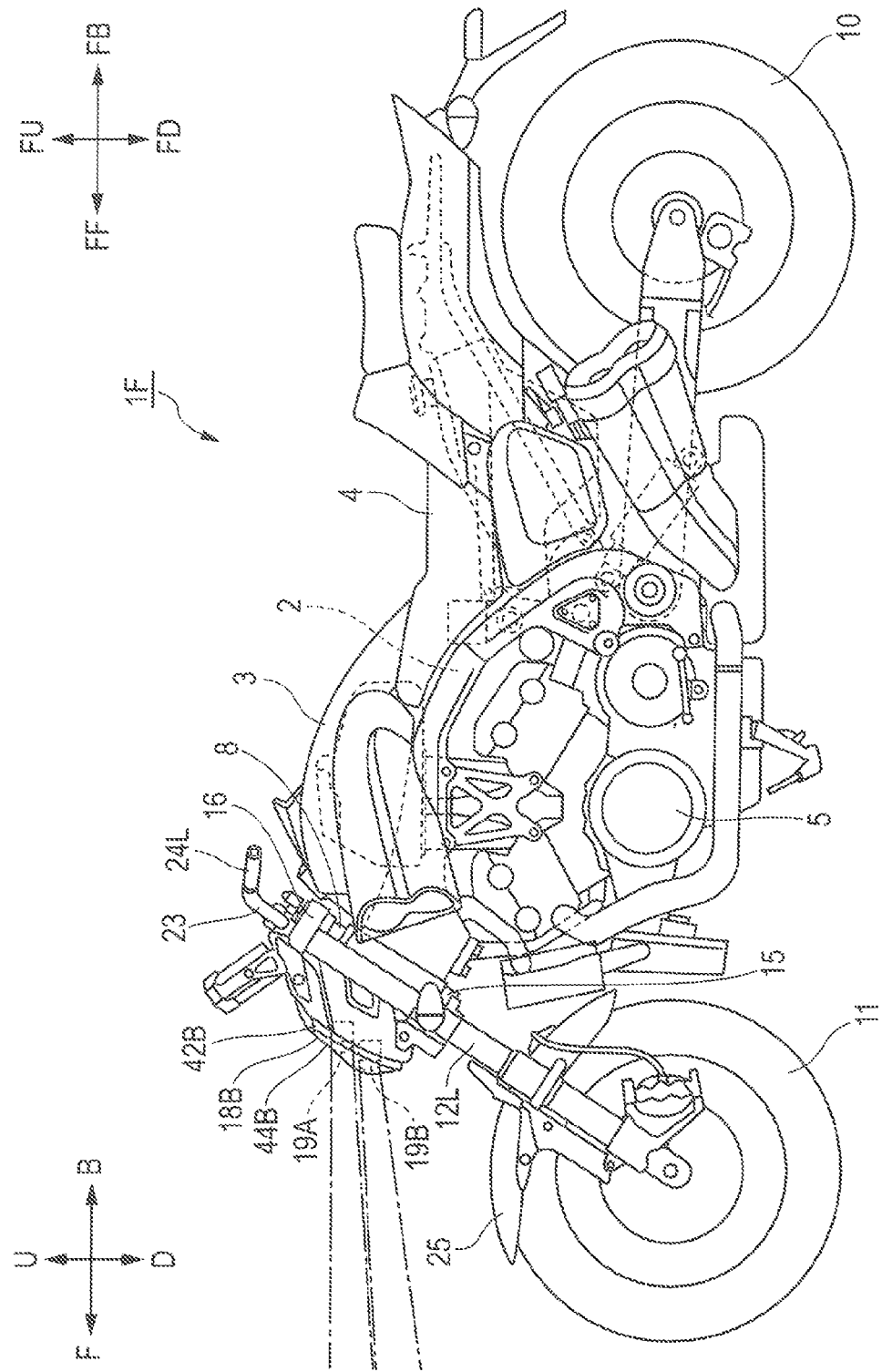
FIG. 37 is a side view illustrating a straddled vehicle according to Embodiment 7 of the present invention.
Figure 38:
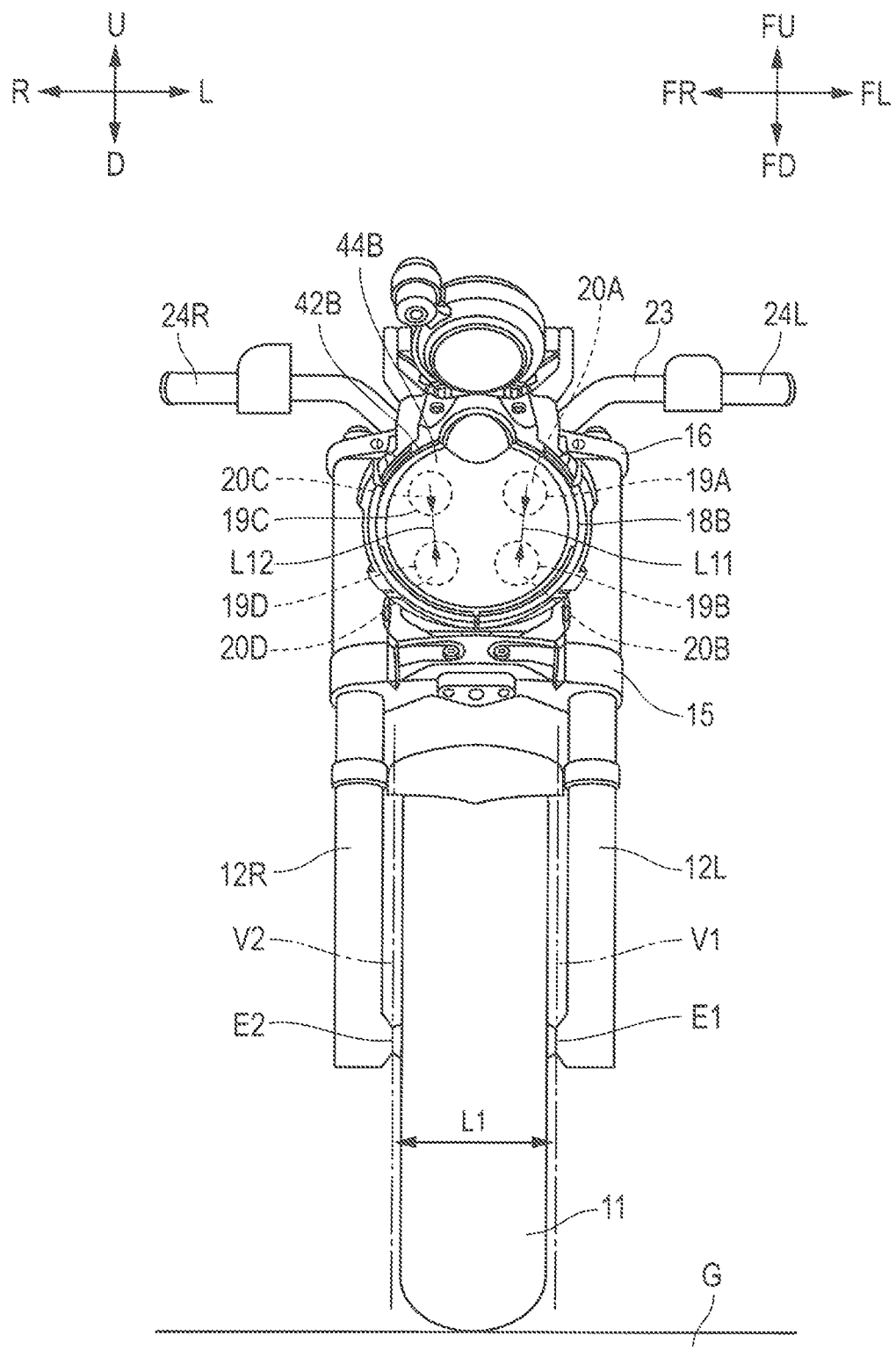
FIG. 38 is a front view illustrating the straddled vehicle according to Embodiment 7 of the present invention.
Figure 39:
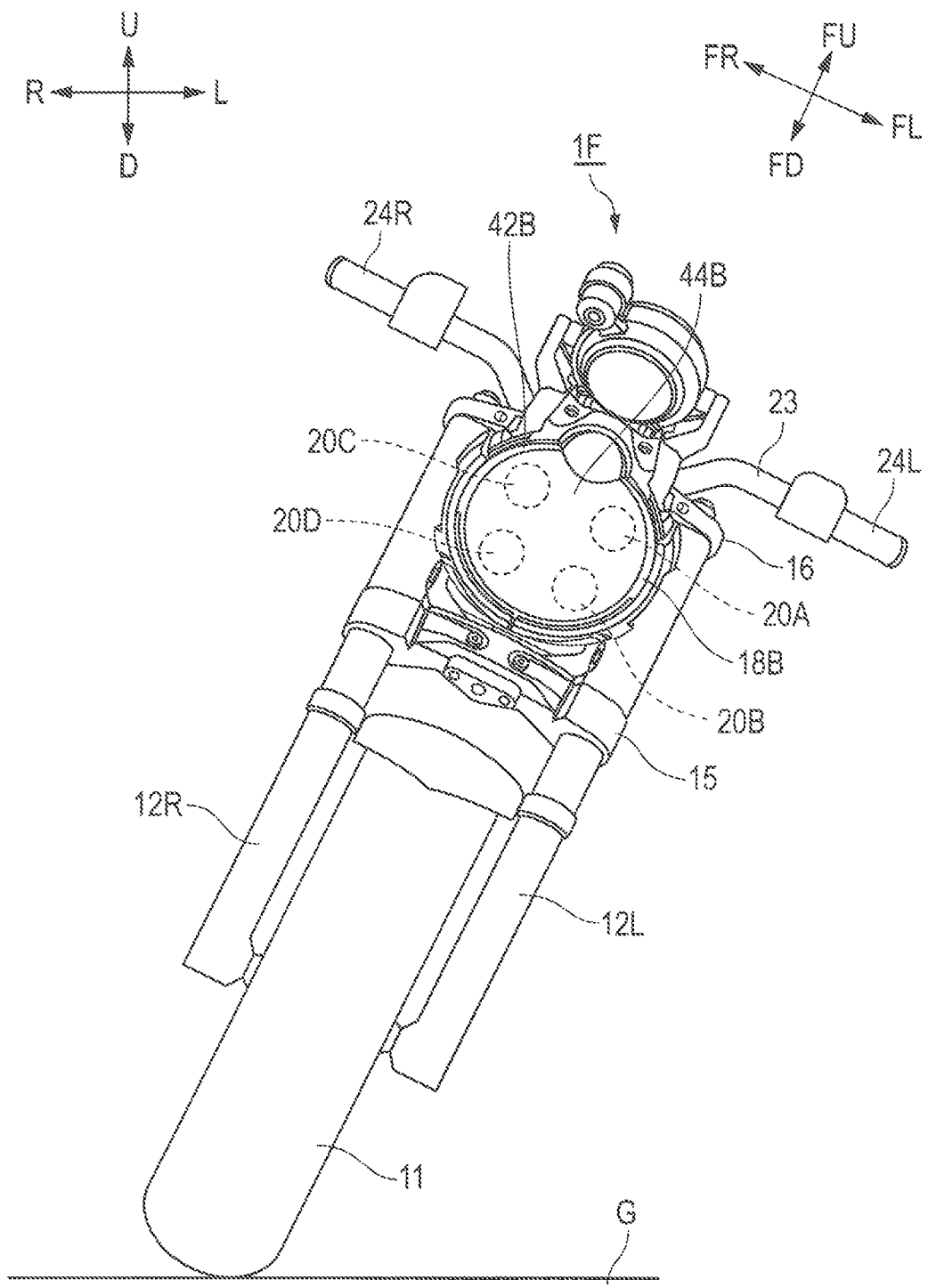
FIG. 39 is a front view of the straddled vehicle according to Embodiment 7 of the present invention during a left turn.

FIG. 37 is a side view illustrating a straddled vehicle according to Embodiment 7 of the present invention. FIG. 38 is a front view illustrating the straddled vehicle according to Embodiment 7 of the present invention. FIG. 39 is a front view illustrating the straddled vehicle according to Embodiment 7 of the present invention during a left turn.

In FIG. 37 to FIG. 39, the same components as the components shown in FIG. 18 and FIG. 19 are assigned the same reference numerals and the description thereof will be omitted.

As shown in FIG. 37 to FIG. 39, straddled vehicle 1F includes body frame 2, fuel tank 3, seat 4, power unit 5, steering shaft 8, rear wheel 10, front wheel 11, left front-wheel support unit 12L, right front-wheel support unit 12R, lower bracket 15, upper bracket 16, lamp unit 18B, handlebar 23, left grip 24L, right grip 24R, and fender 25.

As shown in FIG. 39, when a rider steers handlebar 23 and straddled vehicle 1F turns leftward, left front-wheel support unit 12L and right front-wheel support unit 12R tilt to the left of the vehicle with respect to ground G together with front wheel 11. Similarly, when the rider steers handlebar 23 and straddled vehicle 1F turns rightward, left front-wheel support unit 12L and right front-wheel support unit 12R tilt to the right of the vehicle with respect to ground G together with front wheel 11.

Lamp unit 18B includes casing 42B and outer cover 44B which are round in a front view. The "round" type includes shapes like a true circle or an ellipse, or a true circle or an ellipse partially including a square-angular part, an overhang or a notch. Casing 42B has a front which is open in the front-rear direction of the vehicle and outer cover 45B covers the front of casing 42B in the front-rear direction of the vehicle.

In comparison with lamp unit 18A in FIG. 21, lamp unit 18B has no front cover 46, and casing 42, and outer covers 45L and 45R are changed to casing 42B and outer cover 45B having different shapes respectively. Lamp unit 18B likewise includes first, second, third, and fourth highly-directional light units 19A, 19B, 19C, and 19D, first base portion 43L, and second base portion 43R shown in FIG. 21.

Lamp unit 18B is disposed forward of handlebar 23 in the front-rear direction of the vehicle and disposed above front wheel 11 in the up-down direction of the vehicle. Lamp unit 18A is directly or indirectly supported by handlebar 23 or upper bracket 16 and fixed with respect to handlebar 23 or upper bracket 16.

The relationship between each maximum width and each minimum width of first, second, third, and fourth optical lens sections 20A, 20B, 20C, and 20D of first, second, third, and fourth highly-directional light units 19A, 19B, 19C, and 19D, length L11 between first and second optical lens sections 20A and 20B, and length L1 between virtual line V1 and virtual line V2 in the left-right direction of the vehicle satisfies the conditions described in Embodiment 2. In FIG. 38, virtual lines V1 and V2 indicate the positions of bottom-right end E1 of left front-wheel support unit 12L and bottom-left end E2 of right front-wheel support unit 12R in the left-right direction of the vehicle.

Thus, in straddled vehicle 1F including round lamp unit 18B, first, second, third, and fourth optical lens sections 20A, 20B, 20C, and 20D of first, second, third, and fourth highly-directional light units 19A, 19B, 19C, and 19D can also be disposed in the same arrangement as that of lamp unit 18A in Embodiment 2. Thus, straddled vehicle 1F including round lamp unit 18B can also obtain effects similar to those of Embodiment 2.

Embodiment 8

Next, a configuration in which scooter type straddled vehicle 1G including handlebar cover 26 is provided with lamp unit 18 will be described.

Figure 40:
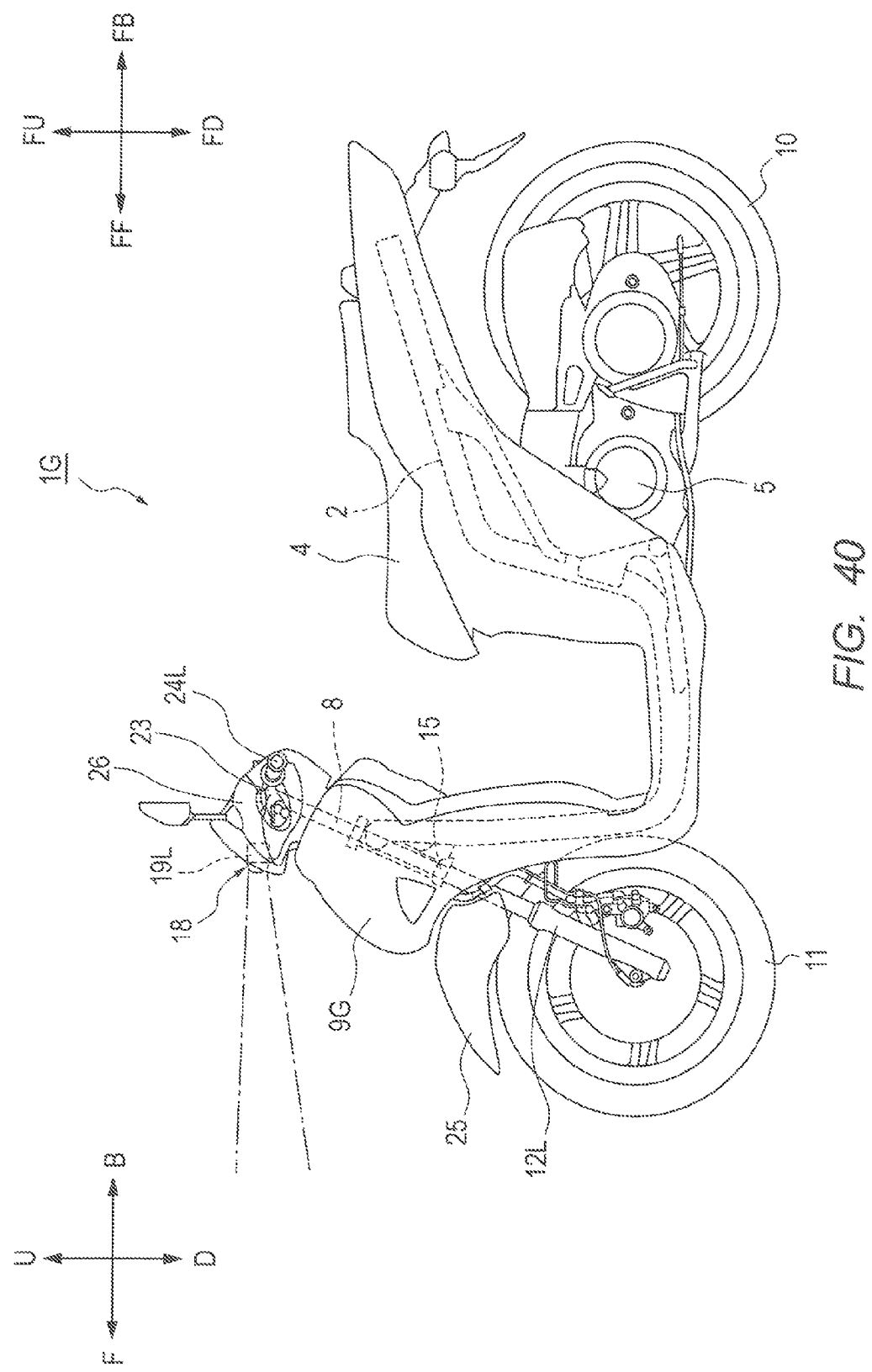
FIG. 40 is a side view illustrating a straddled vehicle according to Embodiment 8 of the present invention.
Figure 41:
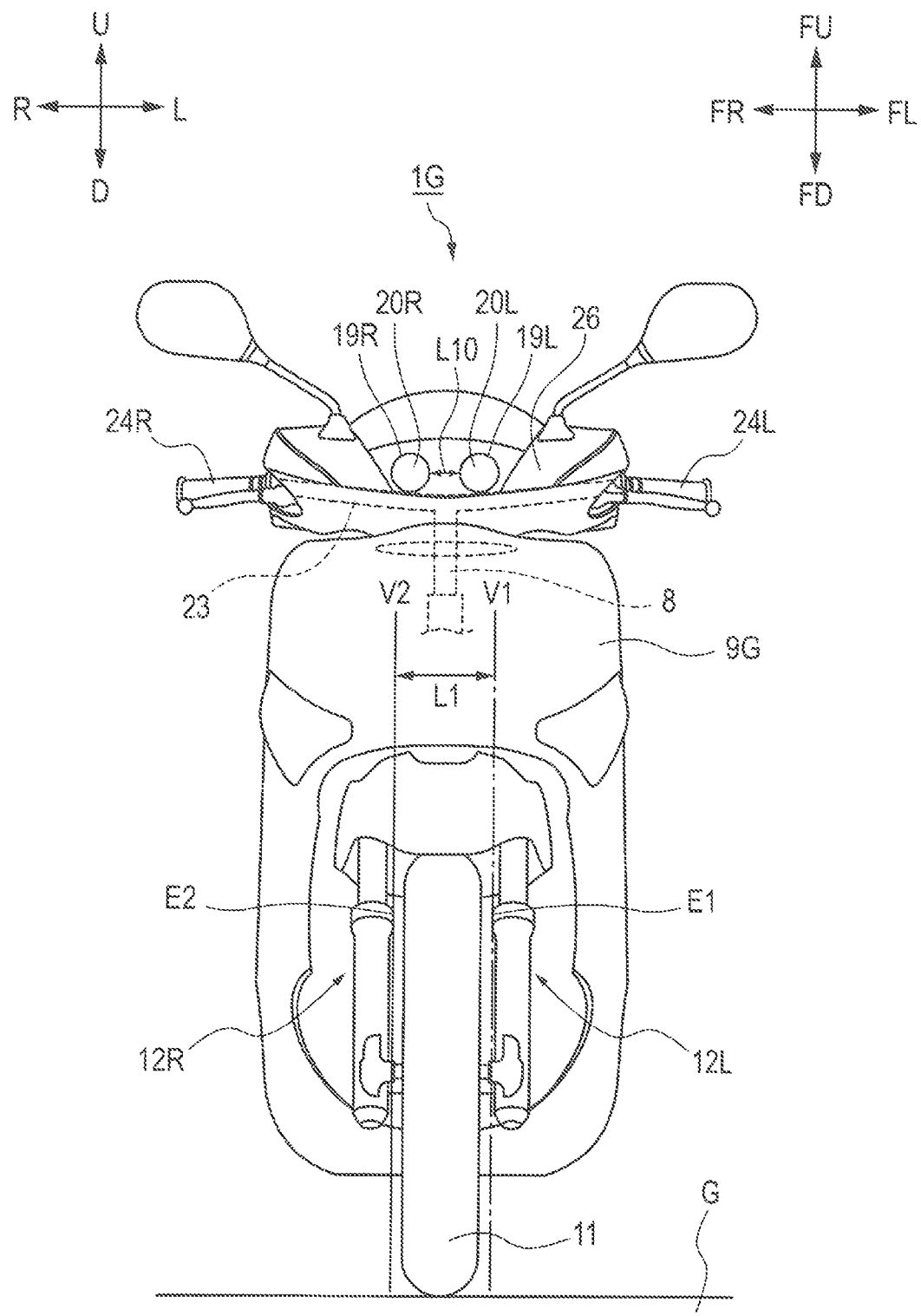
FIG. 41 is a front view illustrating the straddled vehicle according to Embodiment 8 of the present invention.
Figure 42:
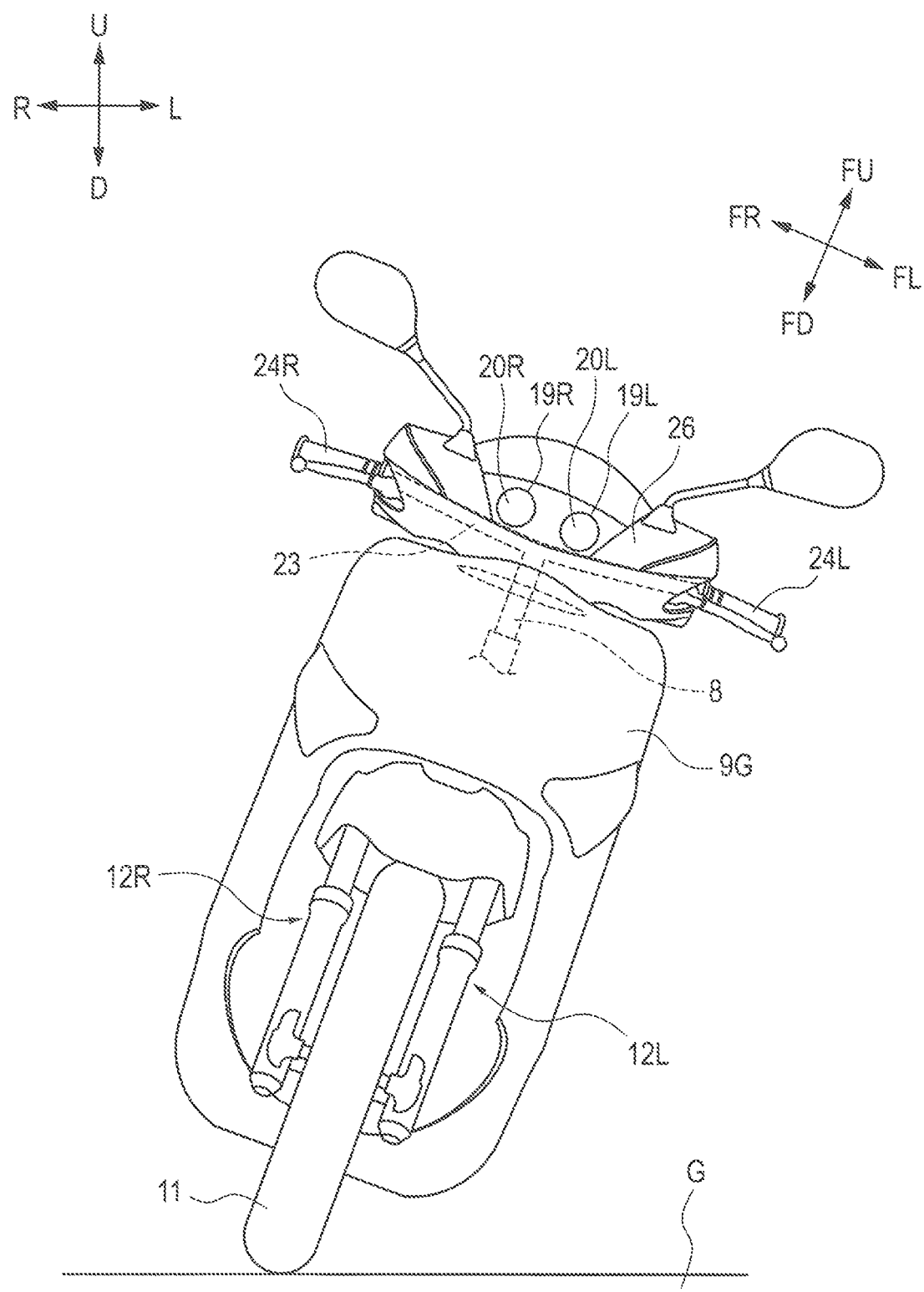
FIG. 42 is a front view of the straddled vehicle according to Embodiment 8 of the present invention during a left turn.

FIG. 40 is a side view illustrating a straddled vehicle according to Embodiment 8 of the present invention. FIG. 41 is a front view illustrating the straddled vehicle according to Embodiment 8 of the present invention. FIG. 42 is a front view of the straddled vehicle according to Embodiment 8 of the present invention during a left turn.

In FIG. 40 to FIG. 42, the same components as the components shown in FIG. 18 and FIG. 19 are assigned the same reference numerals and the description thereof will be omitted.

As shown in FIG. 40 to FIG. 42, straddled vehicle 1G includes body frame 2, seat 4, power unit 5, steering shaft 8, body cover 9G, rear wheel 10, front wheel 11, left front-wheel support unit 12L, right front-wheel support unit 12R, lower bracket 15, lamp unit 18, handlebar 23, left grip 24L, right grip 24R, fender 25, and handlebar cover 26.

The upper part of left front-wheel support unit 12L and the upper part of right front-wheel support unit 12R are fixedly supported by lower bracket 15.

Body cover 9G covers at least part of the periphery of steering shaft 8, at least part of the periphery of body frame 2 and part of power unit 5.

Handlebar cover 26 covers the periphery of an intermediate part of handlebar 23. Meters or the like are disposed at the top of handlebar cover 26. Lamp unit 18 is provided on the front of handlebar cover 26.

As shown in FIG. 42, when a rider steers handlebar 23 and straddled vehicle 1G turns leftward, left front-wheel support unit 12L and right front-wheel support unit 12R tilt to the left of the vehicle with respect to ground G together with front wheel 11. Similarly, when the rider steers handlebar 23 and straddled vehicle 1G turns rightward, left front-wheel support unit 12L and right front-wheel support unit 12R tilt to the right of the vehicle with respect to ground G together with front wheel 11.

Lamp unit 18 is similar to the one described in Embodiment 1. The light distributions obtained by first highly-directional light unit 19L and second highly-directional light unit 19R are also similar to those described in Embodiment 1.

The relationship between the size of each of first, second, third, and fourth optical lens sections 20L and 20R of first and second highly-directional light units 19L and 19R of lamp unit 18 and length L1 between two virtual lines V1 and V2 in the left-right direction of the vehicle is similar to that described in Embodiment 1. The relationship between length L10 between first and second optical lens sections 20L and 20R of first and second highly-directional light units 19L and 19R and length L1 between two virtual lines V1 and V2 in the left-right direction of the vehicle is also similar to that described in Embodiment 1. In FIG. 41, virtual lines V1 and V2 indicate the positions of bottom-right end E1 of left front-wheel support unit 12L and bottom-left end E2 of right front-wheel support unit 12R in the left-right direction of the vehicle.

Lamp unit 18 is disposed as part of the front of handlebar cover 26 and supported by handlebar 23.

Thus, scooter type straddled vehicle 1G including handlebar cover 26 can also be provided with lamp unit 18 similar to that in Embodiment 1 and obtain effects similar to those of Embodiment 1.

Each embodiment of the present invention has been described thus far.

Note that the above embodiments have shown a bar-shaped handlebar which is long in the left-right direction of the vehicle as the handlebar, but the handlebar of the present invention is not limited to this. The handlebar of the present invention can take any configuration as long as it is long in the left-right direction of the vehicle and integrally turns with the steering shaft. For example, a separate handlebar may be adopted which includes a left handlebar and a right handlebar, the left handlebar being fixed to the left part of the upper bracket and the right handlebar being fixed to the right part of the upper bracket.

The above embodiments have been described with the configuration in which both the left-front wheel and right front-wheel support units include a spring and a damper therein. However, the left front-wheel support unit of the present invention may have any configuration as long as it is located on the left of the steering shaft in the left-right direction of the vehicle, includes the upper part supported by the body frame and the lower part that supports the front wheel and that is displaceable with respect to the upper part in the up-down direction of the vehicle, and turns with the steering shaft. On the other hand, the right front-wheel support unit of the present invention may have any configuration as long as it is located on the right of the steering shaft in the left-right direction of the vehicle, includes the upper part supported by the body frame and the lower part that supports the front wheel and that is displaceable with respect to the upper part in the up-down direction of the vehicle, and turns with the steering shaft. For example, one of the right front-wheel support unit and left front-wheel support unit may be provided with a spring and the other may be provided with a damper. Alternatively, one of the right-front and left front-wheel support units may be provided with a spring and a damper and the other may be provided with neither a spring nor damper, and the lower part may be displaceable with respect to the upper part in the up-down direction of the vehicle. The direction in which the lower part is displaced with respect to the upper part of the left front-wheel support unit may include components in the front-rear direction and the left-right direction of the vehicle. The direction in which the lower part is displaced with respect to the upper part of the right front-wheel support unit may include components in the front-rear direction and the left-right direction of the vehicle.

The above embodiments have been described with the configuration in which, as the highly-directional light unit (the first highly-directional light unit to the sixth highly-directional light unit), the light-emitting section is an LED and the optical axis of the light-emitting section is oriented toward the optical lens section. However, the highly-directional light unit such as the first highly-directional light unit and the second highly-directional light unit of the present invention may include a light-emitting section that emits highly-directional light and an optical lens section that refracts light from the light-emitting section and forms light distribution, and the light distribution formed by the optical lens section may become light distribution of at least part of the main beam or dipped beam. For example, a light-emitting end of an optical fiber that guides and emits light of a semiconductor laser may be applied as the light-emitting section that emits highly-directional light. A configuration may be adopted in which a reflector is placed between an optical lens section and a light-emitting section, and the light emitted from the light-emitting section is reflected and sent to the optical lens section.

Furthermore, the above embodiments have been described with the modularized configuration including a case as the highly-directional light unit (the first highly-directional light unit to the sixth highly-directional light unit), but the highly-directional light unit of the present invention is not limited to this. The highly-directional light unit of the present invention may include a light-emitting section that emits highly-directional light and an optical lens section that refracts light from the light-emitting section and forms light distribution, and the light distribution formed by the optical lens section may become the light distribution of at least part of the main beam or dipped beam. The highly-directional light unit of the present invention may have a configuration in which the light-emitting section and the optical lens section may be assembled in a configuration in which they are separable, for example.

The above embodiments have specifically illustrated lengths L10 and L11 between the first optical lens section of the first highly-directional light unit and the second optical lens section of the second highly-directional light unit using drawings. However, the length between the first optical lens section of the first highly-directional light unit and the second optical lens section of the second highly-directional light unit in the present invention may be smaller than half the distance between the bottom-left end of the left front-wheel support unit and the bottom-right end of the right front-wheel support unit in the left-right direction of the vehicle and greater than half a minimum width of the first optical lens section of the first highly-directional light unit or a minimum width of the second optical lens section of the second highly-directional light unit, whichever is the smaller.

The above embodiments have specifically illustrated a maximum width of the first optical lens section of the first highly-directional light unit and a maximum width of the second optical lens section of the second highly-directional light unit using drawings. However, the maximum width of the first optical lens section of the first highly-directional light unit of the present invention may be, when viewed from the front of the vehicle, smaller than half the distance between the bottom-left end of the left front-wheel support unit and the bottom-right end of the right front-wheel support unit in the left-right direction of the vehicle. Moreover, the maximum width of the second optical lens section of the second highly-directional light unit may be smaller than half the distance between the bottom-left end of the left front-wheel support unit and the bottom-right end of the right front-wheel support unit in the left-right direction of the vehicle. Note that these maximum widths may be greater than reference length 20 mm.

The above embodiments have specifically shown the maximum width of the third optical lens section of the third highly-directional light unit and the maximum width of the fourth optical lens section of the fourth highly-directional light unit using the drawings, but the maximum width of the third optical lens section of the third highly-directional light unit of the present invention may be smaller than half the distance between the bottom-left end of the left front-wheel support unit and the bottom-right end of the right front-wheel support unit in the left-right direction of the vehicle when viewed from the front of the vehicle. Furthermore, the maximum width of the fourth optical lens section of the fourth highly-directional light unit may be smaller than half the distance between the bottom-left end of the left front-wheel support unit and the bottom-right end of the right front-wheel support unit in the left-right direction of the vehicle. Note that these maximum widths may be greater than reference length 20 mm.

Furthermore, the above embodiments specifically have illustrated the relationship between the light distribution of the light radiated through the first optical lens section of the first highly-directional light unit and the light distribution of the light radiated through the second optical lens section of the second highly-directional light unit using the drawings, but the relationship between the light distribution of the light radiated through the first optical lens section of the first highly-directional light unit and the light distribution of the light radiated through the second optical lens section of the second highly-directional light unit according to the present invention may be any relationship as long as the light radiated through the first optical lens section of the first highly-directional light unit partially overlaps the light radiated through the second optical lens section of the second highly-directional light unit and the remaining light does not overlap.

The above-described embodiments have been described with the configuration in which light distribution of the dipped beam is formed by the first highly-directional light unit and the second highly-directional light unit. However, in the first highly-directional light unit of the present invention, the light distribution formed by the first optical lens section may only be the light distribution of at least part of the main beam or dipped beam. In the second highly-directional light unit of the present invention, the light distribution formed by the second optical lens section may be a light distribution of at least part of the same beam as that of the first highly-directional light unit. For example, the main beam may be formed by the first highly-directional light unit and the second highly-directional light unit. Furthermore, the light distribution of the dipped beam may be formed by the first highly-directional light unit, the second highly-directional light unit, and further another or a plurality of other highly-directional light units. Furthermore, the light distribution of the main beam may be formed by the first highly-directional light unit, the second highly-directional light unit, and further, another or a plurality of other highly-directional light units.

The above-described embodiments have been described with the configuration in which the light of the first wall light distribution drawn on the wall body by the light that has passed through the first optical lens section of the first highly-directional light unit partially overlaps the light of the second wall light distribution by the second highly-directional light unit and the remaining part does not overlap the light of the second wall light distribution by the second highly-directional light unit. However, the first highly-directional light unit and the second highly-directional light unit of the present invention may be configured in any manner as long as the first wall light distribution drawn on an upright wall body located 10 m forward of the vehicle from the front end which is located on the foremost in the front-rear direction of the vehicle of the first optical lens section and the second optical lens section by the light radiated through the first optical lens section partially overlaps the second wall light distribution drawn on the wall body by the light radiated through the second optical lens section and the remaining part does not overlap. For example, when the first and the second highly-directional light units, and another highly-directional light unit form light distributions of the main beam or the dipped beam, the wall light distribution drawn on the wall body by the light radiated through the optical lens section of the other highly-directional light unit may totally or partially overlap the first wall light distribution of the first highly-directional light unit, or may not overlap at all. Moreover, the wall light distribution of the other highly-directional light unit may totally or partially overlap the second wall light distribution of the second highly-directional light unit, or may not overlap at all.

The present invention can be embodied by a large number of different modes. This disclosure should be construed as providing embodiments of the principle of the present invention. A large number of illustrative embodiments are described here with the understanding that the embodiments are not intended to limit the present invention to the preferred embodiments described and/or illustrated here.

Some illustrative embodiments of the present invention are described here. The present invention is not limited to various preferred embodiments described here. The present invention includes any embodiments including equivalent elements, corrections, deletions, combinations (for example, combinations with features across various embodiments), improvements, and/or changes that can be recognized by those skilled in the art based on this disclosure. The limitations of the appended claims should be broadly interpreted based on the terms used in the appended claims, and the limitations should not be limited by the embodiments described in the present description or in the prosecution of the present application. The embodiments should be construed as non-exclusive. For example, the terms "preferably" and "may" are non-exclusive in this disclosure, meaning "preferable, but not limited to this and may be, but not limited to this."

The disclosures of Japanese Patent Applications No. 2014-120235 and No. 2014-120236 both filed on Jun. 11, 2014, and No. 2014-256379 filed on Dec. 18, 2014, including the specifications, drawings, and abstracts are incorporated herein by reference in their entireties.

INDUSTRIAL APPLICABILITY

The present invention is suitable for use in a straddled vehicle.

REFERENCE SIGNS LIST 1, 1A, 1B, 1C, 1D, 1E, 1F, 1G straddled vehicles
2 body frame
11 front wheel
11L left front wheel 11R right front wheel
12L left front-wheel support unit
12R right front-wheel support unit
18, 18A, 18B lamp units
19L, 19A, 19E first highly-directional light units
19R, 19B, 19F second highly-directional light units
19C, 19G third highly-directional light units
19D, 19H fourth highly-directional light units
19I fifth highly-directional light unit
19J sixth highly-directional light unit
20L, 20A, 20E first optical lens sections
20R, 20B, 20F second optical lens sections
20C, 20G third optical lens sections
20D, 20H fourth optical lens sections
20I fifth optical lens section
20J sixth optical lens section
51 first light-emitting section
W1L, W1R, W1A, W1B, W1C, W1D maximum widths
W2L, W2R, W2A, W2B, W2C, W2D minimum widths
L1 interval between bottom-left end of left front-wheel support unit and bottom-right end of right front-wheel support unit
L10, L11, L12 lengths between optical lens sections
D1, D2, D3, D11, D12, D13, D21, D22, D23, D31, D32, D33 wall light distributions
W wall body
32 base portion
60, 61 parts
43L first base portion
43R second base portion

The invention claimed is:

1. A straddled vehicle comprising a body frame and a front wheel portion that includes at least one front wheel, the straddled vehicle being turnable leftward while the body frame is tilted leftward in a left-right direction of the vehicle and being turnable rightward while the body frame is tilted rightward in the left-right direction of the vehicle, the straddled vehicle comprising:
    a steering shaft turnably supported by the body frame;
    a handlebar that is longest in the left-right direction of the vehicle and that is configured to turn integrally with the steering shaft;
    a left front-wheel support unit located at the left of the steering shaft in the left-right direction of the vehicle and being turnable with the steering shaft, the left front-wheel support unit including
        an upper portion supported by the body frame, and
        a lower portion that supports the front wheel portion and that is displaceable with respect to the upper portion in an up-down direction of the vehicle;
    a right front-wheel support unit located at the right of the steering shaft in the left-right direction of the vehicle and being turnable with the steering shaft, the right front-wheel support unit including
        an upper portion supported by the body frame, and
        a lower portion that supports the front wheel portion and that is displaceable with respect to the upper portion of the right front-wheel support unit in the in the up-down direction of the vehicle;
    a first highly-directional light unit including
        a first light-emitting section that emits highly-directional first light, and
        a first optical lens section that refracts the first light to form a first light distribution, the first light distribution being a light distribution of at least part of a light beam, the light beam being a main beam or dipped beam;
    a second highly-directional light unit being configured to turn on when the first highly-directional light unit is turned on, and to turn off when the first highly-directional light unit is turned off, the second highly-directional light unit including
        a second light-emitting section that emits highly-directional second light, and
        a second optical lens section that refracts the second light to form a second light distribution, the second light distribution being a light distribution of at least part of the light beam, which includes the first light distribution; and
    a first base portion that supports the first highly-directional light unit and the second highly-directional light unit, the first base portion being movably supported so that a position of the first base portion relative to the body frame or the handlebar is changeable, wherein
    the first highly-directional light unit and the second highly-directional light unit are formed in such a way that:
    in the left-right direction of the vehicle when viewed from a front of the vehicle, each of the first optical lens section and the second optical lens section has a respective maximum width which is smaller than half a first length,
    wherein in the left-right direction of the vehicle when viewed from the front of the vehicle, the first length is measured in the left-right direction between a left end of the lower portion of the left front-wheel support unit and a right end of the lower portion of the right front-wheel support unit; and
    a second length between the first optical lens section and the second optical lens section is both
        smaller than half the first length, and
        greater than half a length that is a smaller one of a minimum width of the first optical lens section and a minimum width of the second optical lens section, the minimum widths of the first and second optical lens sections each being measured in the left-right direction of the vehicle when viewed from the front of the vehicle,
    further wherein the first and second highly-directional light units are fixed to the first base portion so as to maintain, when a relative position of the first base portion with respect to the body frame or the handlebar is changed, a state in which a first wall light distribution partially overlaps a second wall light distribution while a remaining part of the first wall light distribution does not overlap the second wall light distribution,
    further wherein the first wall light distribution is the first light distribution projected onto an upright wall body located 10 meters forward of the vehicle from a front end of one of the first optical lens section and the second optical lens section that is located at a foremost forward position in a front-rear direction of the vehicle from among all portions of the first and second optical lens sections, and
    further wherein the second wall light distribution is the second light distribution projected onto the wall body.

2. The straddled vehicle according to claim 1, wherein a region between the first optical lens section and the second optical lens section is located at a center of the vehicle in the left-right direction when viewed from the front of the vehicle.

3. The straddled vehicle according to claim 1, further comprising:
a left grip disposed on the left of the handlebar; and
a right grip disposed on the right of the handlebar, wherein
wherein the first and second light distributions form at least the parts of the dipped beam,
further wherein the straddled vehicle further comprises:
a third highly-directional light unit including
a third light-emitting section that emits highly-directional third light, and
a third optical lens section that refracts the third light to form a third light distribution, the third light distribution being a light distribution of at least part of the dipped beam;
a fourth highly-directional light unit being configured to turn on together when the third highly-directional light unit is turned on, and to turn off together with the third highly-directional light unit when the third highly-directional light unit is turned off, the fourth highly-directional light unit including
a fourth light-emitting section that emits highly-directional fourth light, and
a fourth optical lens section that refracts the fourth light to form a fourth light distribution, the fourth light distribution being a light distribution of at least part of the dipped beam;
a fifth highly-directional light unit including
a fifth light-emitting section that emits highly-directional fifth light, and
a fifth optical lens section that refracts the fifth light to form a fifth light distribution, the fifth light distribution being a light distribution of at least part of the main beam;
a sixth highly-directional light unit including
a sixth light-emitting section that emits highly-directional sixth light, and
a sixth optical lens section that refracts the sixth light to form a sixth light distribution, the sixth light distribution being a light distribution of at least part of the main beam; and
a second base portion that supports the third highly-directional light unit and the fourth highly-directional light unit, the second base portion being movably supported so that a position of the second base portion relative to the body frame or the handlebar is changeable, wherein
the third highly-directional light unit and the fourth highly-directional light unit are formed in such a way that:
each of the third optical lens section and the fourth optical lens section have a respective maximum width that is smaller than half the first length,
a length between the third optical lens section and the fourth optical lens section is both
smaller than half the first length, and
greater than half a length that is a smaller one of a minimum width of the third optical lens section and a minimum width of the fourth optical lens section, the minimum widths of the third and fourth optical lens sections each being measured in the left-right direction of the vehicle when viewed from the front of the vehicle,
wherein the third highly-directional light unit and the fourth highly-directional light unit are fixed to the second base portion so as to maintain, when a relative position of the second base portion with respect to the body frame or the handlebar is changed, a state in which a third wall light distribution partially overlaps a fourth wall light distribution while a remaining part of the third wall light distribution does not overlap the fourth wall light distribution,
further wherein the third wall light distribution is the third light distribution which is projected onto the upright wall body, the wall body being located 10 meters forward of the vehicle from a front end of one of the third optical lens section and the fourth optical lens section that is located at a foremost position in the front-rear direction of the vehicle from among all portions of the third and fourth optical lens section,
further wherein the fourth wall light distribution is the fourth light distribution which is projected onto the wall body, and
further wherein the first, second, third, fourth, fifth and sixth highly-directional light units are disposed so that:
a right end of the first optical lens section, a right end of the second optical lens section and a right end of the fifth optical lens section are on a left side of a center of the vehicle in the left-right direction,
a left end of the first optical lens section, a left end of the second optical lens section and a left end of the fifth optical lens section are on a right side of a left end of the left grip in the left-right direction of the vehicle,
a left end of the third optical lens section, a left end of the fourth optical lens section and a left end of the sixth optical lens section are on a right side of the center of the vehicle in the left-right direction; and
a right end of the third optical lens section, a right end of the fourth optical lens section and a right end of the sixth optical lens section are on a left side of a right end of the right grip in the left-right direction of the vehicle.

4. The straddled vehicle according to claim 3, wherein, when viewed from the front of the vehicle, the maximum width of the first optical lens section, the maximum width of the second optical lens section, a maximum width of the fifth optical lens section, the maximum width of the third optical lens section, the maximum width of the fourth optical lens section and a maximum width of the sixth optical lens section are each greater than 20 mm.

5. The straddled vehicle according to claim 3, further comprising at least a part of an electric or electronic part, which does not include any of the first, second, third, fourth, fifth and sixth highly-directional light units, comprising at least one selected from the group consisting of a throttle wire, a brake wire, a brake hose, a clutch wire, a wire harness, and a key cylinder, the at least a part of the electric or electronic part being disposed so as to overlap a region between the third optical lens section and the fourth optical lens section when viewed from the front of the vehicle.

6. The straddled vehicle according to claim 3, wherein the third wall light distribution projected on the wall body and the fourth wall light distribution projected on the wall body are different in contour on the wall body or size on the wall body.

7. The straddled vehicle according to claim 3, wherein the third wall light distribution projected on the wall body and the fourth wall light distribution projected on the wall body have identical shapes to each other on the wall body but have different positions of respective centers of light distribution on the wall body.

8. The straddled vehicle according to claim 1, wherein the maximum width of the first optical lens section when viewed from the front of the vehicle is greater than 20 mm, and the maximum width of the second optical lens section when viewed from the front of the vehicle is greater than 20 mm.

9. The straddled vehicle according to claim 1, further comprising at least a part of an electric or electronic component, which does not include any portion of the first and second highly-directional light unit, comprising at least one selected from the group consisting of a throttle wire, a brake wire, a brake hose, a clutch wire, a wire harness, and a key cylinder, the at least a part of the electric or electronic component being disposed so as to overlap a region between the first optical lens section and the second optical lens section when viewed from the front of the vehicle.

10. The straddled vehicle according to claim 1, wherein the first wall light distribution projected on the wall body and the second wall light distribution projected on the wall body are different in contour on the wall body or size on the wall body.

11. The straddled vehicle according to claim 1, wherein the first wall light distribution projected on the wall body and the second wall light distribution projected on the wall body have identical shapes to each other on the wall body but have different positions of respective centers of light distribution on the wall body.

* * * * *